(12) United States Patent
Percec et al.

(10) Patent No.: US 7,345,127 B2
(45) Date of Patent: Mar. 18, 2008

(54) LIVING RADICAL POLYMERIZATION OF HALOGEN-CONTAINING AND ACRYLIC MONOMERS AND THE FORMATION OF BLOCK COPOLYMERS THEREFROM

(75) Inventors: Virgil Percec, Philadelphia, PA (US); Tamaz Guliashvili, Philadelphia, PA (US); Anatoliy V. Popov, Philadelphia, PA (US)

(73) Assignee: University of Pennsylvania, Philadelphia, PA (US)

( * ) Notice: Subject to any disclaimer, the term of this patent is extended or adjusted under 35 U.S.C. 154(b) by 111 days.

(21) Appl. No.: 11/043,469

(22) Filed: Jan. 26, 2005

(65) Prior Publication Data

US 2005/0131186 A1 Jun. 16, 2005

Related U.S. Application Data

(63) Continuation-in-part of application No. 10/179,584, filed on Jun. 24, 2002, now Pat. No. 6,911,515, which is a continuation-in-part of application No. 09/893,201, filed on Jun. 27, 2001, now Pat. No. 6,838,535.

(60) Provisional application No. 60/278,114, filed on Mar. 23, 2001.

(51) Int. Cl.
 *C08F 14/06* (2006.01)
(52) U.S. Cl. ...................... 526/344; 526/161; 526/172; 526/343
(58) Field of Classification Search ................ 526/344, 526/161, 172, 343
See application file for complete search history.

(56) References Cited

U.S. PATENT DOCUMENTS

| | | | |
|---|---|---|---|
| 2,831,844 | A | 4/1958 | Simpson et al. |
| 2,996,470 | A | 8/1961 | Cole et al. |
| 4,091,197 | A | 5/1978 | Fischer et al. |
| 4,511,700 | A | 4/1985 | Melby et al. |
| 5,455,319 | A | 10/1995 | Bak et al. |
| 5,478,886 | A | 12/1995 | Kim |
| 5,763,548 | A | 6/1998 | Matyjaszewski et al. |
| 5,789,487 | A | 8/1998 | Matyjaszewski et al. |
| 5,807,937 | A | 9/1998 | Matyjaszewski et al. |
| 6,162,882 | A | 12/2000 | Matyjaszewski et al. |

FOREIGN PATENT DOCUMENTS

| | | |
|---|---|---|
| EP | 0 617 057 | 9/1994 |
| EP | 1 016 678 | 7/2000 |
| GB | 674 060 | 6/1952 |
| GB | 932852 | 7/1963 |
| GB | 961 940 | 6/1964 |
| GB | 1 078 870 | 8/1967 |
| GB | 1 099 391 | 1/1968 |
| JP | 10130306 | 5/1998 |
| NL | 6 906 754 | 11/1969 |
| NL | 7 201 105 | 8/1972 |
| WO | WO 96/30421 | 10/1996 |
| WO | WO 97/13792 | 4/1997 |
| WO | WO 97/18247 | 5/1997 |
| WO | 02/38632 | 5/2002 |
| WO | WO 02/38632 A1 * | 5/2002 |
| WO | 03/002621 | 1/2003 |

OTHER PUBLICATIONS

D.A. Shipp, et al., "Synthesis of Acrylate and Methacrylate Block Copolymers Using Atom Transfer Radical Polymerization", Macromolecules, 1998 American Chemical Society, vol. 31, pp. 8005-8008, XP-000788823.
S-M. Jo, et al., "New AB or ABA type bock copolymers: atom transfer radical polymerization (ATRP) of methyl methacrylate using iodine-terminated PVDFs as (macro)initiators", Polymer Bulletin, Springer-Berlag 2000, vol. 44, pp. 1-8, XP-000927351.
M. Destarac, et al., "Atom Transfer Radical Polymerization Initiated with Vinylidene Fluoride Telomers", Macromolecules, 2000 American Chemical Society, vol. 33, pp. 4613-4615, XP-000950239.
V. Percec, et al., "Non-transition Metal-Catalyzed Living Radical Polymerization of Vinyl Chloride Initiated with Iodoform in Water at 25° C.", 2004 Journal of Polymer Science: Part A: Polymer Chemistry, vol. 42, pp. 6267-6282, XP-002342246.

* cited by examiner

*Primary Examiner*—Robert D. Harlan
(74) *Attorney, Agent, or Firm*—Hudak, Shunk & Farine Co. LPA

(57) ABSTRACT

Acrylic polymers are made by the living radical polymerization of acrylic monomers utilizing organo halide initiators with either metal-free or metal catalysts. Moreover, block copolymers of vinyl halide monomers and acrylic monomers are described by generally polymerizing either the vinyl halide monomers or acrylic monomers utilizing an organo halide initiator in the presence of either a metal catalyst or a metal-free catalyst and subsequently polymerizing thereon the remaining type of monomer.

34 Claims, 18 Drawing Sheets

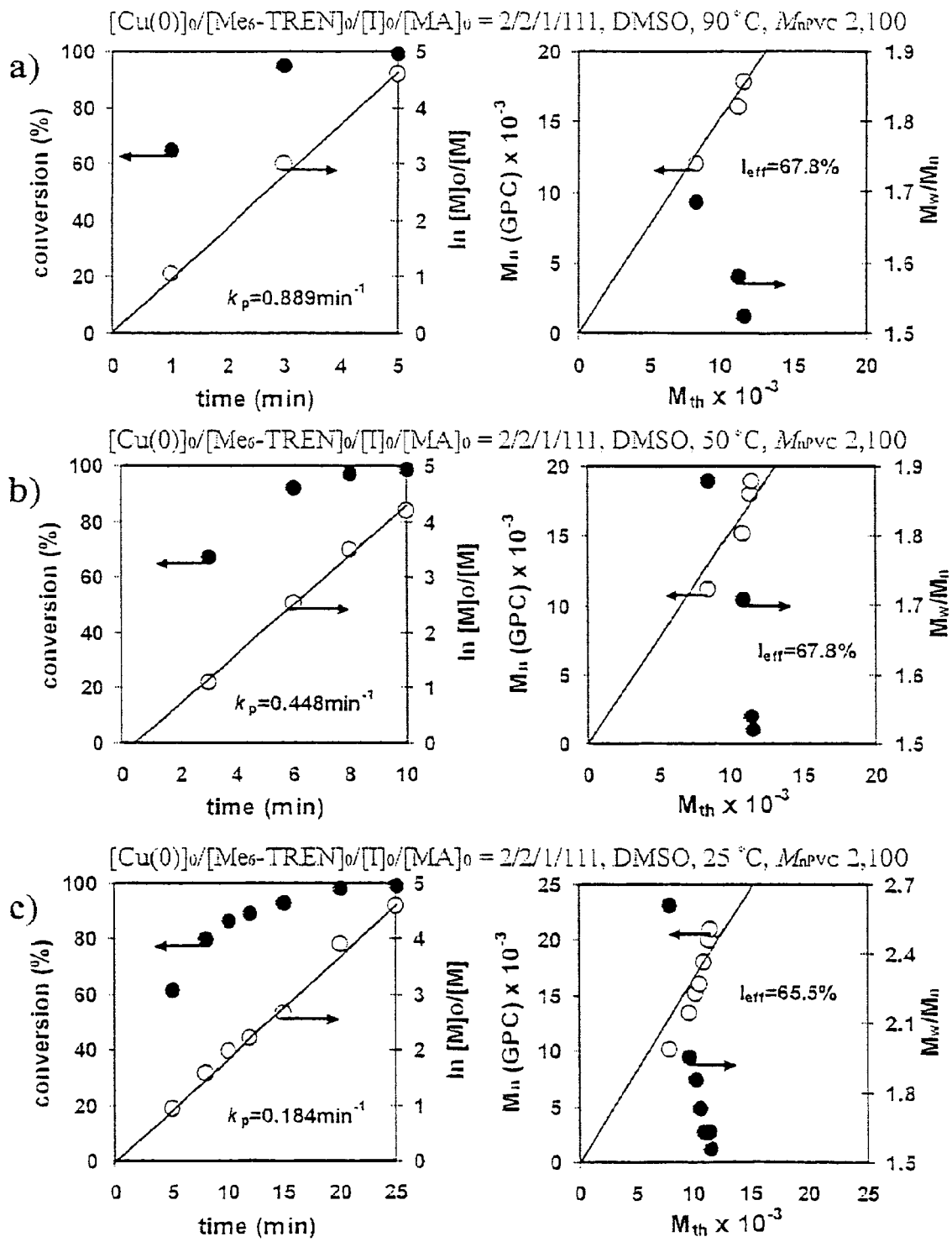
FIG. I-1

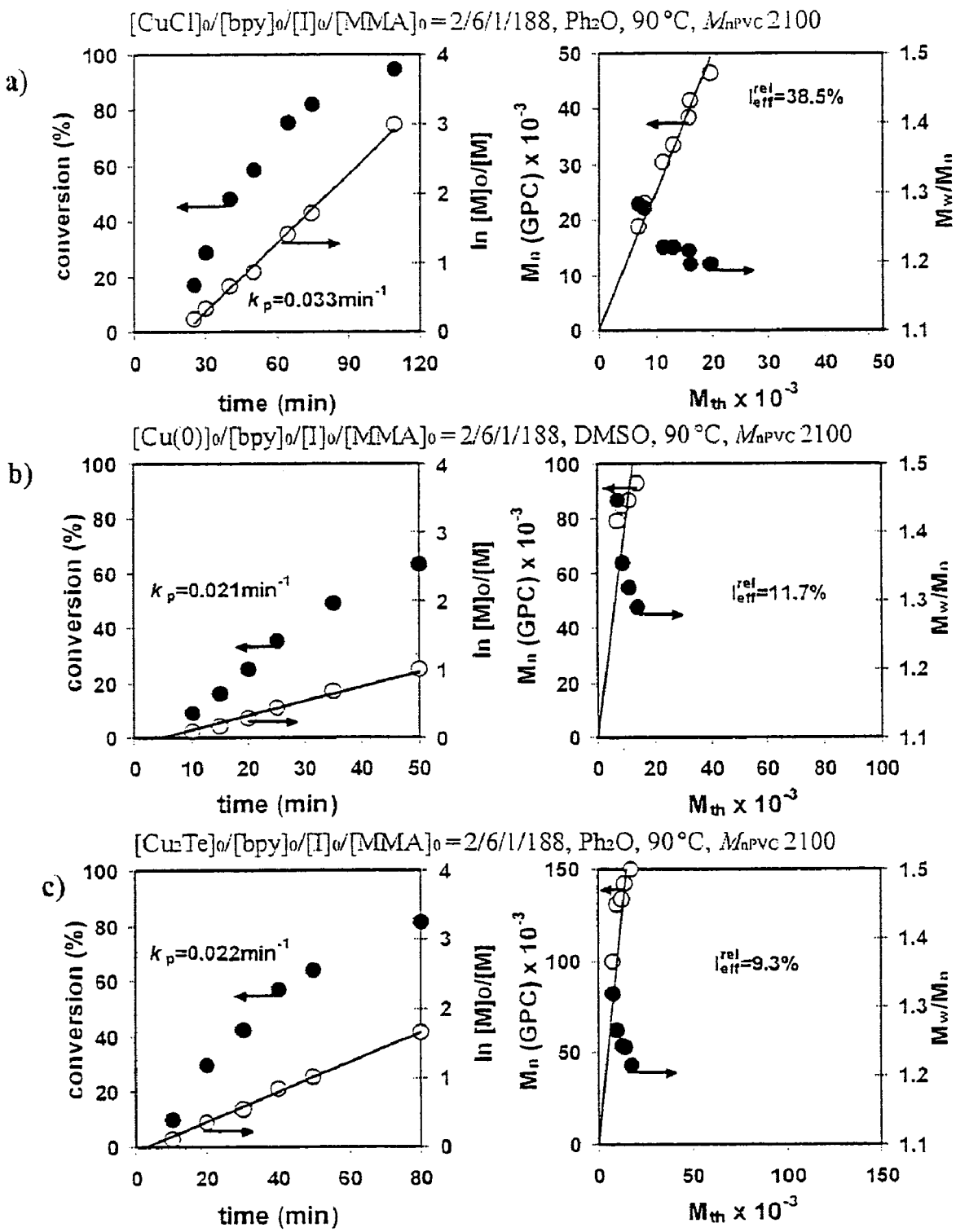
FIG. II-1

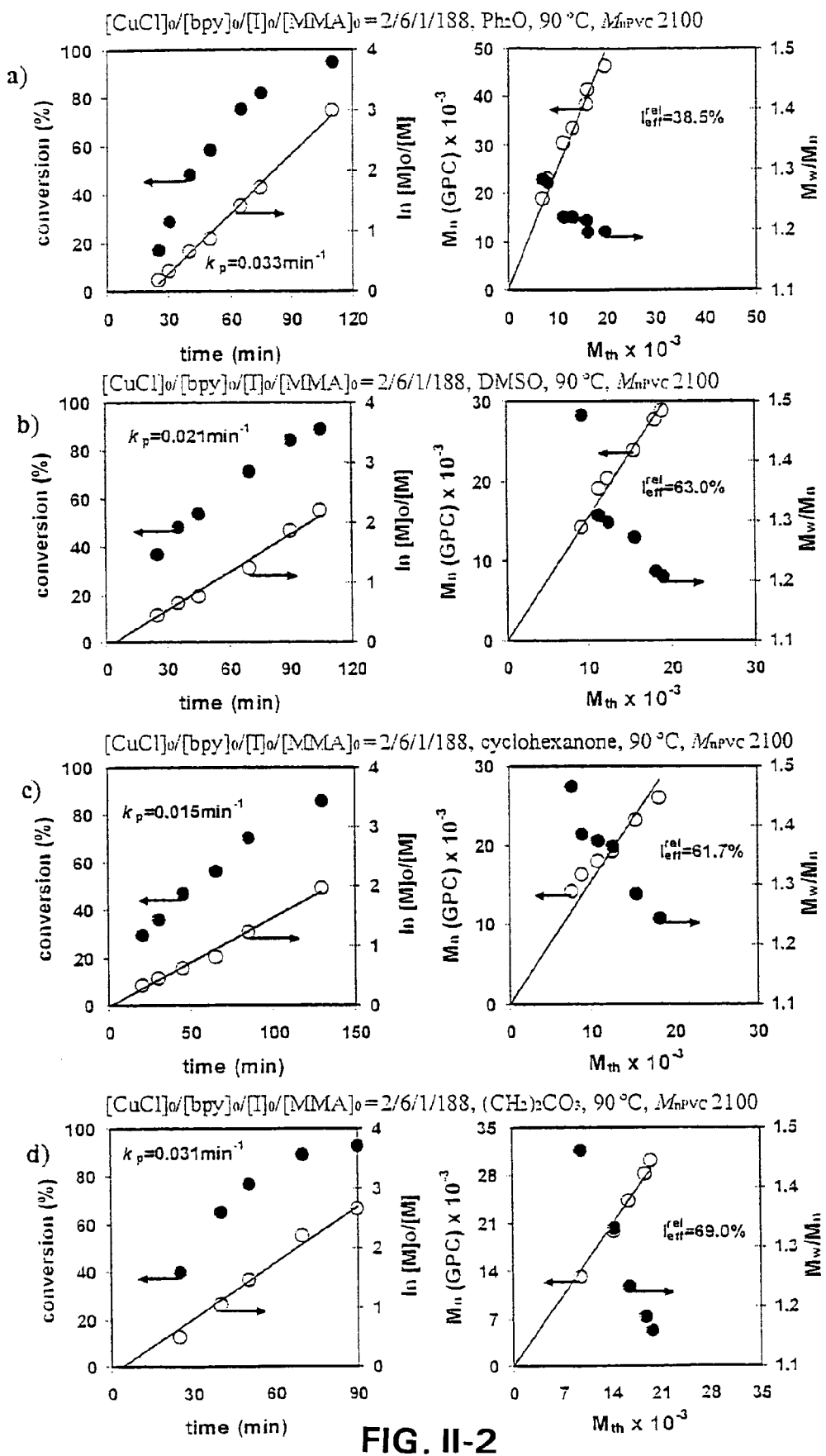
FIG. II-2

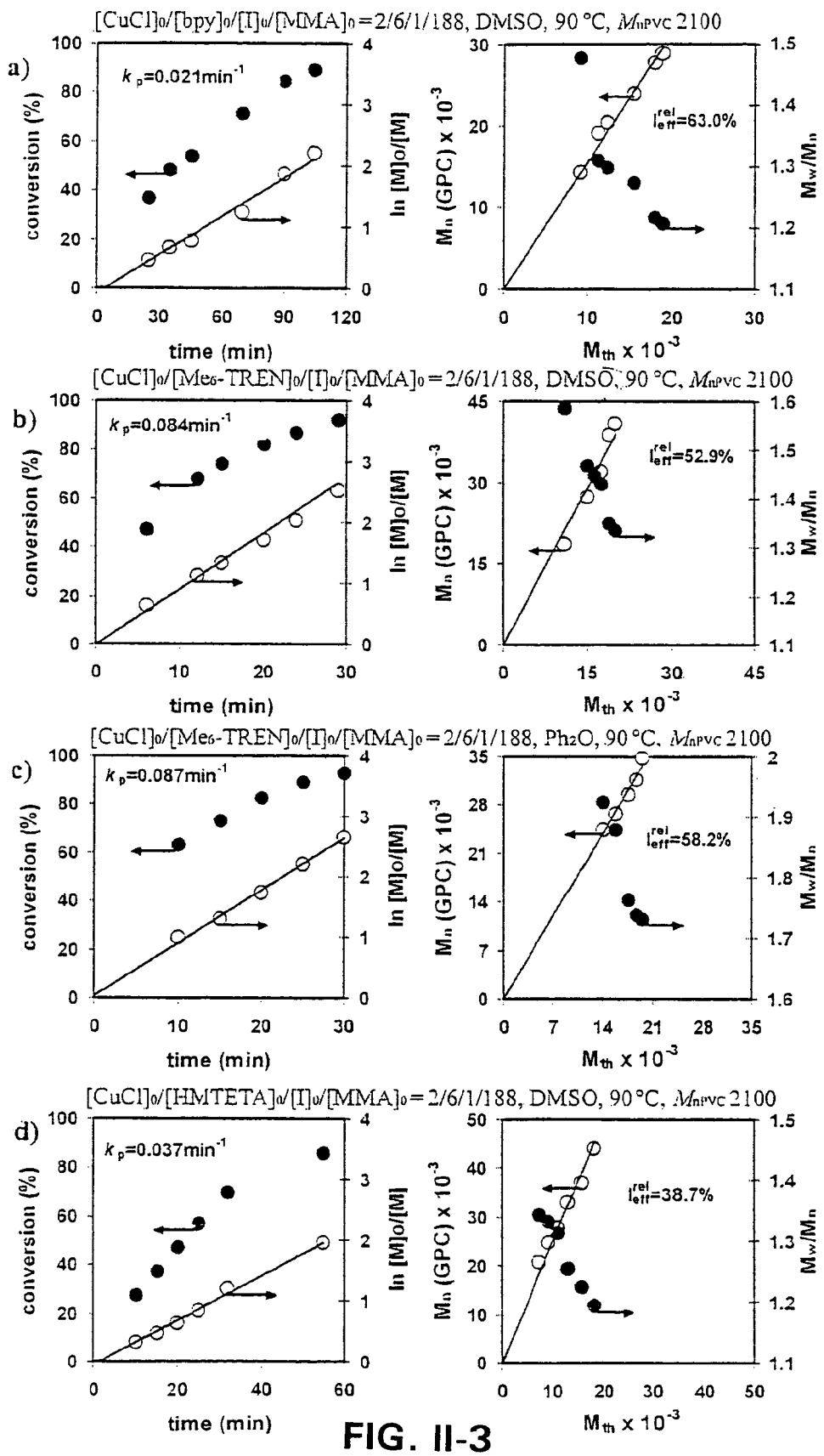
FIG. II-3

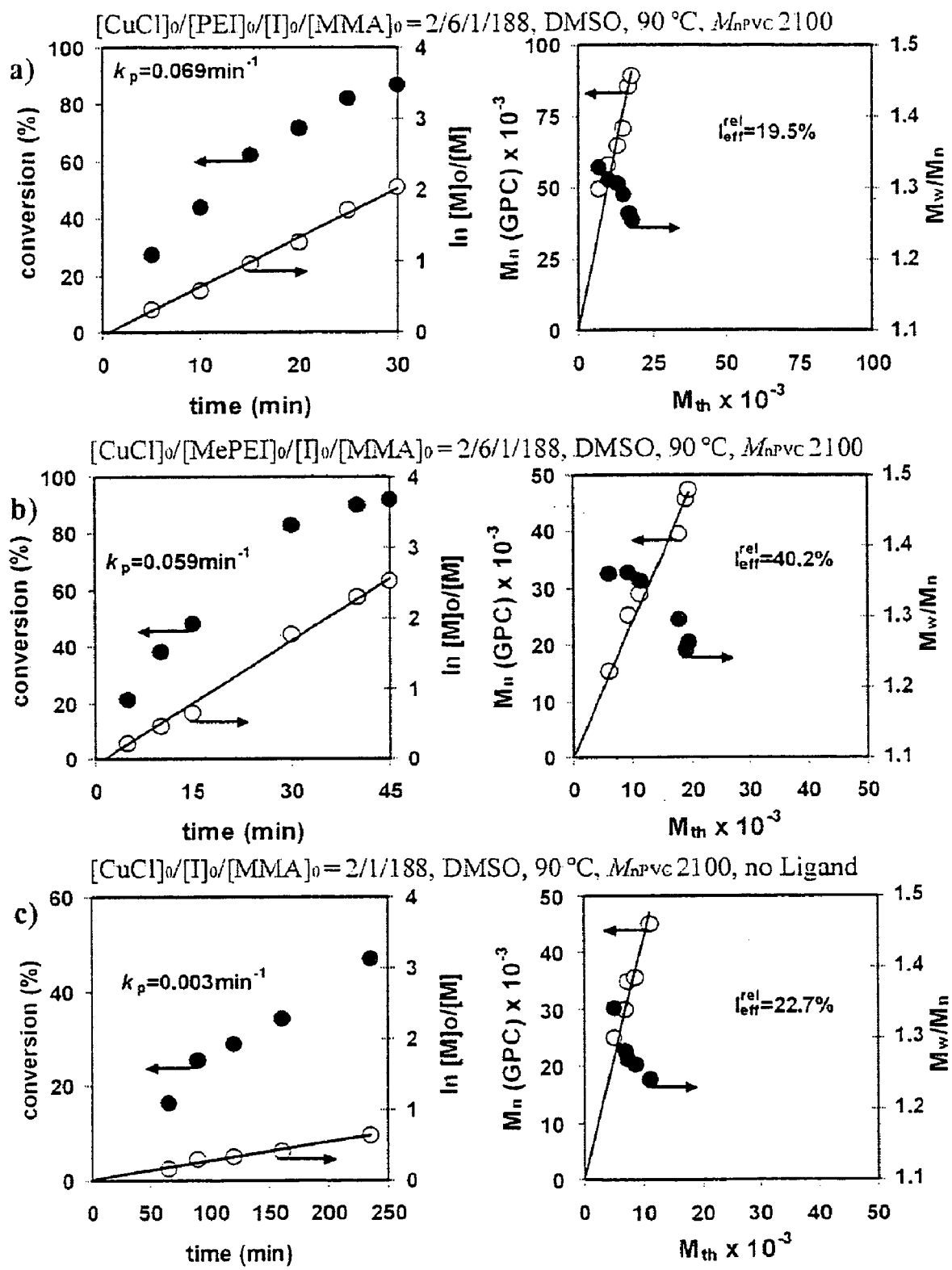
FIG. II-4

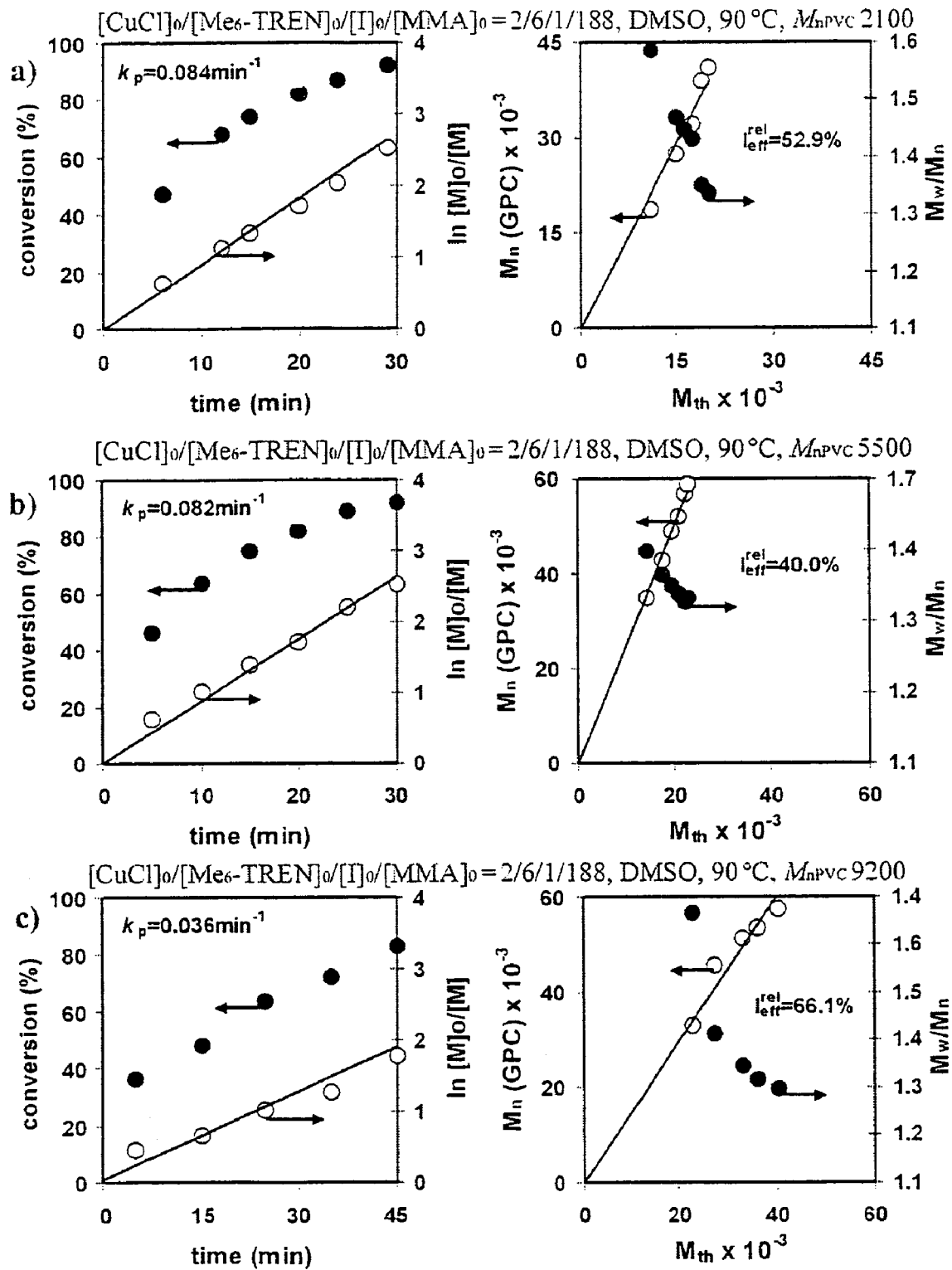
FIG. II-5

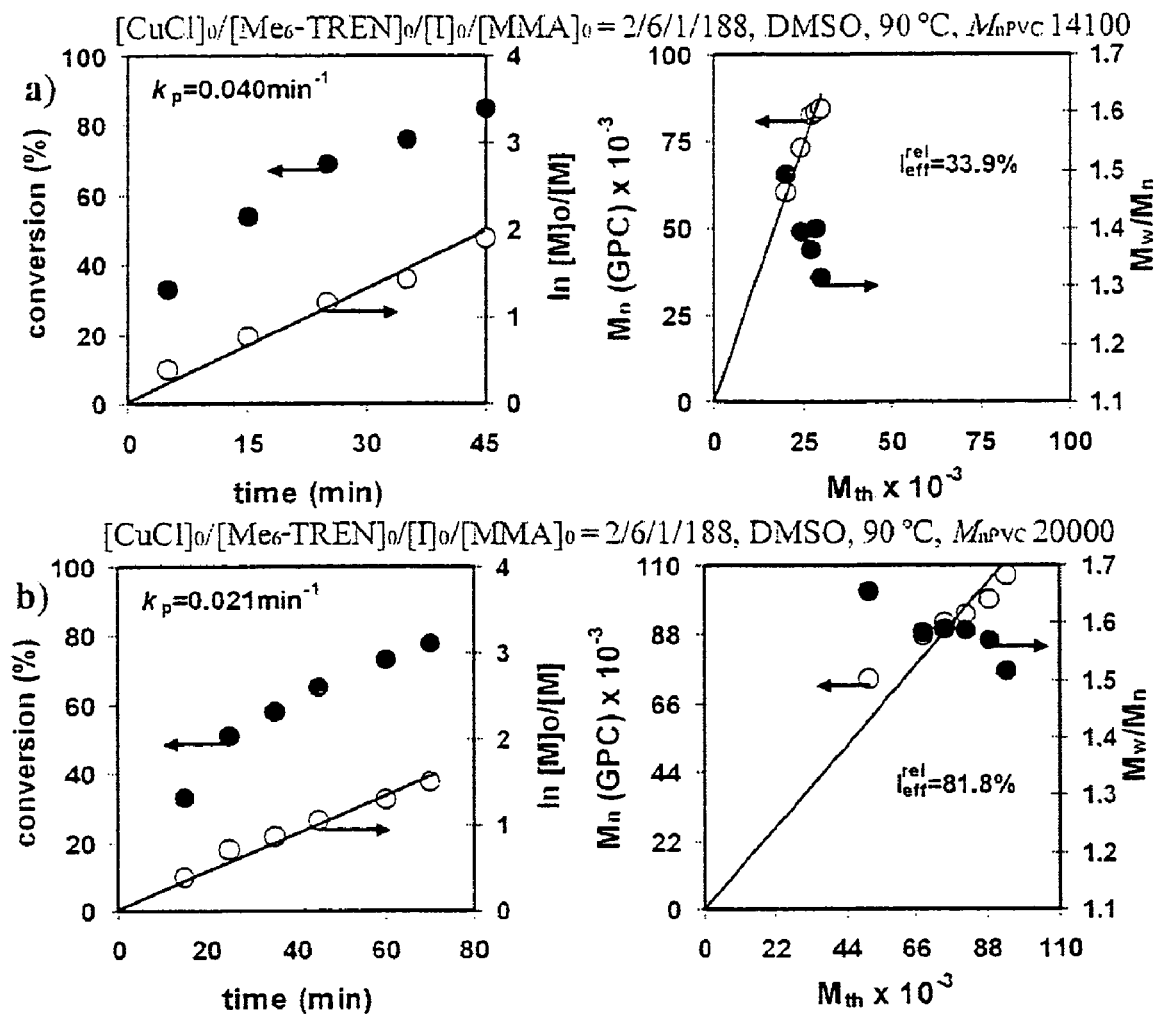
FIG. II-6

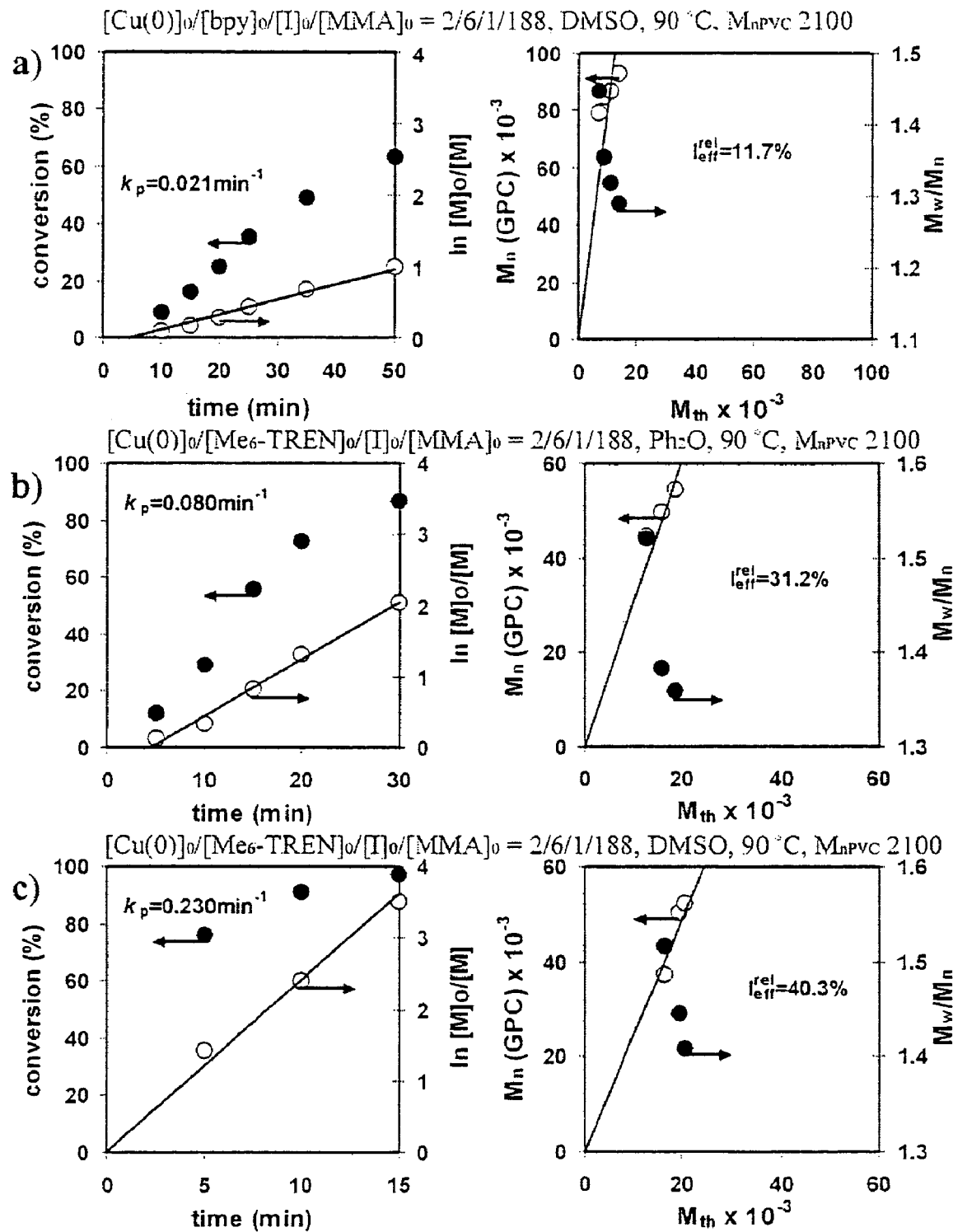
FIG. III-1

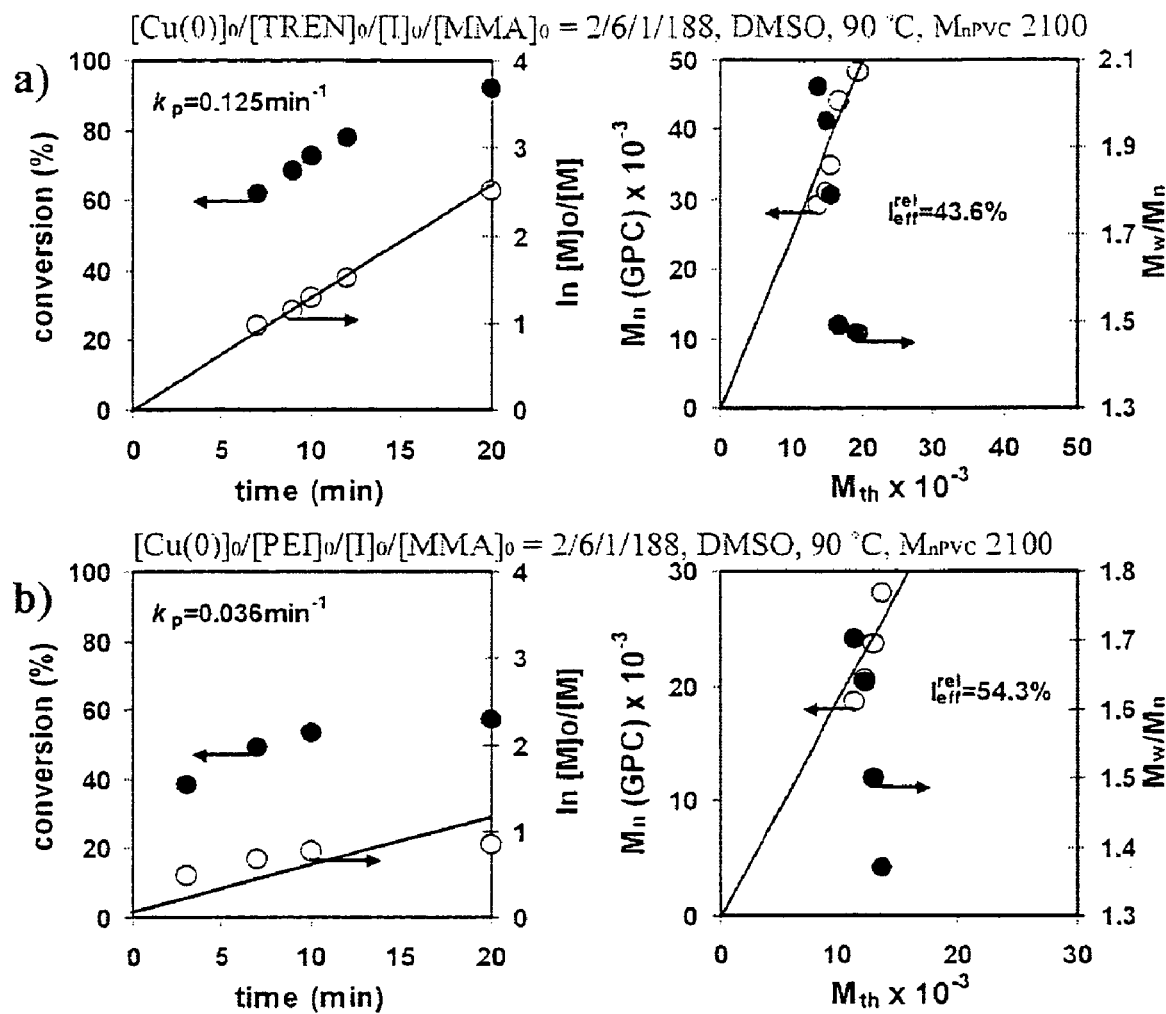
FIG. III-2

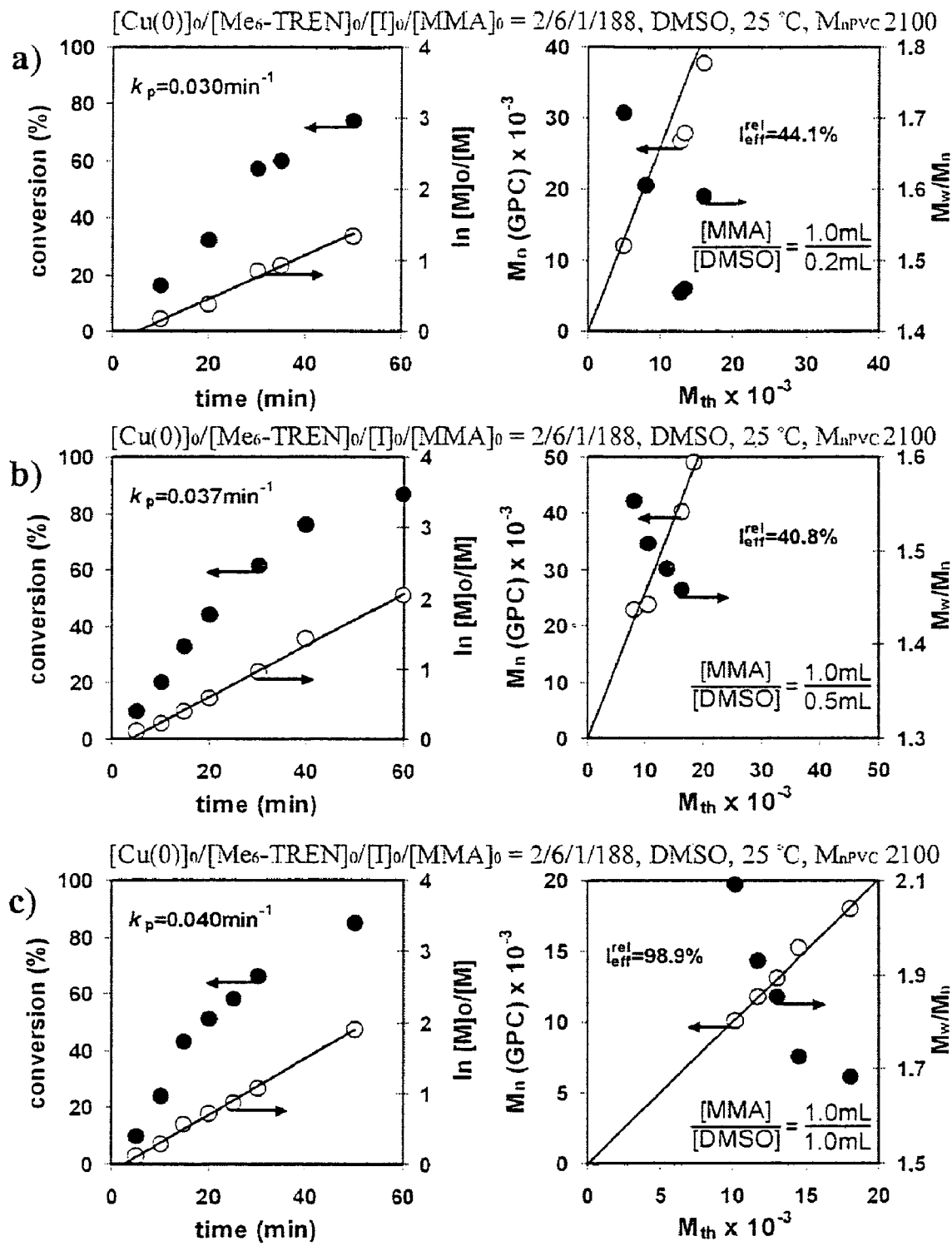
FIG. III-3

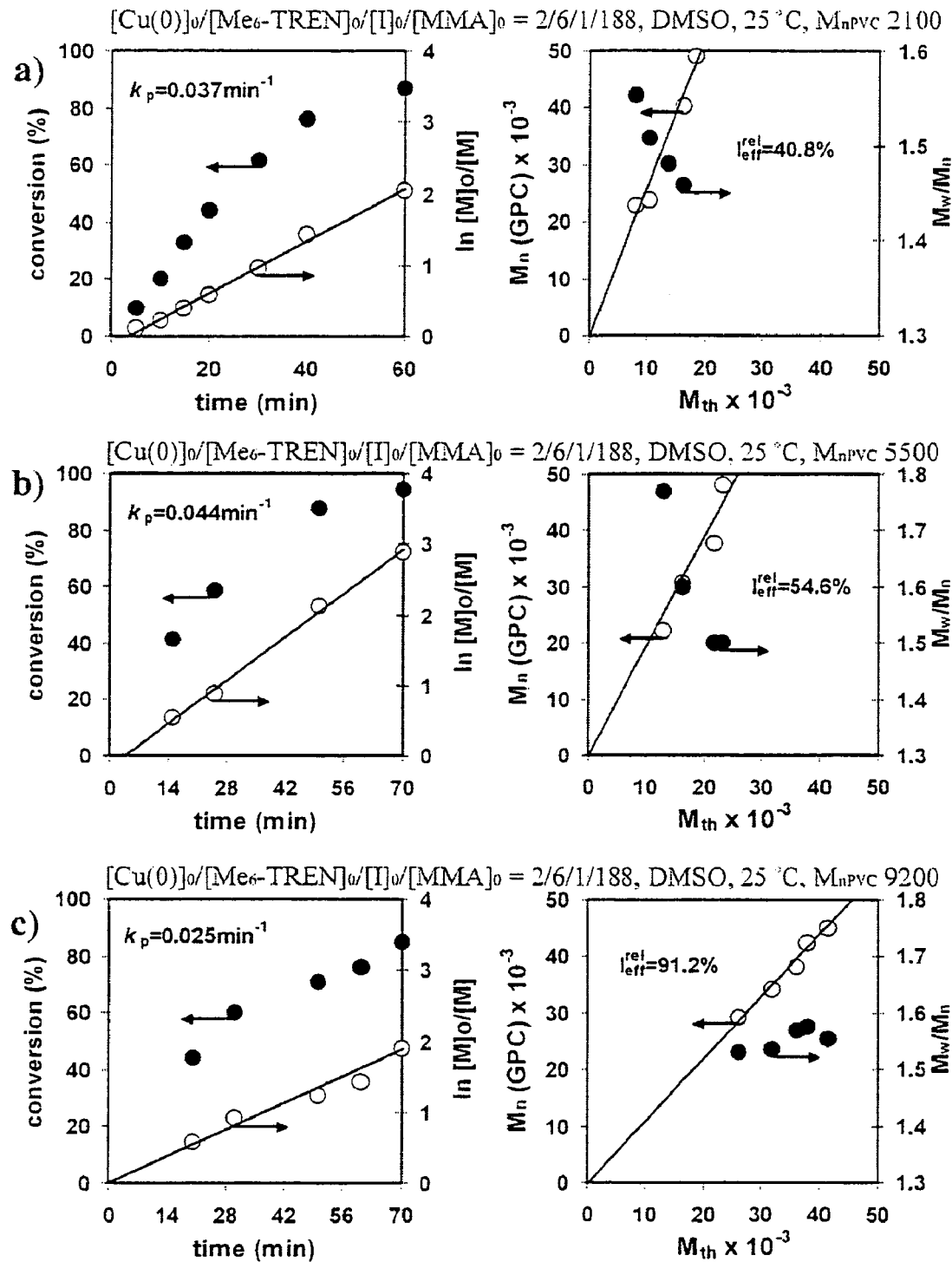
FIG. III-4

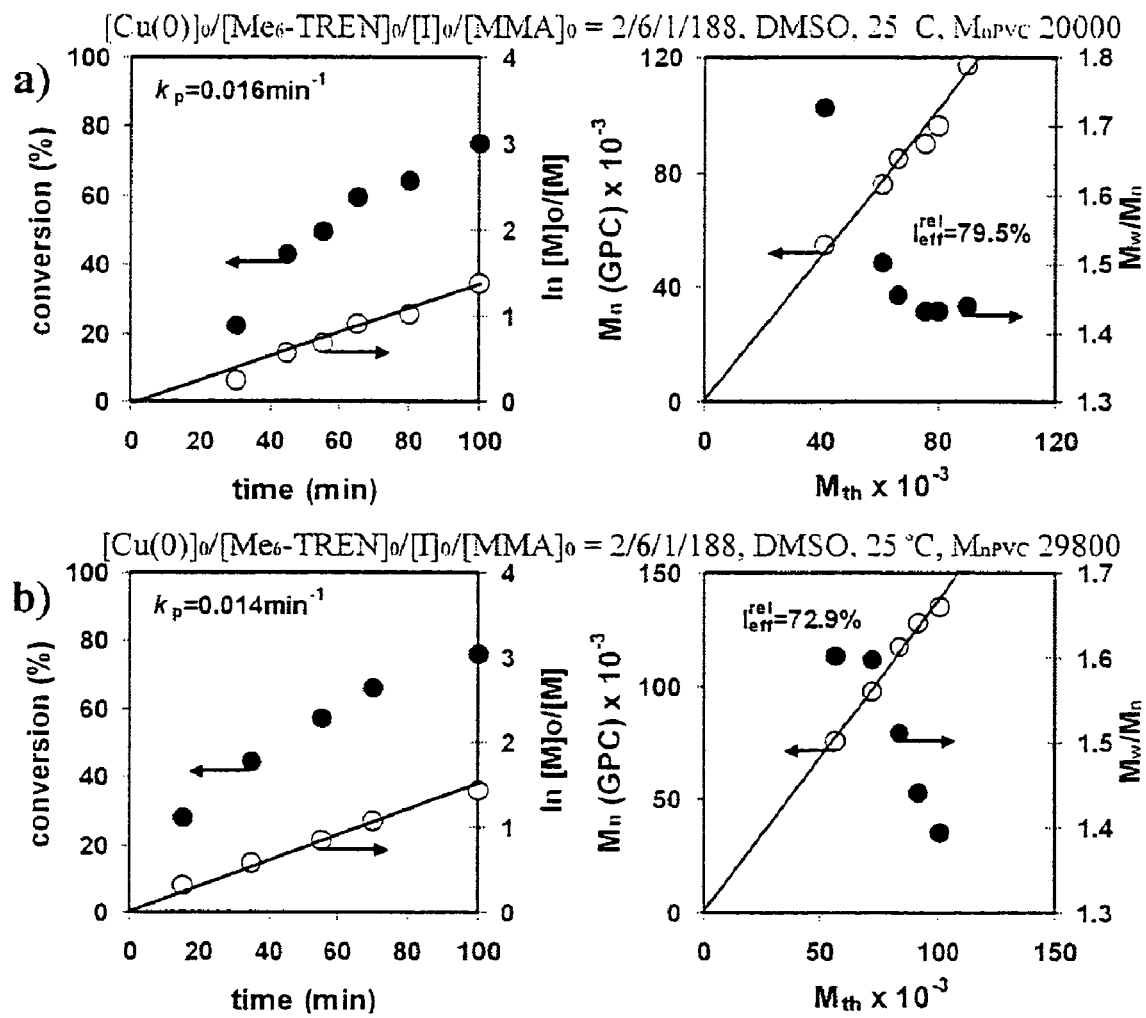
FIG. III-5

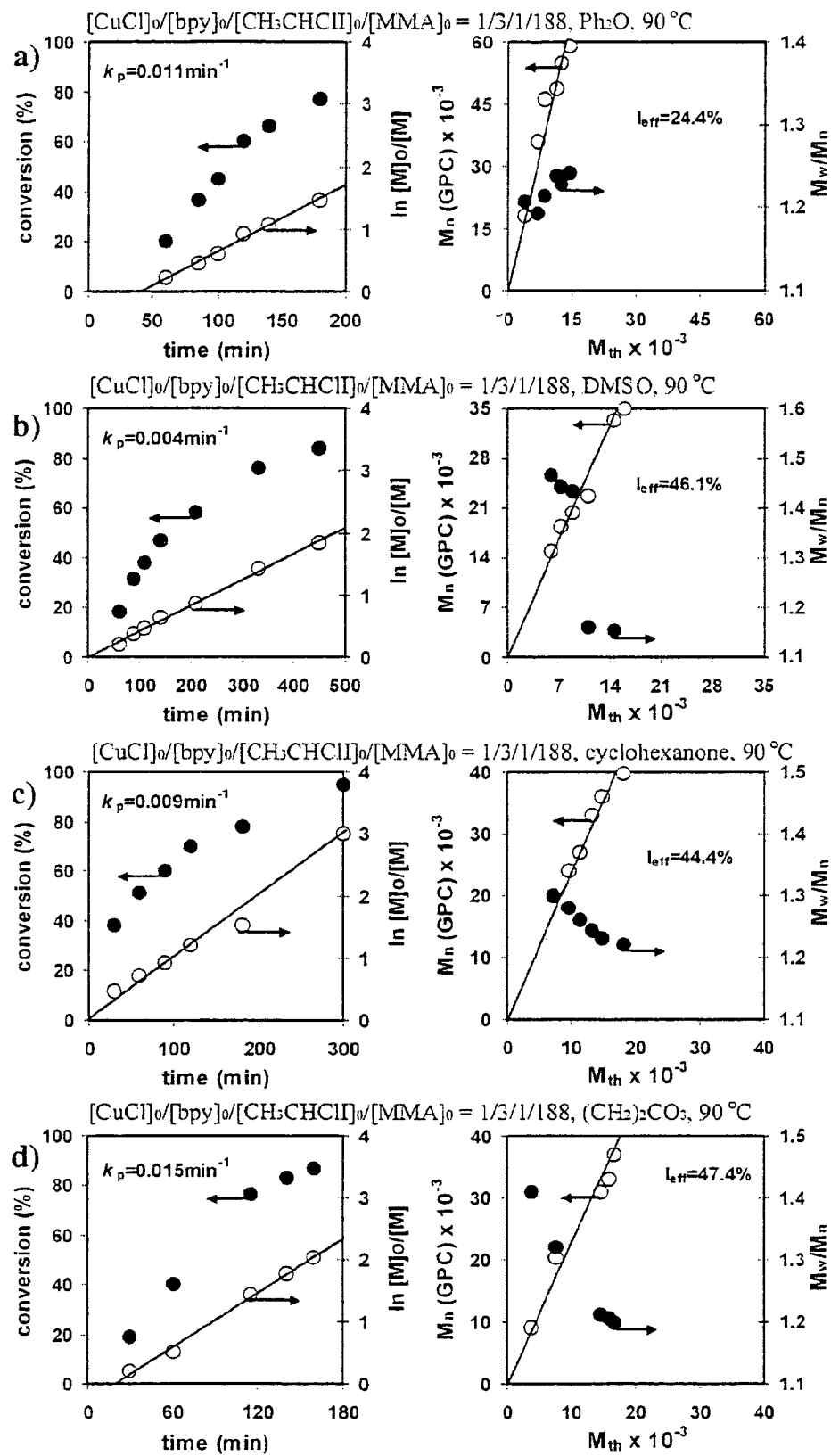
FIG. IV-1

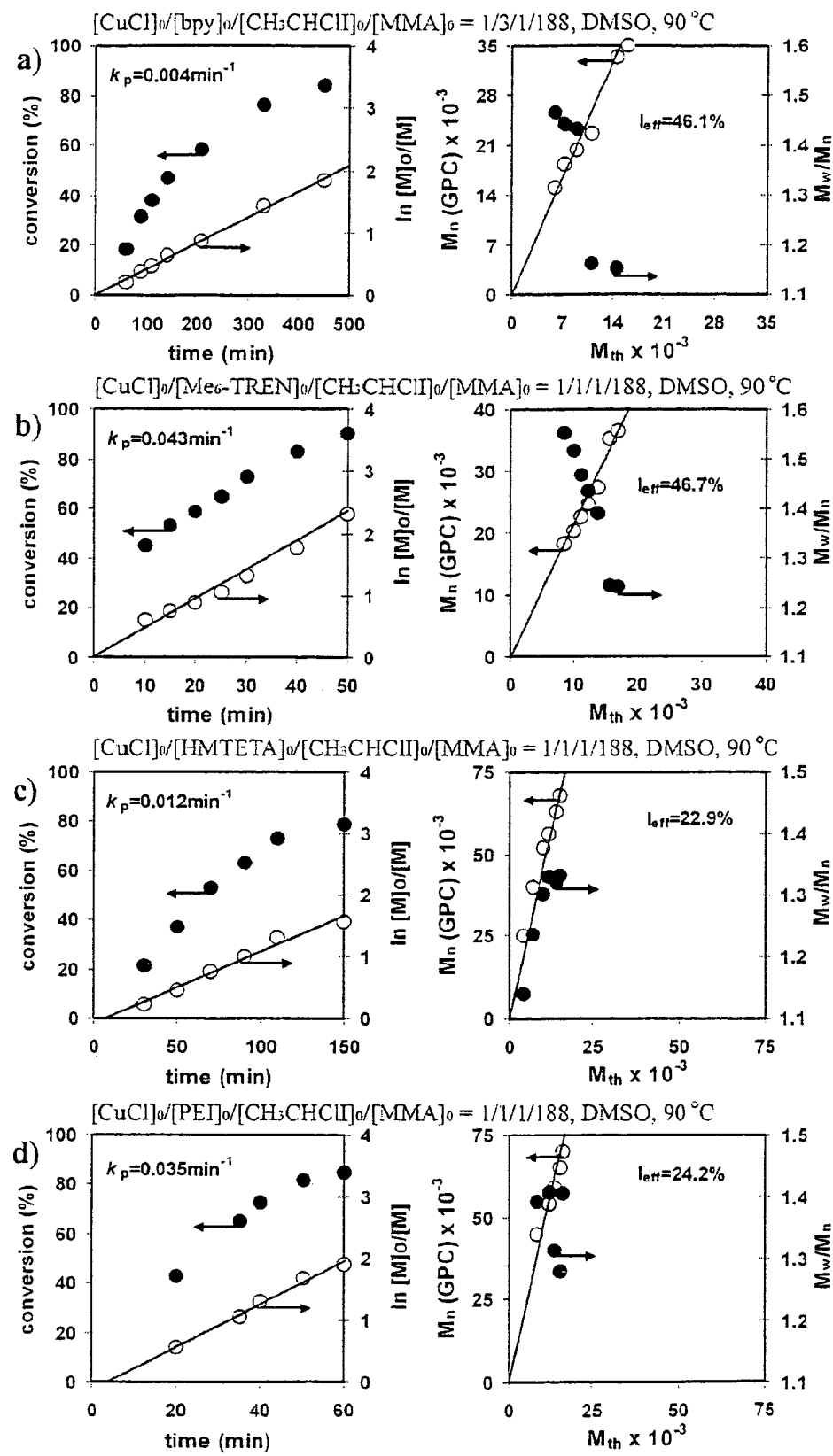
FIG. IV-2

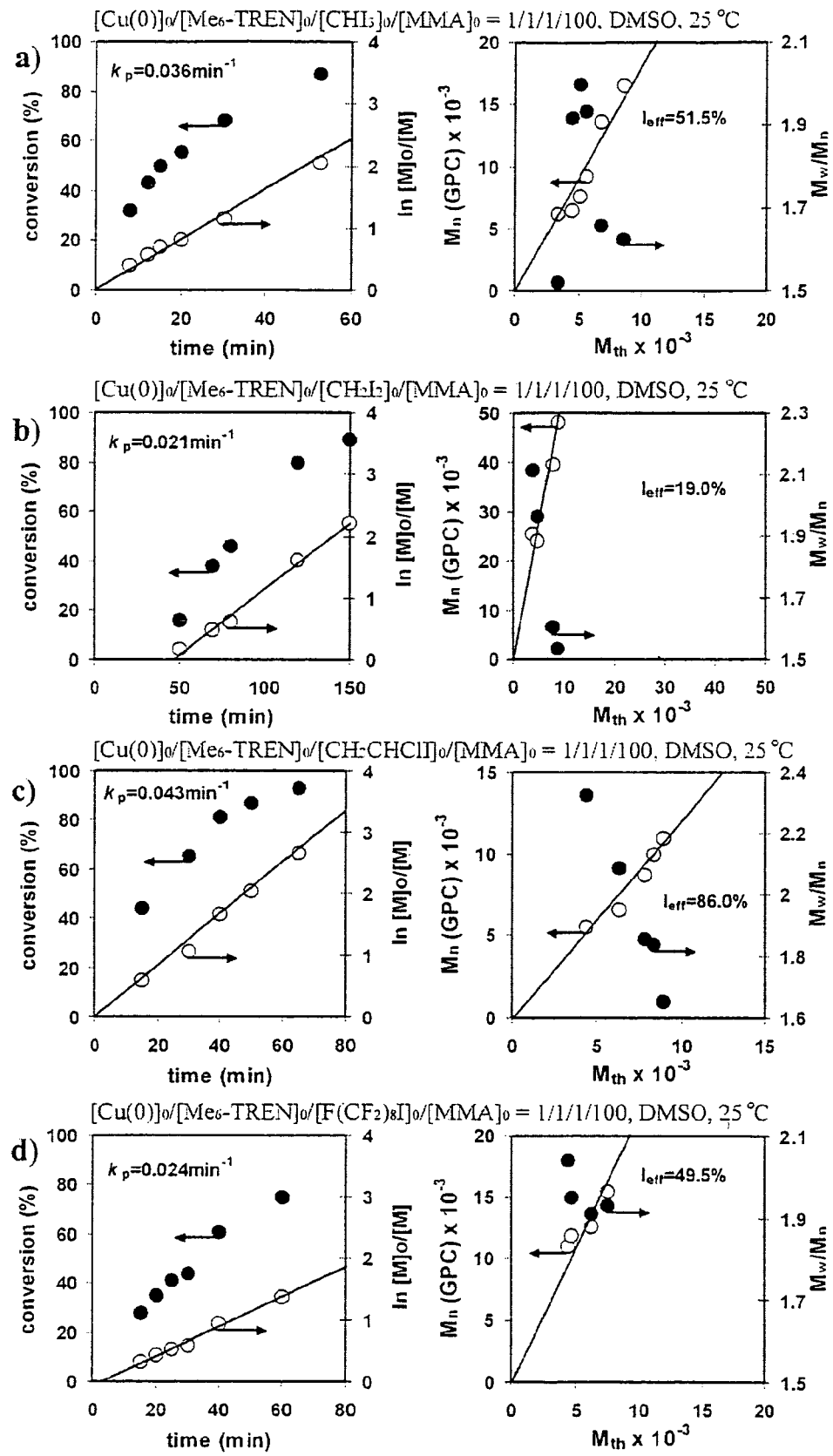
FIG. IV-3

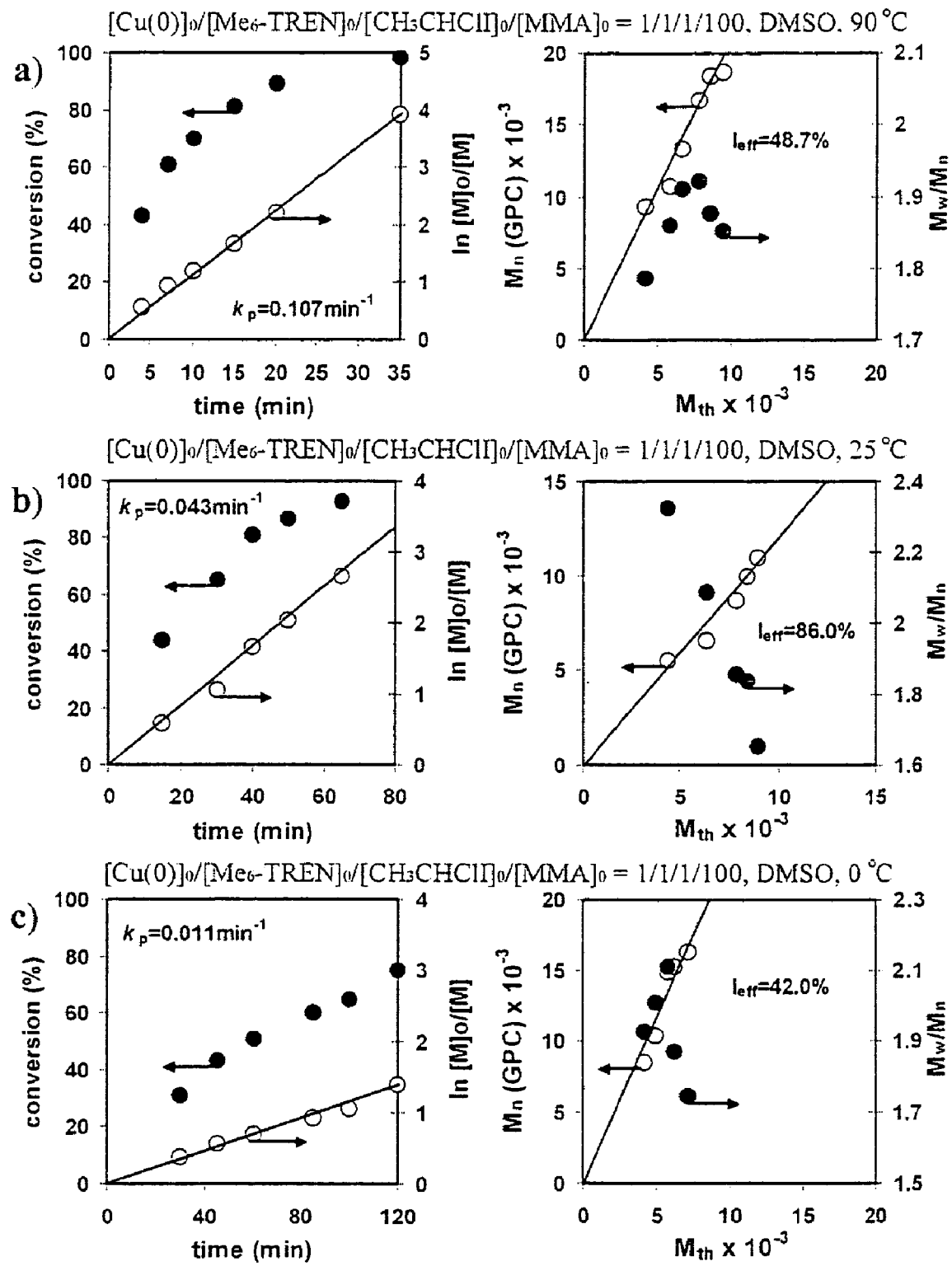
FIG. IV-4

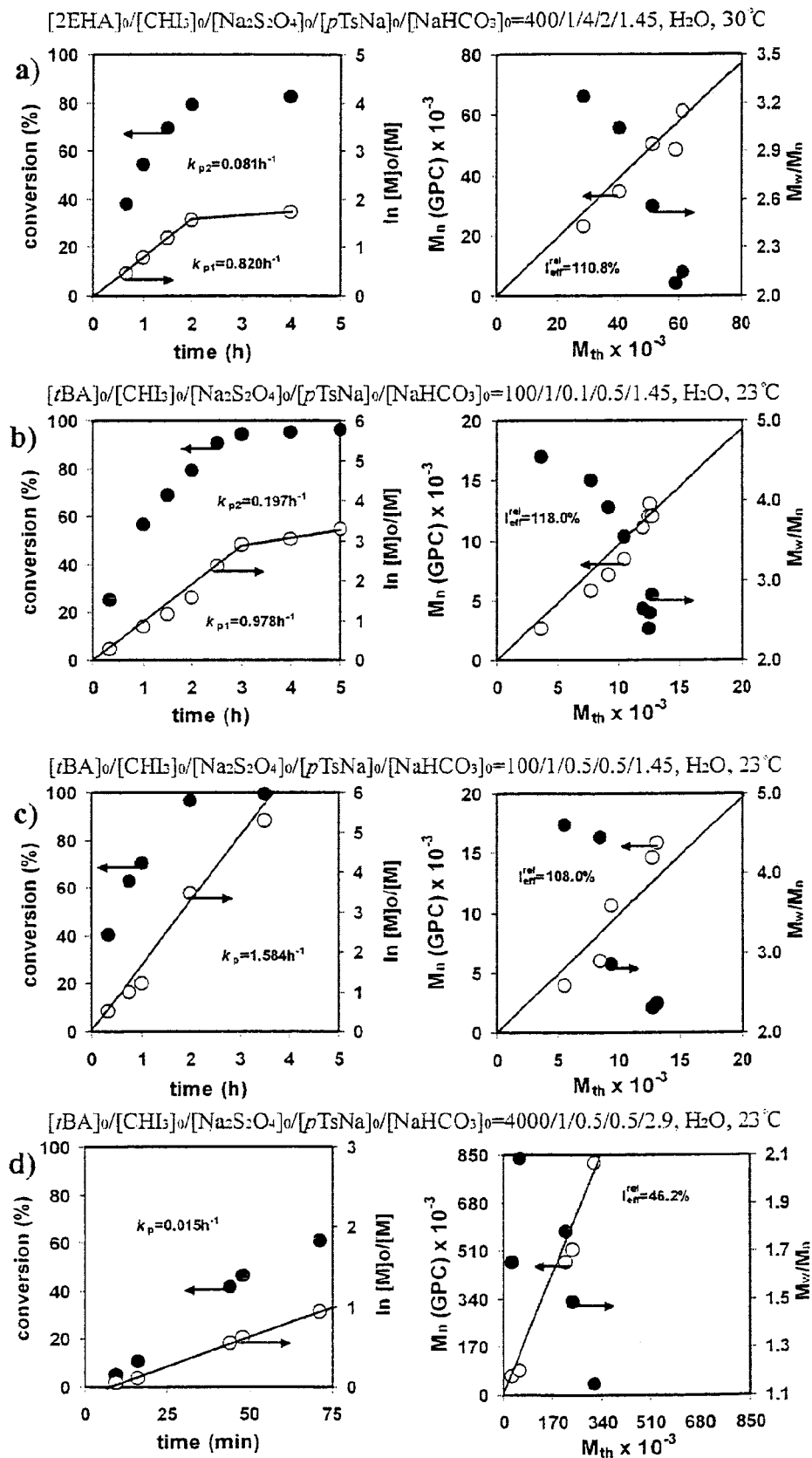
FIG. V-1

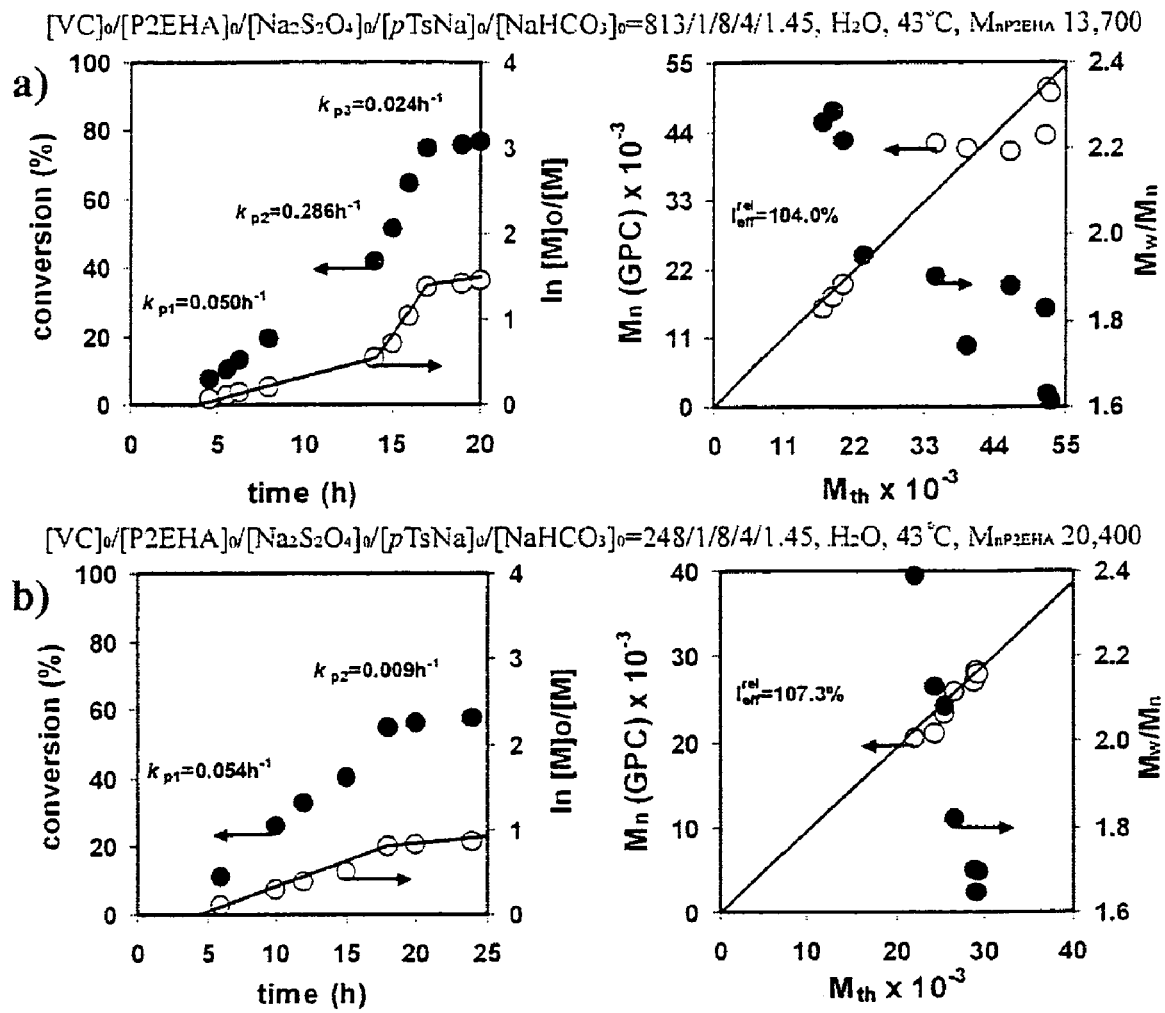
FIG. VI-1

US 7,345,127 B2

LIVING RADICAL POLYMERIZATION OF HALOGEN-CONTAINING AND ACRYLIC MONOMERS AND THE FORMATION OF BLOCK COPOLYMERS THEREFROM

CROSS REFERENCE TO RELATED APPLICATION

This application is a continuation-in-part of U.S. application Ser. No. 10/179,584, filed Jun. 24, 2002 now U.S. Pat. No. 6,911,515 which, in turn, is a continuation-in-part of U.S. application Ser. No. 09/893,201 filed Jun. 27, 2001, now U.S. Pat. No. 6,838,535 which claims the benefit of U.S. Provisional Application 60/278,114 filed Mar. 23, 2001.

BACKGROUND OF THE INVENTION

1. Field of the Invention

The present invention relates to living radical polymerization of halogen-containing and acrylic monomers utilizing organo halide initiators and to the formation of block copolymers therefrom. More specifically, the invention relates to the utilization of metal or metal free catalysts for the polymerization of various acrylic monomers in the presence of the halogen-containing polymer having initiators thereon and in suitable diluents to form AB or $A_n$B type block copolymers where A is derived from an acrylic monomer, B is a halogen-containing polymer, and n is from 1 to about 6. Generally, narrow molecular weight distributions are obtained along with high high conversion and rapid or ultrafast block copolymerization reactions. The present invention also relates to an initial formation of an A block derived from acrylic monomers utilizing organohalide initiators and to the subsequent polymerization of vinyl halide monomers therein to form BA or $B_m$A block copolymers where B is halogen containing block and m is 1 to 6.

2. Description of the Prior Art

Heretofore, it was known to polymerize vinyl chloride (VC) and other vinyl halide monomers using conventional free radical processes. However, even in the presence of certain molecular weight additives, there is limited control over the molecular weight and polydispersity of the resulting polymer. In addition, VC polymers are thermally unstable and require thermal stabilizers for their practical use. Heretofore, there have been no methods reported to prepare poly(vinyl chloride) by a non-metal-catalyzed living process initiated from an active halide compound in which the molecular weight and the molecular weight distribution of PVC could be controlled.

Conventional free radical polymerization of vinyl chloride (VC) is accompanied by the formation of thermally labile tertiary and allylic chlorine defects which are responsible for the low thermal stability of poly(vinyl chloride). This provides its most relevant technological limitations. These structural defects are generated during the conventional radical polymerization of VC and are responsible for the initiation of a zipper mechanism of thermal degradation of PVC.

In U.S. patent Ser. No. 09/893,201, which is herein fully incorporated by reference, there is described a process for the living radical polymerization of vinyl halides utilizing a metal (preferably Cu) catalyst. The polymerization processes taught therein include both non-aqueous high temperature and aqueous room temperatures processes. The former gives polymers with low yields (maximum 30%) and high molecular weight distribution up to about 1.7. The latter achieves high conversions and lower molecular weight distribution (up to 1.50). Both processes show linear molecular weight dependence on the monomer conversion. A single electron transfer mechanism mediated by metals is proposed for the initiation and dormant species activation steps.

The PVC obtained by aqueous room temperature copper-catalyzed living radical polymerization of vinyl chloride as described in U.S. patent Ser. No. 09/893,201, contains a vanishingly small amount of carbon-carbon double bonds in comparison with conventional PVC. This allows us to consider such a polymer as one free of at least allylic chlorine defects that could lead to new properties. Alternatively, the use of heavy metal in polymerization processes requires an additional utilization of the spent catalyst and purification of the polymer, thereby increasing the cost.

Previously, attempts on living radical polymerization of vinyl halides, which did not involve metal catalysis, were based on degenerative chain transfer processes using iodine containing chain transfer agents and peroxy-esters as initiators. As is taught in U.S. Pat. No. 5,455,319, such a process was carried out at temperatures conventionally used for vinyl halide polymerizations. In addition, the polydispersity never decreased to values below 1.7.

SUMMARY OF THE INVENTION

There has now been found a process for the formation of block copolymers of halogen-containing polymers such as PVC utilizing various metal or non-metal catalysts and the living radical block copolymerization of various types of acrylic monomers such as alkyl acrylates or alkyl alkacrylate monomers. Such block copolymers contain at least one A block and at least one B block. The catalysts are desirably metal containing organo catalysts such as copper in combination with nitrogen containing ligands and the acrylic monomers are initiated with organo halide compounds such as various iodo, or diiodo, or multi iodo terminated polymers such as PVC. Suitable organo type diluents are utilized in the copolymerization and formation of the block copolymers can be rapidly synthesized. A notable aspect of the present invention is that the block copolymers have only one $T_g$ and depending on the type acrylic block the $T_g$ is either greater than 100° C. and thus serve as enginerring plastics having high heat distortion temperatures or lower than 20° C. and represent internally self-plastisized elastomers that can be utilized to replace plasticized poly(vinyl chloride) and other elastomers.

There has also been found a process for living radical block polymerization of various acrylic monomers utilizing either various metal or metal-free catalysts in the presence of organic halide initiators and the subsequent polymerization of halogen-containing monomers utilizing either metal or metal-free to form block copolymers thereof. Such block copolymers have also only one $T_g$ which depending on acrylic block is greater than 100° C. and thus serve as enginerring plastics having high heat distortion temperatures or lower than 20° C. and represent internally self-plastisized elastomers that can be utilized to replace plasticized poly (vinyl chloride) and other elastomers.

DESCRIPTION OF THE DRAWINGS

FIG. I-1 relates to the Influence of Temperature on Cu(O)/Me$_6$-TREN Catalyzed Living Radical Polymerization of MA Initiated from α,ω-Di(Iodo)PVC (I) with $M_n$=2,100, $M_w/M_n=1.84$ in DMSO. $[Cu(O)]_0/[Me_6\text{-}TREN]_0/[I]_0/[MA]_0=2/2/1/111$ (molar ratios). (a) 90° C.; (b) 50° C.; (c) 25° C.;

FIG. II-1 relates to the Influence of the Copper Derivative on Copper Derivative/bpy Catalyzed Living Radical Block Copolymerization of MMA Initiated from α,ω-Di(Iodo)PVC (I) with $M_n=2,100$. (a) $[CuCl]_0/[bpy]_0/[I]_0/[MMA]_0=2/6/1/188$ (molar ratios) in $Ph_2O$ at 90° C.; (b) $[Cu(O)]_0/[bpy]_0/[I]_0/[MMA]_0=2/6/1/188$ (molar ratios) in DMSO at 90° C.; (c) $[Cu_2Te]_0/[bpy]_0/[I]_0/[MMA]_0=2/6/1/188$ (molar ratios) in $Ph_2O$ at 90° C.;

FIG. II-2 relates to the Influence of Solvent on CuCl/bpy Catalyzed Living Radical Block Copolymerization of MMA Initiated™ from α,ω-Di(Iodo)PVC (I) with $M_n=2,100$ at 90° C., $[CuCl]_0/[bpy]_0/[I]_0/[MMA]_0=2/6/1/188$ (molar ratios): (a) $Ph_2O$; (b) DMSO; (c) cyclohexanone, (d) ethylene carbonate $(CH_2)_2CO_3$;

FIG. II-3 relates to the influence of Ligand on CuCl/Ligand Catalyzed Living Radical Block Copolymerization of MMA Initiated from α,ω-Di(Iodo)PVC (I) with $M_n=2,100$ at 90° C., $[CuCl]_0/[Ligand]_0/[I]_0/[MMA]_0=2/6/1/188$ (molar ratios): (a) bpy in DMSO; (b) $Me_6$-TREN in DMSO; (c) $Me_6$-TREN in $Ph_2O$, (d) HMTETA in DMSO;

FIG. II-4 relates to the influence of Ligand on CuCl/Ligand Catalyzed Living Radical Block Copolymerization of MMA Initiated from α,ω-Di(Iodo)PVC (I) with $M_n=2,100$ in DMSO at 90° C.: $[CuCl]_0/[Ligand]_0/[I]_0/[MMA]_0=2/6/1/188$ (molar ratios). (a) PEI in DMS; (b) MePEI; (c) No Ligand;

FIG. II-5 relates to the CuCl/$Me_6$-TREN Catalyzed Living Radical Block Copolymerization of MMA Initiated from α,ω-Di(Iodo)PVC (I) with Different $M_n$ in DMSO at 90° C. $[CuCl]_0/[Me_6\text{-}TREN]_0/[I]_0/[MMA]_0=2/611/1188$ (molar ratios). (a) $M_n=2,100$; (b) $M_n=5,500$; (c) $M_n=9,200$;

FIG. II-6 relates to the CuCl/$Me_6$-TREN Catalyzed Living Radical Block Copolymerization of MMA Initiated from α,ω-Di(Iodo)PVC (I) with Different $M_n$ in DMSO at 90° C. $[CuCl]_0/[Me_6\text{-}TREN]_0/[I]_0/[MMA]_0=2/6/1/188$ (molar ratios). (a) $M_n=14,100$; (b) $M_n=20,000$;

FIG. III-1 relates to the influence of Ligand on Cu(O)/Ligand Catalyzed Living Radical Block Copolymerization of MMA Initiated from α,ω-Di(Iodo)PVC (I) with $M_n=2,100$ in DMSO at 90° C.: $[Cu(O)]_0/[Ligand]_0/[I]_0/[MMA]_0=2/6/1/188$ (molar ratios). (a) bpy; (b) $Me_6$-TREN (in $Ph_2O$); (c) $Me_6$-TREN;

FIG. III-2 relates to the influence of Ligand on Cu(O)/Ligand Catalyzed Living Radical Block Copolymerization of MMA Initiated from α,ω-Di(Iodo)PVC (I) with $M_n=2,100$ in DMSO at 90° C.: $[Cu(O)]_0/[Ligand]_0/[I]_0/[MMA]_0=2/6/1/188$ (molar ratios). (a) TREN; (b) PEI;

FIG. III-3 relates to the Influence of Added DMSO on Cu(O)/$Me_6$-TREN Catalyzed Living Radical Block Copolymerization of MMA Initiated from α,ω-Di(Iodo)PVC (I) with $M_n=2,100$ in DMSO at 25° C.: $[Cu(O)]_0/[Me_6\text{-}TREN]_0/[I]_0/[MMA]_0=2/6/1/188$ (molar ratios). (a) [MMA]/[DMSO]=1.0/0.2 (mL/mL); (b) [MMA]/[DMSO]=1.0/0.5 (mL/mL); (c) [MMA]/[DMSO]=1.0/1.0 (mL/mL);

FIG. III-4 relates to the Cu(O)/$Me_6$-TREN Catalyzed Living Radical Block Copolymerization of MMA Initiated from α,ω-Di(Iodo)PVC (I) with Different $M_n$ in DMSO at 25° C. $[Cu(O)]_0/[Me_6\text{-}TREN]_0/[I]_0/[MMA]_0=2/6/1/188$ (molar ratios): (a) $M_n=2,100$; (b) $M_n=5,500$; (c) $M_n=9,200$;

FIG. III-5 relates to the Cu(O)/$Me_6$-TREN Catalyzed Living Radical Block Copolymerization of MMA Initiated from α,ω-Di(Iodo)PVC (I) with Different $M_n$ at 25° C. $[Cu(O)]_0/[Me_6\text{-}TREN]_0/[I]_0/[MMA]_0=2/6/1/188$ (molar ratios). (a) $M_n=20,000$; (b) $M_n=5,500$;

FIG. IV-1 relates to the Influence of Solvent on CuCl/bpy Catalyzed Living Radical Polymerization of MMA Initiated with $CH_3CHClI$ (I) at 90° C., $[CuCl]_0/[bpy]_0/[I]_0/[MMA]_0=1/3/1/188$ (molar ratios): (a) $Ph_2O$; (b) DMSO; (c) cyclohexanone, (d) ethylene carbonate $(CH_2)_2CO_3$;

FIG. IV-2 relates to the influence of Ligand on CuCl/Ligand Catalyzed Living Radical Block Copolymerization of MMA Initiated with $CH_3CHClI$ (I) in DMSO at 90° C., $[CuCl]_0/[I]_0/[MMA]_0=1/1/188$ (molar ratios): (a) bpy, $[CuCl]_0/[bpy]_0=1/3$ (molar ratio); (b) $Me_6$-TREN, $[CuCl]_0/[Me_6\text{-}TREN]_0=1/1$ (molar ratio); (c) HMTETA, $[CuCl]_0/[HMTETA]_0=1/1$ (molar ratio); (d) PEI, $[CuCl]_0/[PEI]_0=1/1$ (molar ratio);

FIG. IV-3 relates to the Influence of Initiator (I) on Cu(O)/$Me_6$-TREN Catalyzed Living Radical Polymerization of MMA in DMSO at 25° C.: $[Cu(O)]_0/[Me_6\text{-}TREN]_0/[I]_0/[MMA]_0=1/1/1/100$ (molar ratios). (a) $CHI_3$; (b) $CH_2I_2$; (c) $CH_3CHClI$; (d) $F(CF_2)_8I$;

FIG. IV-4 relates to the Influence of Temperature on Cu(O)/$Me_6$-TREN Catalyzed Living Radical Polymerization of MMA Initiated with $CH_3CHClI$ in DMSO at 25° C.: $[Cu(O)]_0/[Me_6\text{-}TREN]_0/[CH_3CHClI]_0/[MMA]_0=1/1/1/100$ (molar ratios). (a) 90° C.; (b) 25° C.; (C) 0° C.;

FIG. V-1 relates to the $Na_2S_2O_4/NaHCO_3$-catalyzed SET-DTLRP of acrylates initiated with $CHI_3$ in $H_2O$ in the presence of surfactants Methocel F50 (MF50) and PVA 88, [acrylate]/$[H_2O]$=1/3 (v/v): (a) $[2EHA]_0/[CHI_3]_0/[Na_2S_2O_4]_0/[pTsNa]_0/[NaHCO_3]_0=400/1/412/1.45/$(molar ratios); [MF50]/[PVA 88]=420/980 (ppm/ppm, w/w relative to 2EHA), 30° C.; (b) $[tBA]_0/[CHI_3]_0/[Na_2S_2O_4]_0/[pTsNa]_0/[NaHCO_3]1=100/1/0.1/0.5/1.45$ (molar ratios); [MF50]/[PVA 88]=210/490 (ppm/ppm, w/w relative to tBA), 23° C.; (c) $[tBA]_0/[CHI_3]_0/[Na_2S_2O_4]_0/[pTsNa]_0/[NaHCO_3]_0=100/1/0.5/0.5/1.45$ (molar ratios); [MF50]/[PVA 88]=210/490 (ppm/ppm, w/w relative to tBA), 23° C.; (d) $[tBA]_0/[Na_2S_2O_4]_0/[CHI_3]_0/[pTsNa]_0/[NaHCO_3]_0=4,000/1/0.5/0.5/2.9$ (molar ratios), water, 23° C., [MF50]/[PVA88]=210/490 (ppm/ppm, w/w relative to tBA); and FIG. VI-1 relates to the $Na_2S_2O_4/NaHCO_3$ catalyzed single electron transfer—degenerative chain transfer living radical block copolymerization of VC initiated from α,ω-di(iodo)P2EHA in water at 43° C. in the presence of suspension agents Methocel F50 and PVA 88 ([MF50]/[PVA 88]=1260 ppm/2940 ppm w/w relative to VC); $[P2EHA]_0/[Na_2S_2O_4]_0/[pTsNa]_0/[NaHCO_3]_0=1/8/4/1.45$ (molar ratios): (a) $M_{nP2EHA}=13,700$, $M_w/M_n=2.42$, $[VC]_0/[P2EHA]_0=813/1$ (molar ratio); (b) $M_{nP2EHA}=20,400$, $M_w/M_n=2.52$, $[VC]_0/[P2EHA]_0=248/1$ (molar ratio).

DETAILED DESCRIPTION OF THE INVENTION

The preparation of metal-catalyzed polymerization or copolymerization of vinyl halide monomers will be discussed followed by non-metalic catalyzed polymerization or copolymerization of one or more reactions of vinyl halide monomers. Examples of suitable vinyl halide monomers include various chlorine containing monomers such as vinyl chloride, vinylidene chloride, 2-chloropropene, 2-chloropropine, and various fluorine containing monomers such as tetrafluoroethylene, chlorotrifluoroethylene, 1-chloro-1-fluoroethylene, vinyl fluoride, vinylidene fluoride, tetrafluoroethylene with ethylene, perfluoropropyl vinyl ether, and perfluoropropylene or combinations thereof. Vinyl chloride monomers are preferred.

In another embodiment of the invention, block copolymers are derived from an initiator terminated halogen-containing polymer such as PVC made with either a metal catalyst or a non-metal catalyst with organo halide initiators. Still another embodiment relates to the formation of block copolymers derived from acrylic monomers utilizing either metal catalysts or a metal-free catalyst in the presence of organo halide initiators. A further embodiment relates to the formation of block copolymers derived from an initiator terminated acrylic polymer made with a metal catalyst or a metal-free catalyst with organo halide initiators.

Halogen Containing Polymers

Metal Catalyzed Polymerization of Vinyl Halide Monomers

In the metal-catalyzed polymerization of one or more chlorine containing monomers, appropriate initiators include halides and pseudohalides of the formula R—X, where R having from 1 to 100,000 carbon atoms, contains an activating electron withdrawing group such as cyano, ester, perfloroalkyl or any other unit capable of stabilizing a radical such as benzyl or allyl, and X=halide. The halide initiators include, but are not limited to various activated mono, di, tri and polyfunctional α,α-dihaloalkanes, α,α,α-trihaloalkanes, perhaloalkanes, perfloroalkyl halides, benzyl halides, allyl halides, sulfonyl halides, α-haloesters, α-halonitriles, α-haloketones, imidyl halides, or combinations thereof. Additionally, any compound having labile carbon-halide, nitrogen-halide, sulfur-halide, phosporus-halide, silicon-halide bonds which can dissociate homolytically by themselves or in the presence of a metal catalyst are suitable for use as initiators in the present invention. Suitable structures for initiators utilized in the present invention are set forth in Scheme 3.

Generally, preferred initiators include chlorine, bromine and thiocyanate containing compounds, with iodide initiators being desirable. Mono, di and trifunctional α-haloesters act as active initiators for the polymerization of vinyl chloride in the presence of Fe(O), TiCp$_2$Cl$_2$ and Cu(O) and its salts such as Cu$_2$Te, Cu$_2$Se, Cu$_2$S, CuO, CuCl, CuBr, CuI and copper thiophenoxide (CuSPh), copper butanethiolate (CuSBu), copper phenylacetylide (CuC≡CPh). Various chlorine containing initiators such as CH$_3$CH(CN)Cl, Cl—CH$_2$-Ph-CH$_2$—Cl or R—CH=CH—CH$_2$—Cl and R—SO$_2$—Cl also promote the polymerization of chlorine containing monomers in the presence of catalysts such as Cu(O) and its salts, Fe(O) and TiCp$_2$Cl$_2$. The preferred initiators that lead to polymers of narrowest molecular weight distribution in the presence of Cu(O) and its salts or complexes are the active iodine containing substrates of the type R$_1$R$_2$R$_3$C—I where at least one of the R substituents is an electron withdrawing group (EWG) or radical stabilizing group such as benzylic, allylic, α-halo, α-cyano, α-ester, α-trifluoromethyl and so on. The other R substituents can be H, alkyl chains including polymer chains, electron withdrawing groups and combinations thereof. The preferred iodine containing initiators include: I—CH$_2$-Ph-CH$_2$—I, CH$_3$—CH(Cl)—I, CH$_2$I$_2$, CHI$_3$, CI$_4$, CH$_2$=CH—CH$_2$—I, CF$_3$—(CF$_2$)$_n$—I, I—CH$_2$—CONH$_2$ and I—CH$_2$—COO—(CH$_2$)$_n$—H (n=1-20).

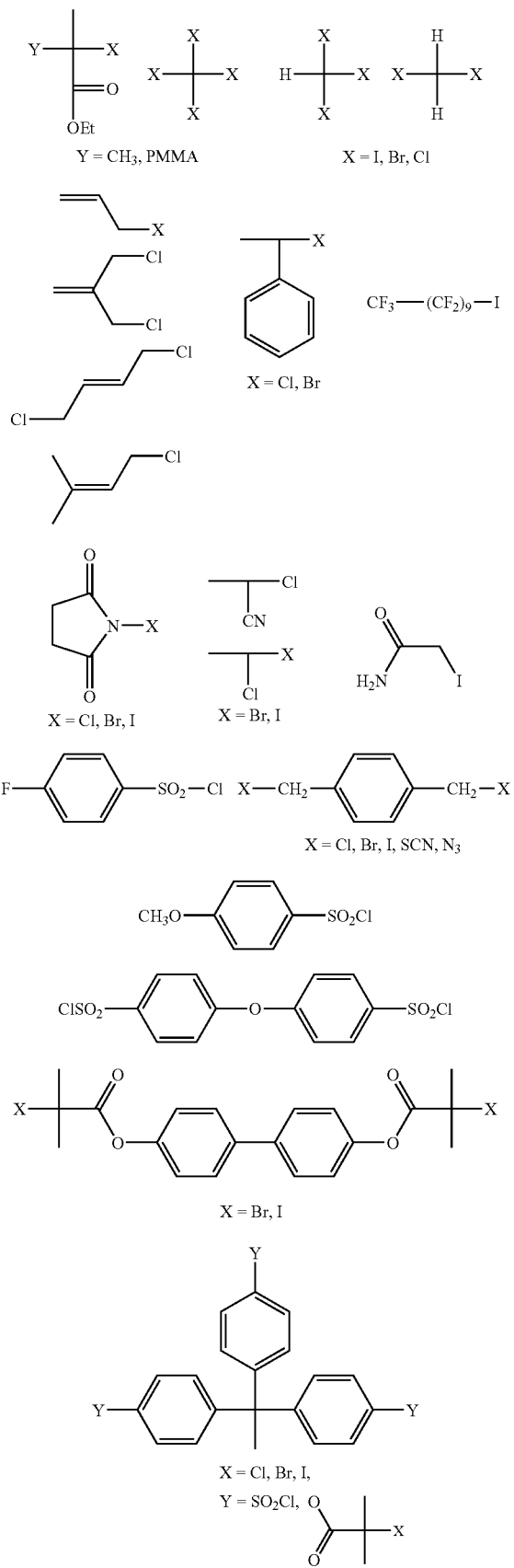

-continued

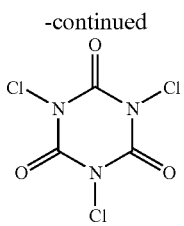

The amounts of such halide initiators utilized depend on the desired molecular weight of the halide containing polymer and are generally from about 5,000 to about 10, desirably from about 1000 to about 25, and preferably from about 500 to about 50 moles of halide containing monomer per one mole of initiating group. Generally the number average molecular weight of the halide containing polymer will be from about 500 to about 100,000, desirably from about 1000 to about 60,000, and preferably from about 3,000 to about 40,000.

The one or more chlorine-containing monomers which are polymerized or copolymerized according to this invention are set forth above and preferably include vinyl chloride and its structurally related derivatives and monomers known to copolymerize via a radical mechanism with vinyl chloride, including vinylidene chloride and 2-chloropropene. The preferred carbon atom range of each group of monomers is from 2 to 20. The copolymer can have a comonomer content from 1% up to 99%, depending on the reactivity ratios of the comonomers used.

A metal species is utilized to catalyze the initiation reaction and continue the growth of the polymer chain. Typical radical forming catalysts include metal-based catalysts, as metals and/or salts thereof. Examples of such catalysts include metals in their zero oxidation state such as copper, iron, aluminum, cadmium, zinc, samarium, chromium, molybdenum, manganese, tungsten, cobalt, nickel, rhodium, ruthenium, palladium, titanium and certain higher valence salts thereof. The preferred catalyst will be dependent upon the initiator utilized and on the reaction media (such as solvent or water) and temperature. While the initiation step (addition of the radical fragment derived from the initiator to vinyl chloride) may be achieved with all catalysts, it is preferred that the metals be in their zero oxidation state for the metal catalyzed propagation and therefore, living radical polymerization to occur. Additionally, the catalyst may be a mixture of two or more metals in their zero oxidation state, a metal salt or complex, a mixture of two or more metal salts or complexes, or a mixture of two or more metals in their zero oxidation state with metal salts or complexes. Preferred catalysts include Cu(O), copper sulfide ($Cu_2S$), copper selenide ($Cu_2Se$), copper telluride ($Cu_2Te$) copper thiophenoxide (CuSPh), copper butanethiolate (CuSBu), copper phenylacetylide CuC≡CPh, Fe(O), and titanium cyclopentadienyl dichloride ($TiCP_2Cl_2$).

It has been found that Cu(O) is able to generate polymers regardless of the nature of the halide in the initiator. When Fe(O) is used as catalyst for the polymerization of vinyl chloride, it has been found that chlorine and bromine based initiators are suitable. The preferred initiators for Fe(O) are for example, the active $(CH_3)_2(COOEt)$—Br, $CH_3$—CH(Ph)—Br, F-Ph-$SO_2$—Cl, as well as the —$CH_2$—$(CH_3)$C(COOMe)—Cl chain end of PMMA synthesized by metal catalyzed living radical polymerization. For titanium-based catalysts such as $TiCp_2Cl_2$, chlorine containing initiators such as Cl—$CH_2$-Ph-$CH_2$—Cl and $CH_3CH(CN)$—Cl or $CH_2$=CH—$CH_2$—Cl are particularly suitable.

The amount of catalyst is dependent upon the desired reaction rate. Generally, the amount of catalyst will be from about 0.01 to about 10 desirably from about 0.75 to about 4, and preferably from about 1 to about 3 moles per mole of halide in the initiator.

A ligand can optionally be included in the polymerization reaction in order to aid in the solubilization of the catalyst. The ligand used will depend specifically and uniquely on the type of catalyst, the temperature of the reaction and on the reaction media such as solvent or water. The ligand can be any organic species capable of complexing the metal in its zero oxidation state and in its higher oxidation states. For Cu-based catalysts, the ligands can include basic aromatic and aliphatic nitrogen and phosphorus containing compounds such as 2,2'-bipyridyl (bpy) and its 4,4'-alkyl substituted compounds such as 4,4'-dinonyl-2,2'-bipyridyl (bpy-9), pentamethylene diethyl triamine, (PMDETA), tris(2-aminoethyl)amine (TREN), tris[2-(dimethylamino)ethyl] amine ($Me_6$-TREN), trialkylphosphine (alkyl $C_1$-$C_6$), triphenylphosphine, triphenylphosphine oxide, and combinations thereof. The foregoing ligands and 1,10-phenantroline are also appropriate for Fe-based catalysts. In addition, other ligands such as CO, acetylacetonate, or terpyridine may be used. The use of a ligand is not necessary for $TiCp_2Cl_2$ but is preferred for Cu and Fe based catalysts.

When the optional ligand is present, the mixture will usually contain from about 0.1 to about 10 moles of ligand per mole of catalyst, desirably from about 0.75 to about 3 moles of ligand per mole of catalyst, and preferably from about 1 to about 2 moles of ligand per mole of catalyst.

Additionally, various additives may optionally be utilized in the polymerization. Depending on their structure, these additives may affect the molecular weight and molecular weight distribution of the resulting polymer. Such additives can include sodium iodide, urea, $Al^iBu_3$, $Ti(OBu)_4$ and 2,6-di-tertbutyl-4-methylpyridine, with 2,6-di-tert-butyl-4-methylpyridine being preferred and may be added in a similar molar amount as the initiator.

Polymerization of the chlorine containing monomer is usually carried out in the presence of the catalyst and initiator in a closed vessel in an inert atmosphere such as nitrogen, or argon; under autogenous or artificially-induced pressure. The temperature of the polymerization can vary widely depending upon the type of initiator and/or catalyst, but is generally from about 0° C. to about 180° C., desirably from about 10° C. to about 150° C. and preferably from about 20° C. to about 130° C. It has been found that lower temperatures, i.e., 20° C.-90° C., depending on the initiator and catalyst system, lead to lower reaction rates, and higher molecular weight polymers. For solution polymerizations, the Cu(O)/bpy catalyst in conjunction with the X—$CH_2$-Ph-$CH_2$—X (X=Cl, Br, I, SCN) or $CHI_3$ and $Cl_4$ initiators are effective only at about 120° C. and above, while other chlorine, bromine and iodine based initiators generate polymers at temperatures as low as 60° C. This temperature is enough to allow the metal catalyzed reinitiation from chain such as —CH(Cl)—X (X=I, Br, Cl). Higher temperatures promote an increase in the rate of all reactions including chain transfer to monomer. Therefore, a preferred catalyst will be one reactive enough to promote reinitiation from the active halide chain ends at lower temperatures or to successfully compete with chain transfer to monomer at high temperatures.

Optionally, appropriate solvents such as organic fluids or mixtures of organic fluids may be utilized. Naturally, solvents which do not interfere with the reaction are used and suitable solvents include organic solvents such as chlorobenzene, dichlorobenzene, trichlorobenzene, xylene, diphenylether, 1,2-dichloro ethane, dimethylformamide (DMF), tetrahydrofuran (THF), dioxane, dimethylsulfoxide (DMSO), ketones or esters or any of the other solvents and plasticisers for PVC and their copolymers known in the literature and to those skilled in the art. The amount of solvent used depends on the desired solubility of the system, on the temperature and the desired pressure in the reaction vessel and can be easily determined by one skilled in the art. The amount of solvent generally ranges from about 25 to about 1000, desirably from about 50 to about 500, and preferably from about 75 to about 400 parts per 100 parts of halide containing monomer, such as vinyl chloride.

Alternatively, it has been found that the living free radical polymerization of vinyl chloride can be carried out in the absence of solvent. In such situations, the polymerization is generally carried out in bulk and the other reaction conditions set forth hereinabove are generally suitable.

Alternatively, it has also been found that the living radical polymerization of vinyl chloride can be carried out in water and in water/organic solvent mixtures using the aforementioned solvents as well as other solvents. The presence of an emulsifier such as sodium dodecylsulfate (NaDDS) is optional. The aforementioned conditions still apply. In addition, it was also found that the Cu(O)/TREN, $Cu_2Y$/TREN (Y=O, S, Se, Te), and CuX/TREN (X=Cl, Br, I, SPh, SBu, C≡CPh) catalyst and ligand systems or mixtures thereof can successfully catalyze VC polymerization initiated from iodo, bromo or chloro containing initiators to complete conversion at room temperature. The amount of the optional emulsifier depends of the desired particle size, nature of the emulsifier, and the water to monomer ratio and can be easily selected by one skilled in the art.

Depending on the desired properties of the homopolymer or copolymer, the polymerizations can be either batch, semi-batch or continuous. Mechanical agitation is desirable, but not necessary. Normal polymerization time depends on the temperature and the monomer to initiator to catalyst to ligand ratios and is from 0.5 to about 24 hours.

Subsequent to the formation of the polymer composition, solvent and excess monomer are removed, for example by evaporation, precipitation of the polymer, and the like.

The metal catalyzed living radical polymerization of halogen-containing monomers such as vinyl chloride will be better understood by reference to the following examples which serve to illustrate but not to limit the present invention.

Tables 1, 2, 4, 5, and 6, of U.S. patent application Ser. No. 10/179,584 filed Jun. 24, 2002 is hereby fully incorporated by reference.

As being illustrative of the present invention, Table 3 of U.S. application Ser. No. 10/179,584 is hereby reproduced as follows:

TABLE 3

Polymerization of Vinyl Chloride Initiated from Various Halides and Catalyzed by Cu(I).

| Exp | Initiator | Catalyst/Ligand | [VC]:[I]:[C]:[L][a] | Time h | Mn | Mw/Mn | Conv % | Temp °C. | Solvent |
|---|---|---|---|---|---|---|---|---|---|
| 37 | Br—C(CH$_3$)$_2$—CO—O—Ph—Ph—O—CO—C(CH$_3$)$_2$—Br | CuBr/Me$_6$-TREN | 260:1:4:8 | 20 | 2,500 | 1.45 | 8 | 130 | oDCB |
| 38 | Br—C(CH$_3$)$_2$—CO—O—Ph—Ph—O—CO—C(CH$_3$)$_2$—Br | CuBr/Me$_6$-TREN | 260:1:4:4 | 20 | 750 | 1.80 | 2 | 90 | oDCB |
| 39 | Cl—(CN)CHCH$_3$ | CuC≡C—Ph/bpy | 100:1:1.5:3 | 19 | 1,300 | 3.60 | 15 | 90 | DMF |
| 40 | Cl—(CN)CHCH$_3$ | CuSPh/bpy | 140:1:0.7:1.2 | 19 | 2,800 | 3.30 | 13 | 60 | DMF |
| 41 | I—CH(Cl)—CH$_3$ | CuBr/Me$_6$-TREN | 260:1:2:4 | 44 | 3,200 | 1.30 | 5 | 90 | oDCB |
| 42 | I—CH(Cl)—CH$_3$ | CuBr/Me$_6$-TREN | 520:1:4:4 | 20 | 4,100 | 1.27 | 3 | 130 | oDCB |
| 43 | I—CH(Cl)—CH$_3$ | CuBr/Me$_6$-TREN | 60:1:1:1 | 20 | 2,000 | 1.40 | 3 | 90 | oDCB |
| 44 | I—CH(Cl)—CH$_3$ | CuI/Me$_6$-TREN | 130:1:1:1 | 20 | 1,700 | 1.21 | 2 | 90 | oDCB |
| 45 | I—CH$_2$—Ph—CH$_2$—I | CuBr/Me$_6$-TREN | 520:1:8:8 | 20 | 4,400 | 1.50 | 4 | 130 | oDCB |
| 46 | NCS—CH$_2$—Ph—CH$_2$—SCN | Cu$_2$Te/bpy | 260:1:4:8 | 22 | 5,100 | 2.23 | 8 | 130 | oDCB |
| 47 | NCS—CH$_2$—Ph—CH$_2$—SCN | CuBr/Me$_6$-TREN | 520:1:4:4 | 20 | 1,000 | 1.55 | 2 | 130 | oDCB |

[a] Molar ratio of VC to initiator to catalyst to ligand.

Moreover, as further illustrative of the present invention, Examples 92 through 108 of Table 4 are hereby reproduced.

TABLE 4

Polymerization of Vinyl Chloride Initiated from Various Halides and Catalyzed by Cu (O).

| Exp | Initiator | Catalyst/Ligand | [VC]:[I]:[C]:[L][a] | Time, h | Conv, % | Mn | M$_w$/M$_n$ | Temp °C. | Solvent |
|---|---|---|---|---|---|---|---|---|---|
| 92 | I—CH(Cl)—CH$_3$ | Cu(O)/bpy | 130:1:2:4 | 67 | 28 | 3,500 | 1.75 | 130 | oDCB |
| 93 | I—CH(Cl)—CH$_3$ | Cu(O)/bpy | 130:1:2:4 | 21 | 42 | 3,900 | 1.65 | 90 | oDCB |
| 94 | I—CH(Cl)—CH$_3$ | Cu(O)/bpy | 130:1:2:4 | 44 | 36 | 8,400 | 1.55 | 60 | oDCB |
| 95 | I—CH(Cl)—CH$_3$ | Cu(O)/bpy | 520:1:2:4 | 44 | 13 | 7,700 | 1.70 | 90 | oDCB |
| 96 | I—CH(Cl)—CH$_3$ | Cu(O)/TREN | 520:1:1:1 | 20 | 28 | 7,900 | 1.65 | 130 | oDCB |
| 97 | I—CH(Cl)—CH$_3$ | Cu(O)/bpy | 100:1:2:4 | 20 | 15 | 5,200 | 1.78 | 60 | Bulk |
| 98 | I—CH(Cl)—CH$_3$ | Cu(O)/bpy | 100:1:2:4 | 20 | 22 | 5,600 | 1.77 | 60 | o-DCB |
| 99 | I—CH(Cl)—CH$_3$ | Cu(O)/bpy | 100:1:2:4 | 20 | 26 | 6,200 | 1.78 | 60 | o-DCB |
| 100 | I—CH(Cl)—CH$_3$ | Cu(O)/bpy | 100:1:2:4 | 20 | 14 | 6,500 | 1.69 | 60 | o-DCB |
| 101 | I—CH(Cl)—CH$_3$ | Cu(O)/bpy | 100:1:2:4 | 20 | 18 | 5,400 | 1.87 | 90 | Bulk |

TABLE 4-continued

Polymerization of Vinyl Chloride Initiated from Various Halides and Catalyzed by Cu (O).

| Exp | Initiator | Catalyst/Ligand | [VC]:[I]:[C]:[L][a)] | Time, h | Conv, % | Mn | $M_w/M_n$ | Temp °C. | Solvent |
|---|---|---|---|---|---|---|---|---|---|
| 102 | I—CH(Cl)—CH$_3$ | Cu(O)/bpy | 100:1:2:4 | 20 | 45 | 7,800 | 1.67 | 90 | o-DCB |
| 103 | I—CH(Cl)—CH$_3$ | Cu(O)/bpy | 100:1:2:4 | 20 | 55 | 7,300 | 1.79 | 90 | o-DCB |
| 104 | I—CH(Cl)—CH$_3$ | Cu(O)/bpy | 100:1:2:4 | 20 | 52 | 8,300 | 1.68 | 90 | o-DCB |
| 105 | I—CH(Cl)—CH$_3$ | Cu(O)/bpy | 100:1:2:4 | 20 | 39 | 5,500 | 1.78 | 130 | o-DCB |
| 106 | I—CH(Cl)—CH$_3$ | Cu(O)/bpy | 100:1:2:4 | 20 | 38 | 6,100 | 1.77 | 130 | o-DCB |
| 107 | I—CH(Cl)—CH$_3$ | Cu(O)/bpy | 100:1:2:4 | 20 | 43 | 7,100 | 1.65 | 130 | o-DCB |
| 108 | I—CH(Cl)—CH$_3$ | Cu(O)/bpy | 100:1:2:4 | 20 | 39 | 6,800 | 1.68 | 130 | o-DCB |

[a)]Molar ratio of VC to initiator to catalyst to ligand.

Further illustrative of the present invention is Examples 146-154 of Table 6 which are hereby reproduced.

TABLE 6

Selected Examples of the Room Temperature Polymerization of Vinyl Chloride Catalyzed by Copper Catalysts in Water, Solvents and Mixtures Thereof.

| Exp | Initiator | Catalyst | [VC]/[I]/[C]/[L]/[S][a)] | Mn | Mw/Mn | Time h | Conv. % | Temp °C. | Solvent |
|---|---|---|---|---|---|---|---|---|---|
| 146 | CH$_3$—CH(Cl)—I | Cu(O)/NH$_4$OH | 100/1/1/2 | 8,200 | 1.75 | 48 | 30 | 20 | NH$_4$OH |
| 147 | CH$_3$—CH(Cl)—I | Cu(O)/TREN | 100/1/2/4 | 13,500 | 1.60 | 20 | 67 | 20 | o-DCB |
| 148 | CH$_3$—CH(Cl)—I | Cu(O)/TREN | 100/1/2/4 | 5,500 | 1.61 | 20 | 45 | 20 | H$_2$O |
| 149 | CH$_3$—CH(Cl)—I | Cu(O)/TREN | 100/1/2/4 | 3,700 | 1.47 | 20 | 11 | 20 | THF |
| 150 | CH$_3$—CH(Cl)—I | Cu(O)/TREN | 100/1/2/4 | 4,700 | 1.57 | 16 | 26 | 20 | DMF |
| 151 | CH$_3$—CH(Cl)—I | Cu(O)/TREN | 100/1/2/2 | 11,500 | 1.60 | 20 | 75 | 20 | o-DCB |
| 152 | CH$_3$—CH(Cl)—I | Cu(O)/TREN | 100/1/1/2 | 7,000 | 1.65 | 20 | 65 | 20 | o-DCB |
| 153 | CH$_3$—CH(Cl)—I | Cu(O)/TREN/Brij-97 | 100/1/2/4/0.5 | 5,500 | 1.91 | 20 | 54 | 20 | H$_2$O |
| 154 | CH$_3$—CH(Cl)—I | Cu(O)/TREN/NaDDS | 100/1/2/4/0.5 | 13,200 | 1.54 | 20 | 95 | 20 | H$_2$O |

Table 3 presents the Cu(I) catalyzed polymerization of VC initiated from various halides. In the presence of more activating ligands than bpy, such as Me$_6$-TREN, CuBr can catalyzed VC polymerization initiated from α-haloesters (examples 37 and 38). More reactive Cu(I) species such as CuC≡C-Ph, CuSPh or Cu$_2$Te (examples 39, 40 and 46) can catalyze VC polymerization even in the presence of bpy as ligand. For the less reactive copper halides, the presence of more activating polyamine ligands is therefore necessary.

Table 4 presents the Cu(O) catalyzed polymerization of VC initiated from various halides. Initiation from allyl chloride defects is demonstrated using 1,1-chloroiodo derivatives (examples 92 to 117).

The results from examples 97 to 108 describe the combined effect of VC concentration (from bulk 14.4 M to solution 4.8 M) and temperature (from 60° C. to 130° C.) on the molecular weight molecular weight distribution and conversion of the resulting PVC for a reaction time of 20 h and are presented in FIG. 1. An optimum conversion is observed for [VC]=7.2 M while bulk polymerization generates both lower conversion as well as lower molecular weight and broader molecular weight distribution.

Examples of Preparation of the Chlorine Containing Polymer (e.g. PVC) Utlizing a Metallic Catalyst The polymerizations reported were performed as follows unless otherwise noted: A 50 mL Ace Glass 8648 #15 Ace-Thred pressure tube equipped with bushing and plunger valve containing solvent (ortho-dichlorobenzene, 10 mL), initiator catalyst, ligand, optional additive and vinyl chloride (5 mL, 0.072 mol), was degassed by three freeze-vacuum pump-thaw cycles was filled with argon. The reaction mixture was slowly heated to the specific reaction temperature in an oil bath. After the specific reaction time, the tube was slowly cooled and excess vinyl chloride was allowed to boil off. Methylene chloride (10 mL) was added and the solution was precipitated into methanol, filtered and dried. The conversion was determined gravimetrically and the number average molecular weight ($M_n$) and molecular weight distribution ($M_w/M_n$) were determined by gel permeation chromatography using a calibration based on polystyrene standards. GPC analysis of the polymers was performed on a Perkin-Elmer Series 10 high pressure liquid chromatograph equipped with an LC-100 column oven (22° C.), a Nelson Analytical 900 Series integrator data station, a Perkin-Elmer 785A UV/Visible Detector (254 nm), a Varian Star 4090 RI detector and 2 AmGel (10 μm, 500 Å and 10 μm, 10$^4$ Å) columns. THF (Fisher, HPLC-grade) was used as eluent at a flow rate of 1 mL/min.

A number of polymerization reactions were produced in accordance with the above description. Selected examples from the Tables 3, 4, and 6 are presented below:

The remaining selective examples are hereby fully incorporated by reference from U.S. application Ser. No. 10/179, 584, filed Jun. 24, 2002.

TABLE 3, EXAMPLE 39

A 50 mL Ace Glass 8648 #15 Ace-Thred pressure tube equipped with bushing and plunger valve containing vinyl chloride (5 mL, 0.072 mol), solvent (DMF, 5 mL), initiator (1-chloro-1-cyanoethane, 64 mg, 0.72 mmol) catalyst (copper phenylacetylide, 178 mg, 1.1 mmol) and ligand (bpy, 337 mg, 2.16 mmol) was degassed by three freeze-vacuum pump-thaw cycles and filled with argon. The reaction mixture was slowly heated to 90° C. in an oil bath. After 19 hours, the tube was slowly cooled and excess vinyl chloride was distilled. Methylene chloride (10 mL) was added and the solution was precipitated into methanol, filtered and dried to yield 0.67 g (15%) of PVC, $M_n=1,300$, $M_w/M_n=3.60$.

TABLE 3, EXAMPLE 40

A 50 mL Ace Glass 8648 #15 Ace-Thred pressure tube equipped with bushing and plunger valve containing vinyl chloride (5 mL, 0.072 mol), solvent (DMF, 5 mL), initiator (1-chloro-1-cyanoethane, 51 mg, 0.56 mmol) catalyst (copper thiophenoxide, 69 mg, 0.4 mmol) and ligand (bpy, 337 mg, 2.16 mmol) was degassed by three freeze-vacuum pump-thaw cycles and filled with argon. The reaction mixture was slowly heated to 60° C. in an oil bath. After 19 hours, the tube was slowly cooled and excess vinyl chloride was distilled. Methylene chloride (10 mL) was added and the solution was precipitated into methanol, filtered and dried to yield 0.6 g (13%) of PVC, $M_n=2,800$, $M_w/M_n=3.60$.

TABLE 3, EXAMPLE 41

A 50 mL Ace Glass 8648 #15 Ace-Thred pressure tube equipped with bushing and plunger valve containing vinyl chloride (5 mL, 0.072 mol), solvent (o-DCB, 5 mL), initiator (1-chloro-1-iodoethane, 53 mg, 0.28 mmol) catalyst (copper (I) bromide, 61 mg, 0.42 mmol) and ligand (tris[2-(dimethylamino)ethyl]amine (Me$_6$-TREN), 193 mg, 0.84 mmol) was degassed by three freeze-vacuum pump-thaw cycles and filled with argon. The reaction mixture was slowly heated to 90° C. in an oil bath. After 44 hours, the tube was slowly cooled and excess vinyl chloride was distilled. Methylene chloride (10 mL) was added and the solution was precipitated into methanol, filtered and dried to yield 0.22 g (5%) of PVC, $M_n=3,200$, $M_w/M_n=1.30$.

TABLE 3, EXAMPLE 46

A 50 mL Ace Glass 8648 #15 Ace-Thred pressure tube equipped with bushing and plunger valve containing vinyl chloride (5 mL, 0.072 mol), solvent (o-DCB, 5 mL), initiator (α,α'-dithiocyanato-p-xylene, 61 mg, 0.28 mmol) catalyst (copper (I) telluride, 285 mg, 1.12 mmol) and ligand (bpy, 350 mg, 1.36 mmol) was degassed by three freeze-vacuum pump-thaw cycles and filled with argon. The reaction mixture was slowly heated to 130° C. in an oil bath. After 22 hours, the tube was slowly cooled and excess vinyl chloride was distilled. Methylene chloride (10 mL) was added and the solution was precipitated into methanol, filtered and dried to yield 0.36 g (8%) of PVC, $M_n=5,100$, $M_w/M_n=2.23$.

TABLE 4, EXAMPLE 97

A 50 mL Ace Glass 8648 #15 Ace-Thred pressure tube equipped with bushing and plunger valve containing vinyl chloride (5 mL, 0.072 mol), initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was distilled. Methylene chloride (10 mL) was added and the solution was precipitated into methanol, filtered and dried to yield 0.66 g (15%) of PVC, $M_n=5,200$, $M_w/M_n=1.78$.

TABLE 4, EXAMPLE 98

A 50 mL Ace Glass 8648 #15 Ace-Thred pressure tube equipped with bushing and plunger valve containing vinyl chloride (5 mL, 0.072 mol), solvent (o-DCB, 2.5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was distilled. Methylene chloride (10 mL) was added and the solution was precipitated into methanol, filtered and dried to yield 1 g (22%) of PVC, $M_n=5,600$, $M_w/M_n=1.77$.

TABLE 4, EXAMPLE 99

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was distilled. Methylene chloride (10 mL) was added and the solution was precipitated into methanol, filtered and dried to yield 1.17 g (26%) of PVC, $M_n=6,200$, $M_w/M_n=1.78$.

TABLE 4, EXAMPLE 100

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was distilled. Methylene chloride (10 mL) was added and the solution was precipitated into methanol, filtered and dried to yield 0.63 g (14%) of PVC, $M_n=6,500$, $M_w/M_n=1.69$.

TABLE 4, EXAMPLE 101

A 50 mL Ace Glass 8648 #15 Ace-Thred pressure tube equipped with bushing and plunger valve containing vinyl chloride (5 mL, 0.072 mol), initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was distilled. Methylene chloride (10 mL) was added and the solution was precipitated into methanol, filtered and dried to yield 0.81 g (18%) of PVC, $M_n=5,400$, $M_w/M_n=1.87$.

TABLE 4, EXAMPLE 104

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was distilled. Methylene chloride (10 mL) was added and the solution was precipitated into methanol, filtered and dried to yield 0.63 g (14%) of PVC, $M_n$=6,500, $M_w/M_n$=1.69.

TABLE 4, EXAMPLE 107

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was distilled. Methylene chloride (10 mL) was added and the solution was precipitated into methanol, filtered and dried to yield 1.95 g (43%) of PVC, $M_n$=7,100, $M_w/M_n$=1.65.

TABLE 6, EXAMPLE 154

A 50 mL Ace Glass 8648 #15 Ace-Thred pressure tube equipped with bushing and plunger valve containing vinyl chloride (5 mL, 0.072 mol), deionized water 10 mL), initiator (1-iodo-1-chloroethane, 137 mg, 0.72 mmol), catalyst (copper, 92 mg, 1.44 mmol), ligand (TREN, 421 mg, 2.88 mmol) and surfactant ($CH_3$—$(CH_2)_{11}$—$SO_3Na$, NaDDS, sodium dodecylsulfate), 104 mg, 0.36 mmol) was degassed by three freeze-vacuum pump-thaw cycles and filled with argon. The reaction mixture was stirred at 20° C. in an oil bath. After 20 hours, the tube was slowly opened and excess vinyl chloride was distilled. THF (10 mL) was added and the mixture was precipitated into methanol, filtered and dried to yield 4.3 g (95%) of PVC, $M_n$=13,200, $M_w/M_n$=1.54.

Halogen-Containing Polymers

Metal Free Catalyzed Polymerization of Vinyl Halide Monomers

In another embodiment, desirably in an aqueous or partially-aqueous environment, non-metal-catalyzed polymerization of halogen containing monomers, appropriate initiators include halides of the formula RX, where R, having 1-1,000 carbon atoms, contains an activated electron withdrawing group such as a halogen, polyhalo, or perfluoroalkyl, and X—halide (where X⁻ is a good living group and X═Cl, Br, I). The halide initiator can accept one electron and then release X⁻ forming an initiating radical R.

Such electron-accepting radical precursors include, but are not limited to, various activated mono, di, tri and polyfunctional activated halides. These include α,α-dihaloalkanes, α,α,α-trihaloalkanes, perhaloalkanes, perfluoroalkyl halides, polyfluoroalkyl halides, α-haloesters, α-halonitriles, α-haloketones, benzyl halides, sulfonyl halides, imidyl halides, or combinations thereof. Additionally, any compounds having labile carbon-halide, nitrogen-halide, phosphorus-halide, silicon-halide bonds, which possess enough electron affinity to accept one electron and then release halide-anion forming radicals, are suitable for use as initiators in the present invention, and can include, for example, benzyl iodide, N-iodosuccinimide, diphenylposphinic iodide, triphenylsilyl iodide, and the like.

Generally, preferred initiators are one electron accepting radical precursors including chlorine and bromine, with iodine initiators being desirable. Haloforms, tetrahalocarbons, methylene iodide, 1-chloro-1-iodo-ethane, as well as PVC's obtained from them, act as active initiators in conjunction with catalysts such as $Na_2S_2O_4$ and $H_2NC(\!=\!NH)SO_2H$, which give the highest efficiency, and also $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, $(Me_2N)_2C\!=\!C(NMe_2)_2$, or combinations thereof. It should be noted that the system sodium persulfate—sodium formate ($Na_2S_2O_8$—HCOONa, which form $CO_2^-$ radical anion) is active in radical (not living) polymerization of vinyl chloride in conjunction with only non-iodine containing halocarbon initiators —$CHCl_3$, $CHBr_3$, $CCl_{41}$ $CBr_4$. Whereas, in conjunction with $CHI_3$, the persulfate-formate system is not effective at all due to evolution of 12 which terminates the polymerization. Preferred initiators include iodoform, 1-chloro-1-iodoetane, methylene iodide and 1-iodoperfluoroalkane.

The amounts of the initiators utilized depend on the desired molecular weight of the halide containing polymer and are generally from about 5000 to about 1, desirably from about 1000 to about 10, and preferably from about 500 to about 50 of halide containing monomer per mole of initiating group. Generally the number average molecular weight of the halide containing polymer will be from about 500 to about 60,000, desirably from about 1,000 to about 40,000, and preferably from about 2,000 to about 20,000.

The vinyl halide monomers which are polymerized or copolymerized according to this invention are vinyl chloride and its structurally related derivatives, including vinylidene chloride and 2-chloropropene and monomers known to copolymerize via a radical mechanism with vinyl chloride, including one or more of acrylates, vinylidene halides, methacrylates, acrylonitrile, methacrylonitrile, vinyl halides, 2-haloalkenes, styrenes, acrylamide, methacrylamide, vinyl ketones, N-vinylpyrrolidinone, vinyl acetate, maleic acid esters, or combinations thereof. The preferred carbon atom range of each group of monomers such as acrylates, etc. is from 2 to 20. The copolymer can have a comonomer content from 1% up to 99%, depending on the reactivity ratios of the comonomers used.

An important component of the second embodiment is the use of a non-metallic single electron transfer species to catalyze the initiation reaction and continue the growth of the polymer chain. Typical of such catalysts are, for example, low valent sulfur salts containing $SO_2$ group and polydialkylamino-substituted unsaturated organic compounds. Examples of such catalysts include $Na_2S_2O_4$, $H_2NC(\!=\!NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p—$CH_3C_6H_4SO_2Na$, $(Me_2N)_2C\!=\!C(NMe_2)_2$, and the like. The preferred catalyst will be dependent upon the initiator utilized and on the reaction media (such as solvent or water) and temperature. Preferred catalysts include sodium dithionite ($Na_2S_2O_4$) and form am idinesulfinic acid ($H_2NC(\!=\!NH)SO_2H$).

The amount of catalyst is dependent upon the desired reaction rate. Generally, the amount of catalyst will be from about 0.01 to about 4, desirably from about 0.05 to about 2, and preferably from about 0.1 to about 1 mole per mole of initiator.

A buffer compound can optionally be included in the polymerization process in order to avoid acidic decomposition of sulfur containing catalysts. The buffer used will depend specifically and uniquely on the type of catalyst, the temperature of the reaction and on the reaction media such as solvent or water. Typical buffers can include alkaline salts of inorganic and organic acids, which water solutions keep pH 8-10, such as $NaHCO_3$, $Na_2HPO_4$, $NaH_2PO_4$, $CH_3COONa$ or the potassium or ammonium salts thereof, including $KHCO_3$, $K_2HPO_4$, $KH_2PO_4$, $CH_3COOK$, $NH_4HCO_3$, $(NH_4)_2HPO_4$, $NH_4H_4PO_4$, $CH_3COONH_4$, and the like.

When the optional buffer is present, the mixture will usually contain from about 0.1 to about 5 moles of buffer per mole of catalyst, desirably from about 0.5 to about 3 moles of buffer per mole of catalyst, and preferably from about 1 to about 1.2 moles of buffer per mole of catalyst.

The presence of an electron shuttle is also optional. The shuttle allows for acceleration of the process of radical initiation and activation of dormant species by using compounds which, in reduced form are more soluble in organic phase than in water, and which in oxidized form are more soluble in water than in organic solvent. In a reduced state in the aqueous phase (having gained an electron), the compound moves into the organic phase and donates an electron to the halogen-containing initiator or dormant species. The compound then returns to the aqueous phase carrying the halide anion and leaving a radical in the organic phase. Such compounds can include 1,1'-dialkyl-4,4'-bipyridinium dihalides called alkyl viologens. Examples of such shuttles include, but are not limited to, 1,1'-dimethyl-4,4'-bipyridinium dichloride, methyl viologen ($MV^{2+}$), 1,1'-di-n-octyl-4,4'-bipyridinium dibromide, octyl viologen ($OV^{2+}$), and the like.

When the shuttle is present, the mixture will usually contain from about 0.00001 to about 1 moles of shuttle per mole of catalyst, desirably from about 0.0001 to about 0.1 moles of shuttle per mole of catalyst, and preferably from about 0.001 to about 0.005 moles of shuttle per mole of catalyst.

Additionally, various additives may optionally be utilized in the polymerization. Depending on their structure, these additives may affect the molecular weight, molecular weight distribution of the resulting polymer, catalyst stability and/or rate of polymerization. Such additives can include sodium iodide, ammonium iodide, tetrabutyl ammonium iodide, sodium para-toluenesulfinate ($CH_3C_6H_4SO_2Na$), and sodium chloride. These can be added in similar amounts as the initiators. Additionally, phase transfer catalysts (PTC) may optionally be utilized in the polymerization. Such PTC can include crown-ethers, tetraalkyl ammonium salts such as cetyltrimetylammonium bromide ($nC_{16}H_{33}(CH_3)_3N^+Br^-$, $CetMe_3NBr$) and the like. When the PTC is present, the mixture will usually contain from about 0.00001 to about 1 moles of PTC per mole of catalyst, desirably from about 0.0001 to about 0.1 moles of PTC per mole of catalyst, and preferably from about 0.001 to about 0.05 moles of PTC per mole of catalyst.

The non-metallically catalyzed polymerization reactions described herein are normally carried out in the presence of catalyst and initiator in a closed vessel in an inert atmosphere such as nitrogen or argon, under autogenously or artificially induced pressure. The optimal temperature of the polymerization is around room temperature, namely about 25° C.±20° C. and desirably about 25° C.±10° C. A higher temperature can lead to fast reduction of active chain ends and a lower one is simply inconvenient due to necessity to use special cooling equipment. This can lead to higher viscosity, heterogeneity and reduced solubility of reaction components that make results less reproducible.

Appropriate solvents such as water or a mixture of water and organic solvent may be utilized. Solvents play an important role in single electron transfer. It was found that there is no reaction in the absence of water when salts are used. The higher the solvent polarity is, the more efficient is the polymerization. By this means, polar water-soluble organic solvents and/or good PVC solvents such as tetrahydrofuran (THF), dimethylformamide (DMF), dimethylsulfoxide (DMSO), cyclohexanone, chlorobenzene, dichlorobenzene, trichlorobenzene, xylene, diphenylether, 1,2-dichloroethane, dioxane, acetone, diethyloxalate, ethylhexyphtalate, methanol, ethanol, butanol, or combinations thereof, or any other solvent in the literature known to those skilled in the art are appropriate media for the polymerization. The amount of the solvent generally ranges from 1 to 10 parts per volume of halide containing monomer and preferably is from about 2 to about 4 parts per volume (ppv).

The presence of a surfactant is optional. Examples of surfactants include, but are not limited to, sodium dodecylsulfate (NaDDS), hydroxypropyl methylcellulose (Methocel® F50), 87%-89% hydrolyzed poly(vinyl acetate) [poly (vinyl alcohol), containing 11%-13% acetate groups PVA88], 72.5% hydrolyzed polyvinyl acetate (Alcotex® 72.5), polyoxyethylene(10) oleyl ether (Brij® 97), and polyoxyethylene(20) oleyl ether (Brij® 98), or combination thereof. The amount of the optional surfactant depends on the desired particle size, nature of the surfactant and the water to monomer ratio. This can be easily selected by one skilled in the art. The amount of surfactant generally ranges from about 0.1 to about 50,000 parts per million (ppm) w/w, desirably from about 1 to about 10000 ppm w/w, and preferably from about 10 to about 5,000 parts per million w/w relative to halide containing monomer.

Depending on desired properties of the homopolymer or copolymer, the polymerization can be batch or semi batch, or continuous. Mechanical agitation is desirable to obtain reproducible results, but not necessary. Normal polymerization time depends on the monomer—initiator ratio and desirable polymer properties and can be from about 1 h to about 70 h.

Subsequent to the formation of the polymer composition, solvent and excess monomer is removed, for example by distillation of the vinyl chloride and the addition of methanol to precipitate the polymer.

In summary, single electron transfer-degenative chain transfer living radical polymerization (SET-DTLRP) is the polymerization mechanism.

An advantage of the living radical polymerization process described herein is that it will produce a halogen-containing polymer, such as PVC, with controlled molecular weight, such that the molecular weight increases with the conversion of the monomer. Additionally, the living radical polymerization process will provide PVC with narrow molecular weight distribution and with the well defined chain ends, i.e. telechelics and macromonomers. Such molecular weight distribution, i.e. $M_w/M_n$, can be from $\leq 2.00$, $\leq 1.90$, or $\leq 1.80$ down to $\leq 1.70$, $<1.60$, or even $\leq 1.50$. A molecular weight distribution of from about $\leq 1.70$ to about $\leq 1.50$ is preferred and less than 1.50 is most preferred. Since the structural defects in PVC are responsible for its low thermal stability, PVC obtained by living radical polymerization will be more stable than conventional PVC, thereby expanding the range of technological applications of PVC.

The poly(vinyl chloride) compositions described herein can be useful for many applications including plastic materials (sheeting, films, molded parts, etc.), viscosity/flow modifiers, additives for flame retardant compositions, and compatibilizers. These poly(vinyl chloride) compositions are telechelic and can serve as starting materials for chain end functionalization and as macroinitiators for subsequent block copolymerization(s).

TABLE 7

$Na_2S_2O_4$-mediated LRP of VC initiated with iodoform in $H_2O$/THF at 25° C.

| Exp | Initator | Catalyst/ Buffer | Electron Shuttle | Surfactant | [VC]/[I]/[C]/[ES]/ [B]/[S][a] | Mn | Mw/Mn | Time (h) | Conv (%) | Solvent |
|---|---|---|---|---|---|---|---|---|---|---|
| 1 | $CHI_3$ | $Na_2S_2O_4$/ $NaHCO_3$ | — | — | 200/1/2/0/ 2.2/0 | 1,017 | 2.442 | 7 | 12.27 | 2/1 $H_2O$/THF |
| 2 | $CHI_3$ | $Na_2S_2O_4$/ $NaHCO_3$ | — | — | 200/1/2/0/ 2.2/0 | 3,106 | 1.505 | 8 | 16.01 | 2/1 $H_2O$/THF |
| 3 | $CHI_3$ | $Na_2S_2O_4$/ $NaHCO_3$ | — | — | 200/1/2/0/ 2.2/0 | 3,018 | 1.608 | 13 | 24.54 | 2/1 $H_2O$/THF |
| 4 | $CHI_3$ | $Na_2S_2O_4$/ $NaHCO_3$ | — | — | 200/1/2/0/ 2.2/0 | 4,033 | 1.565 | 15 | 30.84 | 2/1 $H_2O$/THF |
| 5 | $CHI_3$ | $Na_2S_2O_4$/ $NaHCO_3$ | — | — | 200/1/2/0/ 2.2/0 | 4,688 | 1.499 | 16 | 35.40 | 2/1 $H_2O$/THF |
| 6 | $CHI_3$ | $Na_2S_2O_4$/ $NaHCO_3$ | — | — | 200/1/2/0/ 2.2/0 | 4,492 | 1.573 | 18 | 39.54 | 2/1 $H_2O$/THF |
| 7 | $CHI_3$ | $Na_2S_2O_4$/ $NaHCO_3$ | — | — | 200/1/2/0/ 2.2/0 | 5,841 | 1.482 | 20 | 46.20 | 2/1 $H_2O$/THF |
| 8 | $CHI_3$ | $Na_2S_2O_4$/ $NaHCO_3$ | — | — | 200/1/2/0/ 2.2/0 | 7,590 | 1.476 | 21 | 50.88 | 2/1 $H_2O$/THF |
| 9 | $CHI_3$ | $Na_2S_2O_4$/ $NaHCO_3$ | — | — | 200/1/2/0/ 2.2/0 | 7,954 | 1.485 | 22 | 54.15 | 2/1 $H_2O$/THF |
| 10 | $CHI_3$ | $Na_2S_2O_4$/ $NaHCO_3$ | — | — | 200/1/2/0/ 2.2/0 | 6,758 | 1.489 | 23 | 55.78 | 2/1 $H_2O$/THF |
| 11 | $CHI_3$ | $Na_2S_2O_4$/ $NaHCO_3$ | — | — | 200/1/2/0/ 2.2/0 | 7,301 | 1.471 | 24 | 57.75 | 2/1 $H_2O$/THF |
| 12 | $CHI_3$ | $Na_2S_2O_4$/ $NaHCO_3$ | — | — | 200/1/2/0/ 2.2/0 | 8,072 | 1.469 | 27 | 61.89 | 2/1 $H_2O$/THF |
| 13 | $CHI_3$ | $Na_2S_2O_4$/ $NaHCO_3$ | — | — | 200/1/2/0/ 2.2/0 | 8,652 | 1.467 | 30 | 64.89 | 2/1 $H_2O$/THF |
| 14 | $CHI_3$ | $Na_2S_2O_4$/ $NaHCO_3$ | — | — | 200/1/2/0/ 2.2/0 | 8,195 | 1.465 | 33 | 66.06 | 2/1 $H_2O$/THF |
| 15 | $CHI_3$ | $Na_2S_2O_4$/ $NaHCO_3$ | — | — | 200/1/2/0/ 2.2/0 | 8,650 | 1.467 | 38 | 68.60 | 2/1 $H_2O$/THF |
| 16 | $CHI_3$ | $Na_2S_2O_4$/ $NaHCO_3$ | — | — | 200/1/2/0/ 2.2/0 | 8,920 | 1.474 | 45 | 73.72 | 2/1 $H_2O$/THF |
| 17 | $CHI_3$ | $Na_2S_2O_4$/ $NaHCO_3$ | — | — | 200/1/2/0/ 2.2/0 | 9,068 | 1.505 | 51 | 76.09 | 2/1 $H_2O$/THF |
| 18 | $CHI_3$ | $Na_2S_2O_4$/ $NaHCO_3$ | — | — | 200/1/2/0/ 2.2/0 | 9,977 | 1.479 | 63 | 77.70 | 2/1 $H_2O$/THF |
| 19 | $CHI_3$ | $Na_2S_2O_4$/ $NaHCO_3$ | — | — | 200/1/2/0/ 2.2/0 | 8,974 | 1.509 | 66 | 80.95 | 2/1 $H_2O$/THF |
| 20 | $CHI_3$ | $Na_2S_2O_4$/ $NaHCO_3$ | — | — | 200/1/2/0/ 2.2/0 | 9,654 | 1.500 | 75 | 80.51 | 2/1 $H_2O$/THF |
| 21 | $CHI_3$ | $Na_2S_2O_4$/ $NaHCO_3$ | — | — | 200/1/4/0/ 2.2/0 | 10,167 | 1.578 | 45 | 79.96 | 2/1 $H_2O$/THF |
| 22 | $CHI_3$ | $Na_2S_2O_4$/ $NaHCO_3$ | — | — | 200/1/2/0/ 4/0 | 10,348 | 1.474 | 63 | 77.61 | 2/1 $H_2O$/THF |
| 23 | $CHI_3$ | $Na_2S_2O_4$ | — | — | 200/1/2/0/ 0/0 | 1,430 | 1.870 | 63 | 7.64 | 2/1 $H_2O$/THF |
| 24 | $CHI_3$ | $Na_2S_2O_4$/ $NaHCO_3$ | — | — | 200/1/2/0/ 2.2/0 | 9,653 | 1.460 | 63 | 75.11 | 7/3 $H_2O$/THF |

[a]Ratio [VC]/[initiator]/[catalyst]/[electron shuttle]/[buffer]/[surfactant] mol/mol/mol/mol/mol/ppm w/w to monomer

TABLE 14

Selected examples of non-metallic SET reagents-mediated LRP of VC at 25° C. in $H_2O$, THF and mixtures thereof

| Exp | Init | Catalyst/ Additive/ Buffer | Electron Shuttle | Surfactant | [VC]/[I]/[C]/[A]/ ES]/[ [B]/[S][a] | Mn | Mw/Mn | Time (h) | Conv (%) | Solvent |
|---|---|---|---|---|---|---|---|---|---|---|
| 118 | $CHI_3$ | $Na_2S_2O_4$/ NaI/ $NaHCO_3$ | — | Brij ® 98 | 200/1/2/8/0/ 2.2/2180 | 7,914 | 1.451 | 66 | 60.22 | 7/3 $H_2O$/THF |
| 119 | $CHI_3$ | $Na_2S_2O_4$/ $NaHCO_3$ | $OV^{2+}$ | — | 200/1/2/0/0.00175/ 2.2/0 | 10,355 | 1.482 | 24 | 69.42 | 2/1 $H_2O$/THF |

TABLE 14-continued

Selected examples of non-metallic SET reagents-mediated LRP of VC at 25° C. in H₂O, THF and mixtures thereof

| Exp | Init | Catalyst/ Additive/ Buffer | Electron Shuttle | Surfactant | [VC]/[I]/[C]/[A]/ ES]/[B]/[S]$^{a)}$ | Mn | Mw/Mn | Time (h) | Conv (%) | Solvent |
|---|---|---|---|---|---|---|---|---|---|---|
| 120 | CHI$_3$ | Na$_2$S$_2$O$_4$/ NaHCO$_3$ | OV$^{2+}$ | — | 200/1/2/0/0.0035/ 2.2/0 | 9,679 | 1.472 | 24 | 63.99 | 2/1 H$_2$O/THF |
| 121 | CHI$_3$ | Na$_2$S$_2$O$_4$/ NaHCO$_3$ | OV$^{2+}$ | — | 200/1/2/0/0.0035/ 2.2/0 | 9,020 | 1.480 | 24 | 65.51 | 7/3 H$_2$O/THF |
| 122 | CHI$_3$ | Na$_2$S$_2$O$_4$/ NaHCO$_3$ | OV$^{2+}$ | — | 200/1/2/0/0.0035/ 2.2/0 | 10,529 | 1.499 | 66 | 79.74 | 7/3 H$_2$O/THF |
| 123 | CHI$_3$ | Na$_2$S$_2$O$_4$/ NaHCO$_3$ | OV$^{2+}$ | — | 200/1/2/0/0.00525/ 2.2/0 | 9,731 | 1.474 | 24 | 67.21 | 7/3 H$_2$O/THF |
| 124 | CHI$_3$ | Na$_2$S$_2$O$_4$/ NaHCO$_3$ | OV$^{2+}$ | — | 200/1/4/0/0.0035/ 2.2/0 | 9,925 | 1.509 | 24 | 71.54 | 7/3 H$_2$O/THF |
| 125 | CHI$_3$ | Na$_2$S$_2$O$_4$/ NaI/ NaHCO$_3$ | OV$^{2+}$ | — | 200/1/2/4/0.0035/ 2.2/0 | 8,903 | 1.467 | 66 | 71.40 | 7/3 H$_2$O/THF |
| 126 | CHI$_3$ | Na$_2$S$_2$O$_4$/ NaI/ NaHCO$_3$ | OV$^{2+}$ | — | 200/1/2/8/0.0035/ 2.2/0 | 8,915 | 1.445 | 66 | 69.87 | 7/3 H$_2$O/THF |
| 127 | CHI$_3$ | Na$_2$S$_2$O$_4$/ NaI/ NaHCO$_3$ | OV$^{2+}$ | — | 200/1/2/12/0.0035/ 2.2/0 | 9,819 | 1.450 | 66 | 69.19 | 7/3 H$_2$O/THF |
| 128 | CHI$_3$ | Na$_2$S$_2$O$_4$/ NaI/ NaHCO$_3$ | OV$^{2+}$ | — | 200/1/4/8/0.00175/ 2.2/0 | 10,002 | 1.467 | 66 | 75.02 | 7/3 H$_2$O/THF |
| 129 | CHI$_3$ | Na$_2$S$_2$O$_4$/ NaI/ NaHCO$_3$ | OV$^{2+}$ | — | 200/1/4/8/0.0035/ 2.2/0 | 11,369 | 1.495 | 66 | 81.95 | 7/3 H$_2$O/THF |
| 130 | CHI$_3$ | Na$_2$S$_2$O$_4$/ NaI/ NaHCO$_3$ | OV$^{2+}$ | Brij ® 98 | 200/1/2/8/0.00175/ 2.2/2180 | 8,961 | 1.461 | 66 | 60.04 | 7/3 H$_2$O/THF |
| 131 | CHI$_3$ | Na$_2$S$_2$O$_4$/ NaI/ NaHCO$_3$ | OV$^{2+}$ | Brij ® 98 | 200/1/2/4/0.00175/ 2.2/4160 | 7,626 | 1.512 | 24 | 50.24 | 2/1 H$_2$O/THF |
| 132 | CHI$_3$ | Na$_2$S$_2$O$_4$ NaCl/ NaHCO$_3$ | OV$^{2+}$ | — | 200/1/4/8/0.0035/ 2.2/0 | 11,482 | 1.529 | 66 | 85.48 | 7/3 H$_2$O/THF |
| 133 | CHI$_3$ | Na$_2$S$_2$O$_4$/ NaHCO$_3$ | OV$^{2+}$ | — | 200/1/2/0/0.0035/ 2.2/0 | No rxn | — | 24 | 0.0 | THF |
| 134 | CHI$_3$ | Na$_2$S$_2$O$_4$/ NaHCO$_3$ | OV$^{2+}$ | — | 200/1/2/0/0.0035/ 2.2/0 | 2,033 | 1.623 | 24 | 20.11 | H$_2$O |
| 135 | CHI$_3$ | Na$_2$S$_2$O$_4$/ NaHCO$_3$ | MV$^{2+}$ | — | 200/1/2/0/0.0035/ 2.2/0 | 7,457 | 1.489 | 24 | 53.58 | 2/1 H$_2$O/THF |
| 136 | CHI$_3$ | Na$_2$S$_2$O$_4$/ NaHCO$_3$ | MV$^{2+}$ | — | 200/1/2/0/0.0035/ 2.2/0 | 9,059 | 1.455 | 66 | 69.01 | 7/3 H$_2$O/THF |
| 137 | CHI$_3$ | Na$_2$S$_2$O$_4$/ NaHCO$_3$ | MV$^{2+}$ | — | 200/1/2/0/0.0065/ 2.2/0 | 8,599 | 1.455 | 66 | 67.82 | 7/3 H$_2$O/THF |
| 138 | CHI$_3$ | Na$_2$SO$_3$/ NaHCO$_3$ | MV$^{2+}$ | — | 200/1/2/0/0.0035/ 2.2/0 | 2,382 | 1.746 | 66 | 16.91 | 7/3 H$_2$O/THF |
| 139 | CHI$_3$ | Na$_2$S$_2$O$_4$/ NaHCO$_3$ | — | Methocel ® F50 | 200/1/2/0/0/ 2.2/600 | 10,504 | 1.492 | 45 | 78.15 | 2/1 H$_2$O/THF |
| 140 | CHI$_3$ | Na$_2$S$_2$O$_4$/ NaHCO$_3$ | — | Methocel ® F50 | 200/1/2/0/0/ 2.2/1000 | 9,644 | 1.472 | 45 | 74.99 | 2/1 H$_2$O/THF |
| 141 | CHI$_3$ | Na$_2$S$_2$O$_4$/ NaHCO$_3$ | — | NaDDS | 200/1/2/0/0/ 2.2/2085 | 3,862 | 1.795 | 24 | 30.43 | 2/1 H$_2$O/THF |
| 142 | CHI$_3$ | Na$_2$S$_2$O$_4$/ NaHCO$_3$ | — | NaDDS | 200/1/2/0/0/ 2.2/3130 | 8,442 | 1.524 | 45 | 62.93 | 2/1 H$_2$O/THF |
| 143 | CH$_3$CH (I)Cl | Na$_2$S$_2$O$_4$/ NaHCO$_3$ | — | — | 200/1/2/0/0/ 2.2/0 | 8,945 | 1.743 | 66 | 60.86 | 2/1 H$_2$O/THF |
| 144 | CH$_2$I$_2$ | Na$_2$S$_2$O$_4$/ NaHCO$_3$ | — | — | 200/1/2/0/0/ 2.2/0 | 8,162 | 1.861 | 66 | 37.34 | 2/1 H$_2$O/THF |
| 145 | CF$_3$(CF$_2$)$_7$ CH$_2$CH$_2$I | Na$_2$S$_2$O$_4$/ NaHCO$_3$ | OV$^{2+}$ | Brij ® 98 | 200/1/2/0/0.00175/ 2.2/2180 | 9,408 | 2.291 | 69 | 3.35 | 7/3 H$_2$O/THF |
| 146 | CF$_3$(CF$_2$)$_9$I | Na$_2$S$_2$O$_4$/ NaHCO$_3$ | OV$^{2+}$ | — | 200/1/2/0/0.0035/ 2.2/0 | 7,554 | 1.676 | 24 | 45.39 | 7/3 H$_2$O/THF |
| 147 | CHBr$_3$ | Na$_2$S$_2$O$_4$/ NaHCO$_3$ | — | — | 200/1/2/0/0/ 2.2/0 | 7,943 | 1.945 | 45 | 46.61 | 2/1 H$_2$O/THF |
| 148 | CHBr$_3$ | Na$_2$S$_2$O$_4$/ NaHCO$_3$ | OV$^{2+}$ | Brij ® 98 | 200/1/2/0/0.00175/ 2.2/4160 | 6,767 | 2.033 | 24 | 71.52 | 2/1 H$_2$O/THF |
| 149 | CBr$_4$ | Na$_2$S$_2$O$_4$/ NaHCO$_3$ | — | — | 200/1/2/0/0/ 2.2/0 | 6,478 | 2.150 | 45 | 51.17 | 2/1 H$_2$O/THF |
| 150 | CBr$_4$ | Na$_2$S$_2$O$_4$/ NaHCO$_3$ | OV$^{2+}$ | Brij ® 98 | 200/1/2/0/0.0035/ 2.2/4160 | 7,360 | 2.117 | 24 | 50.86 | 2/1 H$_2$O/THF |
| 151 | CBr$_4$ | Na$_2$S$_2$O$_8$/ HCOONa/ NaHCO$_3$ | — | — | 200/1/2/2/0/ 0/2.2/0 | 3,226 | 2.592 | 66 | 16.59 | 2/1 H$_2$O/THF |

TABLE 14-continued

Selected examples of non-metallic SET reagents-mediated LRP of VC at 25° C. in H$_2$O, THF and mixtures thereof

| Exp | Init | Catalyst/ Additive/ Buffer | Electron Shuttle | Surfactant | [VC]/[I]/[C]/[A]/ ES]/[ B]/[S]$^{a)}$ | Mn | Mw/Mn | Time (h) | Conv (%) | Solvent |
|---|---|---|---|---|---|---|---|---|---|---|
| 152 | CBr$_4$ | Na$_2$S$_2$O$_8$/ NaHCO$_3$ | — | — | 200/1/2/0/0/ 2.2/0 | 3,722 | 2.449 | 66 | 21.61 | 2/1 H$_2$O/THF |
| 153 | CHI$_3$ | Na$_2$S$_2$O$_3$/ NaHCO$_3$ | — | — | 200/1/2/0/ 2.2/0 | 0,433 | 2.551 | 64 | 3.12 | 2/1 H$_2$O/THF |
| 154 | CHI$_3$ | Na$_2$S$_2$O$_4$/ NaHCO$_3$ | — | NaDDS | 200/1/2/0/ 2.2/2085 | 0,400 | 2.277 | 12 | 1.08 | H$_2$O |
| 155 | CHI$_3$ | NaNO$_2$/ NaHCO$_3$ | — | — | 200/1/2/0/ 2.2/0 | No rxn | — | 38 | 0 | 2/1 H$_2$O/THF |
| 156 | CHI$_3$ | Na$_2$SO$_3$/ NaHCO$_3$ | — | — | 200/1/2/0/ 2.2/0 | 0,722 | 2.851 | 38 | 14.70 | 2/1 H$_2$O/THF |
| 157 | CHI$_3$ | HCOONa/ NaHCO$_3$ | — | — | 200/1/2/0/0/ 2.2/0 | No rxn | — | 137 | 0 | 2/1 H$_2$O/THF |
| 158 | CHI$_3$ | NaBH$_4$/ NaHCO$_3$ | — | — | 200/1/2/0/0/ 2.2/0 | 0,624 | 3.21 | 137 | 9.64 | 2/1 H$_2$O/THF |
| 159 | CHI$_3$ | SnCl$_2$2H$_2$O/ NaHCO$_3$ | — | — | 200/1/2/0/0/ 2.2/0 | 0,519 | 3.818 | 137 | 11 | 2/1 H$_2$O/THF |
| 160 | CHI$_3$ | Na$_2$S$_2$O$_5$/ NaHCO$_3$ | — | — | 200/1/2/0/0/ 2.2/0 | 0,481 | 2.458 | 40 | 5.93 | 2/1 H$_2$O/THF |
| 161 | CHI$_3$ | Na$_2$S$_2$O$_8$/ HCOONa/ NaHCO$_3$ | — | — | 200/1/2/2/0/ 2.2/0 | No rxn | — | 29 | 0 | 2/1 H$_2$O/THF |
| 162 | CBr$_4$ | Na$_2$S$_2$O$_8$/ HCOONa/ NaHCO$_3$ | — | — | 200/1/2/2/0/ 2.2/0 | 4,876 | 2.331 | 94 | 36.74 | 2/1 H$_2$O/THF |
| 163 | CCl$_4$ | Na$_2$S$_2$O$_8$/ HCOONa/ NaHCO$_3$ | — | — | 200/1/2/2/0/ 2.2/0 | 8,757 | 1.943 | 92 | 55.38 | 2/1 H$_2$O/THF |
| 164 | CHI$_3$ | HOCH$_2$SO$_2$ Na 2H$_2$O/ NaHCO$_3$ | — | — | 200/1/2/0/ 2.2/0 | 0,732 | 2.568 | 58 | 7.11 | 2/1 H$_2$O/THF |
| 165 | CHI$_3$ | HOCH$_2$SO$_3$ Na/ NaHCO$_3$ | — | — | 200/1/2/0/ 2.2/0 | 0,488 | 2.609 | 58 | 7.34 | 2/1 H$_2$O/THF |
| 166 | CHI$_3$ | H$_2$NC(=NH) SO$_2$H/ NaHCO$_3$ | — | — | 200/1/2/0/0/ 2.2/0 | 7,407 | 1.509 | 58 | 55.84 | 2/1 H$_2$O/THF |
| 167 | CHI$_3$ | Na$_2$S$_2$O$_4$/ NaHCO$_3$ | — | Methocel ® F50/Alcotex ® 72.5/PVA88 | 200/1/4/0/0/2.2/1400 | 7,130 | 1.860 | 68 | 65.10 | H$_2$O |
| 168 | CHI$_3$ | Na$_2$S$_2$O$_4$/ CH$_3$C$_6$H$_4$S O$_2$Na/ NaHCO$_3$ | — | Methocel ® F50/PVA88 | 200/1/16/2/0/ 1.45/1400$^{b)}$ | 7,660 | 1.650 | 24 | 62.00 | H$_2$O |
| 169 | CHI$_3$ | Na$_2$S$_2$O$_4$/ NaHCO$_3$ | — | — | 25/1/1/0/0/1.1/0 | 1,700 | 2.200 | 4 | 70.00 | H$_2$O |
| 170 | CHI$_3$ | Na$_2$S$_2$O$_4$ CH$_3$C$_6$H$_4$S O$_2$Na/ NaHCO$_3$ | — | Methocel ® F50/PVA88 | 2400/1/4/2/0/ 1.45/5600$^{b)}$ | 90,850 | 2.200 | 72 | 59.00 | H$_2$O |
| 171 | CHI$_3$ | Na$_2$S$_2$O$_4$ CH$_3$C$_6$H$_4$S O$_2$Na/ NaHCO$_3$ | CetMe$_3$ NBr$^{c)}$ | Methocel ® F50/PVA88 | 800/1/4/2/0.03 $^{c)}$/ 1.45/1400$^{d)}$ | 29,700 | 1.990 | 7 | 59.00 | H$_2$O |
| 172 | CH$_2$I$_2$ | Na$_2$S$_2$O$_4$/ NaHCO$_3$ | — | Methocel ® F50/PVA88 | 200/1/16/0/0/ 1.45/1400$^{b)}$ | 12,000 | 1.760 | 53 | 65.50 | H$_2$O |

$^{a)}$Ratio [VC]/[initiator]/[catalyst]/[electron shuttle]/[buffer]/[surfactant] mol/mol/mol/mol/mol/ppm w/w to monomer
$^{b)}$Reaction temperature 35° C.
$^{c)}$Phase transfer catalyst
$^{d)}$Reaction temperature 43° C.

Table 7 presents selected examples of Na$_2$S$_2$O$_4$-catalyzed LRP of VC initiated with iodoform in H$_2$O/THF. Examples 1-22 with the same water-THF ratio 2/1 are plotted in FIG. 1. The two rate constants are observed. $k_{p1}$ represents a liquid-liquid emulsion polymerization when $k_{p2}$ represents a solid-liquid suspension one. Such a transfer takes place after about 24 h at about 60% of VC conversion. $k_{p1} > k_{p2}$ more than 2 times (0.0039 h$^{-1}$ and 0.0015 h$^{-1}$ respectively). M$_n$ is consistent with M$_{th}$ as for a living process. Polydispersity drastically decreases in the beginning of the polymerization with increasing of M$_{th}$ and keeps lower than 1.5 until the end of the process after 66 h (example 19). VC conversion at this point is a little more than 80%. Example 22 without buffer shows low conversion. Change of the H$_2$O/THF ratio to 7/3 (example 23) does not have a significant influence on this reaction.

Table 14 presents selected examples of the room temperature non-metallic SET reagents-mediated LRP of VC in $H_2O$, THF and mixtures thereof. The role of the solvent is illustrated by experiments 133, 134, 154, and 167-172. While in water either in the presence of $OV^{2+}$ or NaDDS or Methorel® F50 and Alcotex® 72.5 and PVA88, or Methocel F50 and PVA88 (with or without PTC) reaction occurs there is no dithionite-catalyzed reaction in dry THF. Different halogen containing compounds, other than iodoform, in conjunction with $Na_2S_2O_4$ can initiate VC polymerization (experiments 143, 144, 145, 146, 149, and 172) both in the presence of electron shuttle and surfactant and without them. The $CO_2$— radical anion precursor $Na_2S_2O_8$—HCOONa is active in conjunction with bromo- or chloro-containing initiators (experiments 151, 152, 162, 163). Higher than 25° C. temperatures can be used: 35° C. (experiments 168, 170, 172) and 43° C. (experiment 171). Different $SO_2$ containing compounds other than $Na_2S_2O_4$ show activity with iodoform as initiator (experiments 152, 156, 160, 164, 165, 166). Some surfactants show activity in experiments 139, 140, 141, 142, 154, 167, 168, 170-172. Additives such as sodium halides are active (experiments 125-132), with the narrowest polydispersity (1.445) and high yeld obtained in experiment 126 as well as sodium para-toluene sulfinate (experiments 168, 170 and 171).

Examples of Preparation of the Chlorine Containing Polymer Utilizing a Non-Metallic Catalyst Materials. Vinyl chloride (VC, 99%) was provided by PolyOne. Iodoform (99%), and sodium dithionate (85%) were purchased from Lancaster. Chloroform (99%), and bromoform (99%) were purchased from ACROS Organics. Tetrahydrofuran (THF, 99%), methylene chloride (99.5%), and methanol (99.8%) were purchased from Fisher Scientific. Alcotex® 72.5 was purchased from Harlow Chemical Co., UK. Methocel® F50 was purchased from the Dow Chemical Company. All other chemicals were purchased from Aldrich and used as received.

Techniques. $^1H$- and $^{13}C$-NMR spectra were recorded on a Bruker DRX500 at 20 C in $CDCl_3$, $CD_2Cl_2$ or THF-$d_8$ with tetramethylsilane (TMS) as internal standard. GPC analysis was performed on a Perkin-Elmer Series 10 high-pressure liquid chromatograph equipped with an LC-100 column oven (22° C.), a Nelson Analytical 900 Series integrator data station, a Perkin-Elmer 785A UV-Vis Detector (254 nm), a Varian Star 4090 RI detector and 2 AmGel (10 µm, 500 Å and 10 µm, $10^4$ Å) columns. Number and weight-average molecular weights were determined against polystyrene standards and were corrected using the Universal Calibration with the following Mark-Houwink parameters for PVC: $K=1.50 \times 10^{-2}$ mL/g, a=0.77.

The polymerizations reported were performed as follows unless otherwise noted: a 50 mL Ace Glass 8648 #15 Ace-Thred pressure tube equipped with bushing and plunger valve was charged with 9 ml of a previously degassed appropriate mixture of water and THF then filled with argon, closed and frozen using MeOH/dry ice. The initiator (0.22 mmol), catalyst (0.43 mmol), buffer (4.8 mmol), optional additive and precondensed VC (3 mL, 0.043 mol) were then added. The exact amount of VC is determined gravimetrically after the reaction. The tube was closed and degassed through the plunger valve by applying reduced pressure and backfilling the tube with Argon15 times at −40° C. The valve was closed and the reaction mixture was stirred in a water bath at 25° C.±0.5° C., behind a protective shield. After the specified reaction time the tube was slowly opened. The excess of VC was distilled and the mixture was poured into MeOH (150 mL). The polymer was ground mechanically, recovered by filtration, then dried in a vacuum oven to a constant weight. The conversion was determined gravimetrically. The kinetic plots were constructed from individual experiments, as sampling of the reaction is not possible.

The samples used for spectral analysis were precipitated twice from THF or $CH_2Cl_2$ solutions in MeOH and dried under vacuum.

A number of polymerization reactions were produced in accordance with the above description. Selected examples from Tables 7 and 14 are presented below.

TABLE 7, EXAMPLE 14

A 50 mL Ace Glass 8648 #15 Ace-Thred pressure tube equipped with bushing and plunger valve was charged with a previously degassed mixture of water (6 mL) and THF (3 mL), then filled with argon, closed and frozen using MeOH/dry ice. Then, the initiator ($CHI_3$, 85.5 mg, 0.22 mmol), catalyst ($Na_2S_2O_4$, 75.6 mg, 0.43 mmol), buffer ($NaHCO_3$, 40.1 mg, 0.48 mmol), and precondensed VC (3 mL, 0.043 mol) were added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C., behind a protective shield. After 33 h, the tube was slowly opened and the excess of VC was distilled and the mixture was poured into MeOH (150 mL). The polymer was ground mechanically, recovered by filtration and dried in a vacuum oven to constant weight to give 1.78 g (66.1%) PVC, $M_n=8,195$; $M_w/M_n=1.465$.

TABLE 14, EXAMPLE 126

A 50 mL Ace Glass 8648 #15 Ace-Thred pressure tube equipped with bushing and plunger valve was charged with a previously degassed mixture of water and THF (volume ratio 7/3, 9 mL), then filled with argon, closed and frozen using MeOH/dry ice. The initiator ($CHI_3$, 85.5 mg, 0.22 mmol), catalyst ($Na_2S_2O_4$, 75.6 mg, 0.43 mmol), buffer ($NaHCO_3$, 40.1 mg, 0.48 mmol), optional electron shuttle ($OV^{2+}$, 0.2 mg, 0.39 µmol) and optional additive (NaI, 263 mg, 1.76 mmol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 66 h, the tube was slowly opened and the excess of VC was distilled and the mixture was poured into MeOH (150 mL). The polymer was ground mechanically, recovered by filtration and dried in a vacuum oven to constant weight to give 2.10 g (69.87%) PVC, $M_n=8,915$; $M_w/M_n=1.445$.

TABLE 14, EXAMPLE 167

A 50 mL Ace Glass 8648 #15 Ace-Thred pressure tube equipped with bushing and plunger valve was charged with a previously degassed 9 ml mixture of deionized water and 24.2 mg of 1.86% water solution of Methocel F50, 46.0 mg of 4.24% water solution of Alcotex 72.5 and 45 mg of 4% water solution of PVA 88 ([Methocel F50]:[Alcotex 72.5]: [PVA 88]=150 ppm:650 ppm:600 ppm w/w relative to VC).

The tube was filed with argon, closed and frozen in MeOH/dry ice. Then, the initiator (CHI$_3$, 85.5 mg, 0.22 mmol), catalyst (Na$_2$S$_2$O$_4$, 151.2 mg, 0.87 mmol), buffer (NaHCO$_3$, 40.1 mg, 0.48 mmol), and precondensed VC (3 mL, 0.043 mol) were added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C., behind a protective shield. After 68 h, the tube was slowly opened, the excess of VC was distilled and the mixture was poured into deionized water (100 mL). The polymer recovered by filtration, rinsed 2 times with 30 ml of deionized water, and dried in a vacuum oven to constant weight to give 1.820 g (65.1%) PVC, $M_n$=7, 130; $M_w/M_n$=1.86.

TABLE 14, EXAMPLE 168

A 50 mL Ace Glass 8648 #15 Ace-Thred pressure tube equipped with bushing and plunger valve was charged with a previously degassed 9 ml mixture of deionized water and 67.7 mg of 1.86% water solution of Methocel F50 and 73.5 mg of 4% water solution of PVA 88 ([Methocel F50]:[PVA=420 ppm:980 ppm w/w relative to VC). The tube was filled with argon, closed and frozen using MeOH/dry ice. Then, the initiator (CHI$_3$, 85.5 mg, 0.22 mmol), catalyst (Na$_2$S$_2$O$_4$, 604.6 mg, 3.5 mmol), buffer (NaHCO$_3$, 26.4 mg, 0.31 mmol), additive sodium para-toluenesulfinate (CH$_3$C$_6$H$_4$SO$_2$Na 46.4 mg, 0.44 mmol), and precondensed VC (3 mL, 0.043 mol) were added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 35° C.±0.5° C., behind a protective shield. After 24 h, the tube was slowly opened and the excess of VC was distilled and the mixture was poured into deionized water (100 mL). The polymer was separated by filtration, rinsed 2 times with 30 ml of deionized water, and dried in a vacuum oven to constant weight to give 1.680 g (62%) PVC, $M_n$=7, 660; $M_w/M_n$=1.65.

TABLE 14, EXAMPLE 169

A 600 mL 5100 Low Pressure Glass Reactor (Parr Instrument Company), equipped with two-impeller mechanical stirrer was charged with Na$_2$S$_2$O$_4$ (6.69 g, 38.4 mmol), NaHCO$_3$ (3.55 g, 42.2 mmol), and 180 mL previously degassed deionized water. At the last turn iodoform (15.12 g, 38.4 mmol) was added. Then reactor was closed and pumped out along with a connecting pipe by water pump for 5 min. After this, 60 g of VC was condensed into the reactor by heating the feeding VC cylinder with hot water (54° C.) within 15 min. The exact amount of VC was determined by weighing the cylinder before and after loading. Rotation speed was 750 RPM. Temperature was maintained 25° C.±0.5° C. After 4 hours reaction was stopped, unreacted VC was distilled and reaction mixture was stripped out by water pump for 10 min. Then, reactor was open, the polymer was moved onto a glass filter, rinsed 3 times with 200 mL of deionized water and dried on the filter then in a vacuum oven until a constant weight at 23° C. Yield 52.5 g (70.0%). $M_{nGPC}$=1,700; $M_{nNMR}$=1,640; $M_w/M_n$=2.2.

TABLE 14, EXAMPLE 170

A 1000 mL 5100 Low Pressure Glass Reactor (Parr Instrument Company), equipped with U-shaped blade mechanical stirrer was charged with Na$_2$S$_2$O$_4$ (464.4 mg, 2.67 mmol), NaHCO$_3$ (81.2 mg, 0.97 mmol), sodium para-toluenesulfinate (CH$_3$C$_6$H$_4$SO$_2$Na 261.6 mg, 1.33 mmol) and a previously degassed 300 mL mixture of deionized water and 9.03 g of 1.86% water solution of Methocel F50 and 9.80 g of 4% water solution of Poly(vinyl alcohol) 87-89% hydrolyzed (PVA 88) ([Methocel F50]:[PVA88]= 1680 ppm:3920 ppm w/w relative to VC). At the last turn iodoform (262.6 mg, 0.67 mmol) was added. Then reactor was closed and pumped out along with a connecting pipe by water pump for 5 min. After this, 100 g of VC was condensed into the reactor by heating of the feeding cylinder with hot water (54° C.) within 20 min, temperature in the reactor was 25° C. The exact amount of VC was determined by weighing the cylinder before and after loading. Rotation speed was 750 RPM. After yellow color of iodoform disappeared (~1 h) temperature was increased up to 35° C. and rotation speed was decreased to 500 RPM. After 72 hours reaction was stopped, unreacted VC was distilled and reaction mixture was stripped out by water pump for 10 min. Then, reactor was open, the polymer was moved onto a glass filter, rinsed 3 times with 400 mL of deionized water and dried on the filter then in a vacuum oven until a constant weight at 23° C. Yield 59.2 g (59%). $M_{nGPC}$=90, 850; $M_w/M_n$=2.2.

TABLE 14, EXAMPLE 171

A 50 mL Ace Glass 8648 #15 Ace-Thred pressure tube equipped with bushing and plunger valve was charged with a previously degassed 9 ml mixture of deionized water and 67.7 mg of 1.86% water solution of Methocel F50 and 73.5 mg of 4% water solution of PVA 88 ([MF50]:[PVA 88]=420 ppm:980 ppm w/w relative to VC). The tube was filled with argon, closed and frozen using MeOH/dry ice. Then, the initiator (CHI$_3$, 21.4 mg, 0.054 mmol), catalyst (Na$_2$S$_2$O$_4$, 37.8 mg, 0.22 mmol), buffer (NaHCO$_3$, 6.6 mg, 0.079 mmol), additive sodium para-toluenesulfinate (CH$_3$C$_6$H$_4$SO$_2$Na 21.3 mg, 0.109 mmol), PTC (CetMe$_3$NBr, 0.59 mg, 0.002 mmol) and precondensed VC (3 mL, 0.043 mol) were added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 43° C.±0.5° C., behind a protective shield. After 7 h, the tube was slowly opened, the excess of VC was distilled and the mixture was poured into deionized water (100 mL). The polymer was separated by filtration, rinsed 2 times with 30 ml of deionized water, and dried in a vacuum oven to constant weight to give 1.600 g (59%) PVC, $M_n$=29, 700; $M_w/M_n$=1.99.

TABLE 14, EXAMPLE 172

A 50 mL Ace Glass 8648 #15 Ace-thred pressure tube equipped with bushing and plunger valve was charged with 59.9 mg of CH$_2$I$_2$ and a previously degassed 9 ml mixture of deionized water and 67.7 mg of 1.86% water solution of Methocel F50 and 73.5 mg of 4% water solution of PVA 88 ([F50]:[PVA88]=420 ppm:980 ppm w/w relative to VC). The tube was filled with argon, closed and frozen using MeOH/dry ice. Then, the catalyst (Na$_2$S$_2$O$_4$, 604.6 mg, 3.58 mmol), buffer (NaHCO$_3$, 27.3 mg, 0.325 mmol), and pre-condensed VC (3 mL, 0.043 mol) were added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 35° C.±0.5° C., behind a protective shield. After 53 h, the tube was slowly opened, the excess of VC was distilled and the mixture was poured into deionized water (100 mL). The polymer was separated by filtration, rinsed 2 times with 30 ml of deionized water, and dried in a vacuum oven to constant weight to give 1.78 g (65.5%) PVC, $M_n$=12,000; $M_w/M_n$=1.76.

Living Radical Polymerization of Acrylic Monomers in the Presence of Initiator Terminated Halogen-Containing Polymers and the Formation of Block Copolymers Thereof Metal Catalysts It has now been found that the block copolymers can be made from initiator containing halogen-containing polymers such as poly(vinyl chloride) and one or more acrylic monomers such as acrylonitrile or various alkyl acrylates or various alkyl alkacrylates with either metal catalysts or metal free catalysts. The number average molecular weight of the halogen-containing block such as poly(vinyl chloride) can generally range from about 800 to about 150,000, desirably from about 1,000 to about 50,000, and preferably from about 1,200 to about 40,000.

It is also been found that block copolymers can be made from initiator-containing acrylic polymers such as poly (methyl acrylate), poly(butyl acrylate), poly(tert-butyl acrylate), poly(2-ethylhexyl acrylate) or poly(methyl methacrylate) and one or more halogen-containing monomers such as vinyl chloride with either metal catalysts or metal-free catalysts and the same will be discussed herein below.

The block copolymers of the present invention generally are AB or the $A_nB$ type block copolymers where A is derived from an acrylic monomer and B is a halogen-containing macroinitiator such as an initiator containing PVC, and n is from 1 to about 6, desirably from 1 to about 3, and preferably 1 or 2. Halogen-containing polymers are set forth herein above and the same are fully incorporated by reference. Examples of such suitable polymers include polyvinyl chloride, polyvinylidene chloride, polytetrafluoroethylene, poly (1-chloro-1-fluoroethylene), and the like with poly(vinyl chloride) being highly preferred. Such block polymers having initiator groups thereon can be made in a manner as set forth hereinabove with regard to the polymerization of halogen-containing monomers such as poly(vinyl chloride). Accordingly, the above preparation is hereby fully incorporated by reference. Specific examples of preparation of poly(vinyl chloride) polymers is set forth in Examples 39-41, 46, 97-101, 104, 107, and 154, all of which are fully incorporated by reference. Such poly(vinyl chloride) polymers generally contain an iodo or an organo iodo end group which serves as a site for initiation and polymerization of acrylic monomers. As noted above, the halogen containing monomers can be polymerized either utilizing metal catalysts such as various copper catalysts desirably in association with a ligand, or various metal-free catalysts desirably in association with a buffer. Metal-free catalysts are generally preferred inasmuch as they do not color the formed polymer and tend to be more stable.

The various acrylic monomers which can be utilized include acrylonitrile, and desirably include acrylates such as various alkyl acrylates wherein the alkyl portion contains from 1 to 10 carbon atoms or an alkyl alkacrylate wherein the alkyl group contains from 1 to about 10 carbon atoms such as methyl, ethyl, propyl, or butyl, tert-butyl or 2-ethylhexyl with methyl being preferred, and the alk group contains from 1 to 3 carbon atoms with methacrylate being preferred. Suitable alkyl acrylates include methyl acrylate, ethyl acrylate, butyl acrylate, tert-butyl acrylate and 2-ethylhexyl acrylate are desired with methyl acrylate being preferred. Methyl methacrylate is highly preferred. Other acrylate monomers include the various $C_3$ to $C_8$ cycloalkyl acrylates and the $C_7$ to $C_{15}$ bicycloalkyl acrylates such as norbornyl and isonorbornyl, as well as the various tricycloalkyl (e.g. adamantyl) acrylates, or combinations thereof. Similarly, the methacrylates derivatives of the various mono, bi, and tri cycloalkyl acrylates can also be utilized. One or more monomers can be polymerized so that homopolymers or copolymers can be made.

Other vinyl monomers which can be polymerized with the initiator containing halogen type polymers, either in combination therewith or in lieu thereof, include styrene as well as substituted styrenes and the same include α-methyl styrene, para-tert-butyl styrene, para-methoxy styrene, and the like. Other monomers include acrylamide and methacryamide, vinyl ketones having a total of from 4 to about 10 carbon atoms, esters of maleic acid having a total of from 5 to about 15 carbon atoms, and the like. These other monomers which can be utilized in lieu of the acrylic monomers are formed in generally the same way and utilize the various above components such as a metal catalysts or a metal-free catalyst, a ligand, or a buffer, etc. as well as generally the same reaction conditions as set forth hereinabove which are hereby fully incorporated by reference.

Either metal catalysts or metal-free catalysts can be utilized when forming the various acrylic blocks. When polymerizing alkyl acrylate monomers, either metal or metal-free catalysts can be utilized with the later being preferred. When polymerizing alkyl alkacrylates, metal catalysts are highly preferred since they yield better results than metal free catalysts. Considering the metal catalysts, they can include metal having a zero valence or a positive valence in the form of a complex or ligand. Examples of metal catalysts include derivatives of ruthenium, iron, copper, nickel, palladium, rhodium, rhenium, molybdenum, titanium and cobalt, with copper metal and copper (I) being preferred. Derivatives of Cu(I) include CuX where X equals Cl, Br, I, SPh, PF$_6$, SCN, N$_3$, CF$_3$SO$_3$, and the like or Cu$_2$Y wherein Y equals O, S, Se, Te, and the like.

The amount of metal catalysts utilized in the polymerization of the block copolymer is generally dependent upon a desired reaction rate. Typically, the amount of catalysts will range from about 0.01 or about 0.1 to about 10, desirably from about 0.5 or about 0.75 to about 4 or about 5, and preferably from about 1 to about 2 or 3 moles per mole of halide in the initiator.

A preferred aspect of the present invention is to utilize copper (O) and copper (I) in the form of complexes especially with nitrogen containing ligands. Examples of such copper catalysts are set forth hereinabove and are hereby fully incorporated by reference. The ligands can contain 2, 3, or 4 nitrogen atoms, e.g. bidentates, tridentates, and tetradentates. Examples of suitable bidentate ligands include N,N,N',N'-tetramethyl-ethane-1,2-diamine; [2-(2-dimethylamino-ethoxy)-ethyl]-dimethyl-amine; 2-(4,5-dihydro-oxazol-2-yl)-pyridine; [1,10]phenanthroline; 4,7-diphenyl-[1, 10]phenanthroline; dodecahydro-7,14-methano-dipyrido[1,2-a; 1',2'-e][1,5]diazocine (trivial name Sparteine); 2,2'-bipyridine (bpy); 5,5'-dialkyl-2,2'-bipyridine (alkyl $C_1$-$C_{13}$); 4,4'-dialkyl-2,2'-bipyridine (alkyl $C_1$-$C_9$); N-alkyl-2-pyridylmethanimine (alkyl $C_2$-$C_{20}$); aryl-pyridin-2-ylmethylene-amine (aryl-phenyl, 2,4,6-trimethyl phenyl); alkyl-(phenyl-pyridin-2-yl-methylene)-amine (alkyl $C_2$-$C_{10}$); alkyl-(1-pyridin-2-yl-ethylidene)-amine (alkyl $C_1$-$C_{10}$); N,N'-dialkylyletanediimine (alkyl $C_2$-$C_{10}$); and the like. 2,2'-bipyridine (bpy) is highly preferred.

Examples of suitable tridentate ligands include N,N,N',N'',N''-pentaalkyldiethylenetriamine (alkyl $C_1$-$C_{11}$); N,N-bis(2-pyridylmethyl)alkylamine (alkyl $C_2$-$C_{10}$); N-(2-pyridinylmethylene)-2-pyridinemethanamine; N,N',N''-trimethyl-1,4,7-triazacyclononane; N,N-dimethyl-N'-pyridin-2-ylmethylene-methanediamine; 2,6-[bis(2-alkylimino-2-ethyl)]pyridine (alkyl $C_2$-$C_8$); 4,4',4''-trialkyl-[2,2'; 6',2'']terpyridine (alkyl $C_1$-$C_{10}$); 2,6-bis[4-alkyl]-2-oxazolin-2-yl]pyridine ($C_1$-$C_4$); 4-[7-(4,5-dihydro-2-oxazolyl)heptyl]-4'-methyl-2,2'-bipyridine; and the like.

Examples of suitable tetradentate ligands include tris(2-aminoethyl)amine; 1,1,4,7,10,10-hexamethyltriethylenetetramine (HMTETA); 5,5,7,12,12,14-hexamethyl-1,4,8,11-tetraazacyclotetradecane; 1,4,8,11-tetramethyl-1,4,8,11-tetraazacyclotetradecane; N,N'-ethylenebis(pyridine-2-carbaldimine); tris[2-(dimethylamino)ethyl]amine ($Me_6$-TREN); tris(2-pyridylmethyl)amine; tris[di(carbalkoxyethyl)aminoethyl]amine (alk $C_1$-$C_4$); and the like, with $Me_6$-TREN, and HMTETA being highly preferred.

Examples of polydentate ligands include 1,3,5-tris(dimethylaminopropyl)-1,3,5-triazacyclohexane; and permethyl(polyethyleneimine) (MePEI).

Although optional, ligands are generally preferred and the amount thereof is from about 0.1 to about 10 moles, desirably from about 0.75 to about 3 moles, and preferably from about 1 to about 2 moles of ligand per mole of catalyst.

Highly preferred catalyst systems include CuCl/2,2'-bipyridine (bpy), CuCl/tris[2-(dimethylamino)ethyl]amine ($Me_6$-TREN) and Cu(O)/$Me_6$-TREN.

The living radical block copolymer polymerization of the present invention utilizing metal catalysts is desirably carried out in a diluent such as those set forth hereinabove with respect to polymerization of the halogen-containing monomers and such diluents are hereby fully incorporated by reference. Organic diluents are generally utilized such as various sulfoxides, ethers, amides, ketones, and phosphorus containing compounds. Examples of suitable diluents include dimethylsulfoxide (DMSO), diphenyl ether, N,N-dimethylformamide (DMF), N-methylformamide, formamide, N,N-dimethyl acetamide, N,N,N',N'-tetramethyl urea, 1,3-dimethyl-tetrahydro-pyrimidin-2-one, acetone, methylethylketone, acetonitrile, N-methyl-2-pyrrolidone, hexamethylphosphotriamide, 1-butyl-3-methylimidazolium hexafluorophosphate, and the like. The amount of the diluent is generally the same as set forth hereinabove with regard to the metal catalyzed PVC polymerization and thus generally ranges from about 25 to about 1,000, desirably from about 50 to about 500, and preferably from about 75 to about 400 parts by weight per 100 parts by weight of the acrylic-containing monomer.

The reaction conditions for the metal catalyzed polymerization of acrylic monomers onto the halogen-containing polymer generally range from about 0° C. to about 150° C., desirably from about 10° C. or about 25° C. to about 90° C. or about 130° C. Desirably the acrylate monomers are polymerized at temperatures as from about 25° C. to about 80° C. and the reaction is carried out in the presence of an inert atmosphere such as nitrogen or argon.

Metal Free Catalyst

Metal free catalyst systems include those set forth hereinabove which are fully incorporated by reference. Such catalysts generally contain low valent sulfur salt such as an $SO_2$ group and polydialkylamino-substituted unsaturated organic compounds. Examples of such catalysts, as set forth above, include $Na_2S_2O_4$ and $H_2NC(=NH)SO_2H$. Other metal free catalyst include $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, $(Me_2N)_2C=C(NMe_2)_2$.

The amount of metal free catalysts is generally from about 0.01 or 0.1 to about 4 or to about 16, desirably from about 0.05 to about 4, and preferably from about 0.1 to about 1 or 2 mole of catalyst per mole of halide in the initiator of a halogen-containing polymer.

When metal-free catalysts are utilized to effect free radical polymerization of acrylic monomers from a halogen-containing block copolymer such as PVC containing initiator groups thereon, it is highly desirable to utilize one or more buffer compounds to avoid acidic decomposition of the sulfur containing catalysts. Suitable buffers are set forth hereinabove and include alkaline salts of inorganic and organic acids, which water solutions keep pH 8-10, such as $NaHCO_3$, $Na_2HPO_4$, $NaH_2PO_4$, $CH_3COONa$ or the potassium or ammonium slats thereof, including $KHCO_3$, $K_2HPO_4$, $KH_2PO_4$, $CH_3COOK$, $NH_4HCO_3$, $(NH_4)HPO_4$, $NH_4H_4PO_4$, $CH_3COONH_4$, and the like.

If a buffer is utilized, the amount thereof is generally from about 0.05 to about 5, desirably from about 0.2 to about 3, and preferably from about 1 to about 1.2 moles of buffer compound per mole of catalysts. An optional compound which can be utilized with the metal-free catalyst is an electron shuttle which accelerates the radical initiation and the like. Such electron shuttles are set forth hereinabove and accordingly are fully incorporated by reference and examples of the same include 1,1'-dimethyl-4,4'-bipyridinium dichloride, methyl viologen ($MV^{2+}$), 1,1'-di-n-octyl-4,4'-bipyridinium dibromide, octyl viologen ($OV^{2+}$), and the like. If the shuttle is utilized, the amount thereof is generally from about 0.00001 to about 1.0 moles and preferably from about 0.001 to about 0.005 moles of shuttle per mole of the metal free catalysts.

The diluent or solvent utilized with the metal-free catalysts is generally water or a mixture of water and an organic solvent. The use of various solvents is set forth hereinabove and for purposes of brevity, the same is fully incorporated by reference. While water is preferred, polar water and/or polymer soluble organic solvents include tetrahydrofuran (THF), dimethylformadide (DMF), dimethylsulfoxide (DMSO), cyclohexanone, chlorobenzene, dichlorobenzene, trichlorobenzene, xylene, diphenylether, 1,2-dichloroethane, dioxane, acetone, diethyloxalate, ethylhexyphtalate, methanol, ethanol, butanol, or combinations thereof. The amount of solvent is generally from about 1 to about 10 parts by volume of acrylic monomer and preferably from about 2 to about 4 parts by volume.

As before, the utilization of a surfactant is optional but generally desired. Suitable surfactants are set forth hereinabove and thus fully incorporated by reference and specific examples include sodium dodecylsulfate (NaDDS), hydroxylpropyl methylcellulose (Methocel® F50), 87%-89% hydrolyzed poly(vinyl acetate) [poly(vinyl alcohol), containing 11%-13% acetate groups PVA88], 72.5% hydrolyzed polyvinyl acetate (Alcotex® 72.5), polyoxyethylene

(10) oleyl ether (Brij® 97), and polyoxyethylene (20) oleyl ether (Brij® 98), or combination thereof.

The amount of surfactants are generally small and generally range from about 0.1 to about 50,000 parts per million (ppm) w/w, desirably from about 1 to about 10,000 ppm w/w, and preferably from about 10 to about 5,000 parts per million (ppm) w/w relative to acrylic type monomer.

Various additives can also be utilized in the polymerization of the acrylic monomers utilizing metal free catalysts as set forth hereinabove and examples include sodium iodide, ammonium iodide, tetrabutyl ammonium iodide, sodium chloride, and $pCH_3C_6H_4SO_2Na$.

The reaction conditions with regard to the metal free catalyzed reaction of acrylic monomers includes polymerization in an inert atmosphere such as argon or nitrogen, and reaction at temperatures of from about −40° C. if the diluent is liquid at such temperature to as high as about 100° C., desirably from about 0° C. to about 90° C., and preferably from about 20° C. to about 90° C.

Block Copolymer Formation

Regardless of whether a metal catalyst or a metal-free catalyst is utilized to polymerize various acrylic type monomers onto a halogen-containing block copolymers, the initiators on the polymer such as PVC are generally the same. These initiators derived from the polymerization of the halogen-containing monomer such as vinyl chloride are set forth hereinabove and fully incorporated by reference. Numerous different types of initiators are set forth which often include halide-containing initiators such as chlorine and iodine atoms. Depending upon the type of block copolymer to be formed, which contains at least one A block and at least one B block, different functional initiators are utilized. Thus, to form an AB block wherein the B block is derived from a vinyl halide monomer such as vinyl chloride, a monofunctional initiator is utilized. Similarly, to attain a diblock copolymer a difunctional initiator is utilized and for the preparation of a star block copolymer, a trifunctional or a multifunctional initiator containing three or more functional groups is utilized, e.g. $A_nB$. n can be 1 to 6 and desirably 1 to about 3, with 1 or 2 being preferred. In the preparation of the block copolymers of the present invention, iodo functional initiators are preferred to form a halide-containing polymer such as PVC from which can be initiated monomers of alkyl acrylates, alkyl alkacrylates, etc.

The various initiators which can be used to form the B block via a metal catalyst or a metal-free catalyst include iodo containing initiators having an electron withdrawing group adjacent to the halide atom and such initiators include ~$CF_2I$, ~$CH(Cl)I$, ~$CHI_2$, ~$CF(Cl)I$, ~$C(CN)HI$, ~$C(COOAlk)HI$, ~$C(COOAlk)I$, ~$SO_2I$. Examples of monofunctional iodo initiators which propagate halogen containing monomers in one direction include $C_nF_{2n+1}I$ (n=1-20), $CH_3CH(Cl)I$, $ICH_2COOAlk$ (Alk $C_1$-$C_2$), $ICH_2CN$, $CH_2I_2$, $I(CH_3)_2COOAlk$ (Alk $C_1$-$C_{20}$), $ArSO_2I$ (Ar-phenyl, 4-methylphenyl, 4-methoxyphenyl), CH(Cl)I-COOEt, and the like. Difunctional initiators which propogate polymerization of monomers in two directions and produce a difunctional I-PVC-I macroinitiator include $I(CF_2)_nI$ (n=1-16), $CHI_3$, as well as other initiators which contain two ~CH(Cl)I groups or ~$SO_2I$ groups. Multifunctional initiators include iodo initiators which contain three or more —CH(Cl)I groups and the like.

The amount of initiators utilized to form the halogen-containing block polymer are as set forth hereinabove with respect to the metal catalyst system and the metal-free catalyst system and the same are hereby fully incorporated by reference.

An important aspect of the present invention is that since the molecular weight of the alkyl acrylate blocks or the alkyl alkacrylate blocks are dependent upon the amount of monomer utilized, the molecular weight of the A or acrylate block can be regulated. Desired number average molecular weight of alkyl acrylate blocks such as methyl acrylate range from about 500 to about 1,000,000, desirably from about 1,000 to about 500,000, and preferably from about 1,500 to about 150,000. The number average molecular weight of alkyl alkacrylate blocks such as poly(methyl methacrylate) generally range from about 1,000 to about 1,200,000, desirably from about 2,000 to about 600,000, and preferably from about 2,500 to about 200,000. An advantage of the present invention is that the alkyl acrylate or alkyl alkacrylate block polymers have a narrow molecular weight distribution range, i.e. $M_w/M_n$, of from about 1.1 to about 2.7, more desirably from about 1.1 to about 2.1 or about 2.4, and preferably from about 1.1 to about 1.5. Such low molecular weight distributions result in improved properties such as mechanical strength and environmental stability. The block copolymers can also be made in very short reaction times such as less than 200 minutes and desirably less than 30 minutes.

An important aspect of the present invention is the formation of the various block copolymers described hereinabove is a lack or non-use of conventional free radical initiators. That is, free radical initiators such as various peroxides, various persulfates, and various Redox initiators are not utilized. If utilized, they are utilized in very small amounts such as about 5% by weight or less, desirably about 3% or less by weight, and preferably about 1% or less by weight based upon the total weight of the various metal catalysts of the present invention. It is highly preferred that no such conventional free radical catalyst whatsoever be utilized.

Living radical polymerization and the formation of the block copolymers whether utilizing a metal catalyst or a metal free catalyst are generally the same and are desirably carried out in an inert atmosphere such as argon, or nitrogen in the presence of the above noted catalysts and initiators generally in a sealed vessel. As noted above, reaction temperatures when metal-free catalysts are used can vary from minus 40° C. if the diluent is a liquid at such temperature and as high as about 100° C., desirably from about 0° C. to about 90° C., and preferably from about 20° C. to about 90° C. Desirable reaction temperatures when metal catalysts are utilized range from about 0° C. to about 150° C.; desirably from about 10° C., or 25° C., or 90° C. to about 130° C., and preferably from about 25° C. to about 80° C.

The block copolymers of the present invention unexpectedly have improved properties such as a single $T_g$ although the copolymer contains two or more blocks. Unexpectedly high single $T_g$'s of from about 102° C. to about 120° C. are obtained when the A block is a poly(alkyl alkarylate) while polyvinyl chloride typically has a $T_g$ of about 83° C. and poly(methyl methacrylate) typically has a $T_g$ of about 105° C. The block coplymers of the present invention are engineering plastics and have high heat distortion temperatures such as from about 95° C. to about 125° C. and desirably from about 110° C. to about 125° C. Accordingly, the block copolymers can be used in the applications involving hot water up to and including about 100° C., such as piping, and the like. When the acrylic block is derived from an alkyl acrylate the same, depending on the structure of the acrylate, can serve as an internal plasticizer and the block copolymer have $T_g$ lower than about 20° C., preferably lower than about 0° C. and preferably lower than minus 25° C. and more preferably from about minus 40° C. to about minus 25° C. and will not bleed or leach out since it is chemically bound to the PVC. Uses include soft, flexible children's toys, blood bags, flexible tubing for various fluids and the like. Other uses include a replacement where plasticized PVC or other elastomers have been utilized.

The invention will be better understood by the following examples and descriptions which serve to illustrate the invention but not to limit the same.

EXAMPLE I

Metal Catalyzed Living Radical Polymerization and Block Copolymerization of Methyl Acrylate Initiated From an α,ω-di(iodo) PVC Macro Initiator A block copolymer of PMA-b-PVC-b-PMA was made by Cu(O)/Me$_6$-TREN catalyzed living radical block copolymerization of methyl acrylate (MA) initiated from α,ω-di(iodo)PVC in DMSO. The living radical block polymerization was carried out at temperatures of 90° C., 50° C. and 25° C. and kinetic plots are set forth in FIG. I-1 for the following conditions [α,ω-di(iodo)PVC]$_0$/[Cu(O)]$_0$/[Me$_6$-TREN]$_0$/[MA]$_0$=2/2/1/111 (molar ratios). As apparent from the figures, relatively high conversions of at least 80% were rapidly achieved as in 25 minutes or less. Even with these ultra fast block copolymerization times, molecular weight distribution values of about 1.50 were obtained!

A procedure for the block copolymerization of methyl acrylate initiated from α,ω-di(iodo)PVC is as follows: 210 mg of α,ω-di(iodo)PVC macroinitiator ($M_n$=2,100 $M_w/M_n$=1.84, 0.1 mmol), Cu(O) (12.8 mg, 0.2 mmol) Me$_6$-TREN (46.0 mg, 0.1 mmol), MA (1.0 mL, 0.2 mmol) and DMSO (0.5 mL) were placed in a 25 mL Schlenk tube. The tube was sealed (rubber septum with a screw cap). The reaction mixture was degassed using standard freeze-pump-thaw cycles and the tube was charged with dry Ar. The reaction mixture was maintained at 25±0.1° C. under stirring and sampled with an airtight syringe at predetermined times. Monomer conversion was determined by 500 MHz $^1$H-NMR sprectroscopy while $M_n$ and $M_w/M_n$ values by gel permeation chromatography relative to PMMA standards. The polymerization was stopped after 25 minutes and the reaction mixture was dissolved in 10 ml of THF and precipitated in 100 ml of H$_2$O/MeOH mixture (1/2 v/v). The precipitated block copolymer was filtered and dried.

Techniques for calculating the various values were as follows: $^1$H-NMR spectra (500 MHz) were recorded on a Bruker DRX500 at 32° C. in CD$_2$Cl$_2$ and CDCl$_3$ with tetramethylsilane (TMS) as internal standard. Gel permeation chromatography (GPC) analysis was performed on a Perkin-Elmer Series 10 high-pressure liquid chromatograph equipped with an LC-100 column oven (40° C.), a Nelson Analytical 900 Series integrator data station, a Perkin-Elmer 785A UV-Vis Detector (254 nm), a Varian Star 4090 RI detector and two AmGel (10 μm, 500 Å and 10 μm, 10$^4$ Å) columns. THF (Fisher, HPLC-grade) was used as eluent at a flow rate of 1 mL/min. Number-average ($M_n$) and weight-average ($M_w$) molecular weights were determined against PMMA standards.

As apparent from the figures, the copper-ligand catalyst system utilized provided ultra fast living reaction block copolymerization of the acrylates from a difunctional PVC center block.

EXAMPLE II

Formation of PMMA-b-PVC-b-PMMA Block Copolymers Derived from α,ω-Di(Iodo)PVC Utilizing Various Different Copper Catalysts, Different Solvents, Different Ligands, and Different Number Average PVC Blocks Synthesis of α,ω-Di(Iodo)PVC α,ω-Di(Iodo)PVC with number average molecular weight ($M_n$) ranging from 2,100 to 20,000 and molecular weight distribution values ($M_w/M_n$) from 1.72 to 2.16 were synthesized by SET-DTLRP of VC initiated with CHI$_3$ and catalyzed by Na$_2$S$_2$O$_4$ at 25° C.-35° C. in H$_2$O by a method as set forth herein above.

Influence of Copper Catalyst/bpy on the Rate of Block Copolymerization of MMA

The efficiency of various copper/bpy catalysts on the living radical block copolymerization of MMA initiated from the chain ends of α,ω-Di(Iodo)PVC with $M_n$=2,100 and $M_w/M_n$=1.84 was investigated by kinetic experiments carried out at 90° C. by using Ph$_2$O as diluent. All block copolymerization experiments were performed in 25 mL Schlenk tubes. Since PVC is not soluble in MMA or Ph$_2$O, at the beginning of the polymerization the reaction mixture is heterogeneous. As the conversion increases, the resulting PMMA-b-PVC-b-PMMA becomes soluble both in MMA and Ph$_2$O and as a consequence the reaction mixture becomes homogeneous. CuCl/bpy Cu(O)/bpy and Cu$_2$Te/bpy were investigated as catalysts in these block copolymerization experiments. Cu(O) and Cu$_2$Te are self-regulated catalytic systems, since they are precursors that generate in situ the extremely reactive nascent catalyst as a molecular dispersion and in the minimum required concentration. Therefore, especially Cu$_2$Te, Cu$_2$O, Cu$_2$S and other related catalysts were able to eliminate side reactions taking place in the case of CuCl catalyst, and subsequently were employed in the synthesis of polymers with complex architectures.

The kinetic analysis of this block copolymerization experiments is shown in FIG. II-1. The CuCl/bpy mediated block copolymerization of MMA in Ph$_2$O exhibits an induction period of about 30 min (FIG. II-1a). Cu(O)/bpy does not initiate the block copolymerization of MMA from the chain ends of α,ω-Di(Iodo)PVC when Ph$_2$O was used as a solvent (Table 1). However, when Cu(O)/bpy was used as a catalyst in DMSO, the block polymerization of MMA initiated from α,ω-Di(Iodo)PVC does not exhibit an induction period and proceeds with an apparent rate constant of propagation almost identical to that of CuCl/bpy catalyzed process in Ph$_2$O (FIG. II-1b, Table 1). Cu$_2$Te/bpy also initiates this block copolymerization without an induction period (FIG. II-1c) and mediates its rate almost as fast as that mediated by CuCl/bpy (Table 1). Most probably, CuI/bpy is generated in situ both in the case of Cu(O)/bpy and Cu$_2$Te/bpy catalysts. Most remarkable is the fact that Cu(O)/bpy in DMSO as well as Cu$_2$Te/bpy in Ph$_2$O produce PMMA-b-PVC-b-PMMA with molecular weight distribution as narrow as the one generated by the CuCl/bpy catalyzed block copolymerization (Table 1). The mechanisms of CuCl/bpy, Cu(O)/bpy and Cu$_2$Te/bpy mediated block copolymerizations are, most probably, different.

Influence of the Polymerization Solvent on the Rate of Block Copolymerization of MMA In the case of block copolymerization mediated by Cu(O)/bpy we have observed a great difference between the experiments performed in Ph$_2$O and those performed in DMSO.

Therefore, the influence of four different solvents, Ph$_2$O, DMSO, cyclohexanone and ethylene carbonate on the block copolymerization experiment catalyzed by CuCl/bpy was made. The influence of the solvent on the CuCl/bpy catalyzed block copolymerization of MMA initiated from the chain ends of α,ω-Di(Iodo)PVC was investigated with the The first important conclusion derived from the data presented in FIG. II-2 is that while the polymerization performed in Ph$_2$O exhibits an induction period (FIG. II-2a) all other solvents used eliminate this induction period. The rate of block copolymerization decreases only slightly when the solvent is changed from Ph$_2$O to DMSO and it is almost half in the case of cyclohexanone (FIG. II-1, Table 2). However, the use of ethylene carbonate produces a higher rate of block copolymerization that even Ph$_2$O (FIG. II-2a, d, Table 2). Most interesting, the molecular weight distribution of the final PMMA-b-PVC-b-PMMA is almost identical, considering the difference in final conversion (Table 2, FIG. II-1a, b, c). Ethylene carbonate seems to be the only solvent that increases the rate of block copolymerization while producing a block copolymer with lower molecular weight distribution (Table 2, FIG. II-2).

Influence of CuCl Ligand on the Block Copolymerization of MMA Initiated from the Chain Ends of α,ω-Di(Iodo)PVC in DMSO The influence of five different ligands, bpy, tris(2-dimethylaminoethyl)amine (Me$_6$-TREN), hexamethyltriethylenetetramine (HMTETA), polyethyleneimine (PEI) and methylated PEI (MePEI) on the CuCl catalyzed block copolymerization of MMA initiated from the chain ends of α,ω-Di(Iodo)PVC was investigated by kinetic experiments (FIGS. II-3, II-4). DMSO eliminates the induction period for the CuCl/bpy process (FIG. II-3a). Me$_6$-TREN increases the rate of block copolymerization by a factor of four by comparison with the rate of CuCl/bpy, which maintains a reasonable low molecular weight distribution (FIG. II-3b). A very interesting result is that Me$_6$-TREN eliminates the induction period also when the block copolymerization is carried out in Ph$_2$O (FIG. II-2b, c). However, the molecular weight distribution of PMMA-b-PVC-b-PMMA is substantially broader when the block copolymer is prepared with the Me$_6$-TREN in Ph$_2$O versus DMSO (FIG. II-3b, c, Table 3). CuCl/HMTETA also produces a higher rate than CuCl/bpy. This increase is by a factor of 1.5 (FIG. II-3d, Table 3). The commercial and inexpencive PEI and its permethylated derivative also increase the rate of block copolymerization by a factor of more than three when compared with that of CuCl/bpy (FIG. II-4a, b, Table 3). One of the most interesting results generated by these experiments is that in DMSO, CuCl catalyses the block copolymerization of MMA initiated from the active chain ends of α,ω-Di(Iodo)PVC even in the absence of a ligand (FIG. 4c). The molecular weight distribution of PMMA-b-PVC-b-PMMA obtained in the absence of a ligand is as narrow as the one obtained in the presence of a ligand (Table 3). However, the rate of block copolymerization is almost by an order of magnitude lower than the one obtained in the presence of bpy (Table 3). An interesting conclusion of these experiments is that by using Me$_6$-TREN or PEI as ligand in CuCl catalyzed block copolymerization of MMA initiated from the chain ends of PMMA-b-PVC-b-PMMA, block copolymers are obtained in over 90% conversion in 30 min reaction time.

CuCl/Me$_6$-TREN Catalyzed Living Radical Block Copolymerization of MMA Initiated from the Chain Ends of α,ω-Di(Iodo)PVC with M$_n$=2,100 to 20,000 in DMSO at 90° C.

CuCl/Me$_6$-TREN in DMSO at 90° C. has been used to investigate the synthesis of PMMA-b-PVC-b-PMMA block copolymers by living radical block copolymerization of MMA initiated from α,ω-Di(Iodo)PVC with M$_n$ from 2,100 to 20,000 and M$_w$/M$_n$ ranging from 1.72 to 2.16. Kinetic experiments for all five samples of α,ω-Di(Iodo)PVC are shown in FIGS. II-5, II-6. Regardless of the molecular weight of the α,ω-Di(Iodo)PVC initiator, block copolymerization experiments do not exhibit any induction period. In all cases PMMA-b-PVC-b-PMMA with M$_w$/M$_n$ ranging from 1.30 to 1.52 are obtained at a conversion of MMA that ranges from 92 to 78%. Most important, the reaction time of these block copolymerization experiments varies from 30 min to 80 min (Table 4, FIG. II-5, II-6). This reaction time is within the range of the induction time exhibited by the block copolymerizations catalyzed by CuCl/bpy in Ph$_2$O at the same temperature, i.e. 90° C.

Materials. Copper powder (99%), tris(2-aminoethyl) amine (TREN, 96%), polyethylenimine (PEI, mixture of linear and branched chains, M$_n$ ca 423, b.p. 250° C.), hexamethyltriethylenetetramine (HMTA, 97+%), cyclohexanone (99+%), ethylene carbonate (98%), diphenyl ether (Ph$_2$O, 99+%), formic acid (99%) were purchased from Aldrich and were used as received. Copper(I) telluride (Cu$_2$Te, 99,5%) was purchased from Alfa Aesar. Methyl methacrylate (MMA, 99+% from Aldrich) was passed through a basic Al$_2$O$_3$ chromatographic column (flash) before use. CuCl (99+%) was purchased from Aldrich washed with 4% HCl two times, filtered under Ar, rinsed with degassed deionized water and THF, dried under vacuum and stored under Ar. Iodoform (CHI$_3$, 99%), and sodium dithionite (Na$_2$S$_2$O$_4$, 85%) were purchased from Lancaster. Tetrahydrofuran (THF, 99%), methylene chloride (99.5%), methanol (99.8%), dimethyl sulfoxide (DMSO, 99%) and sodium bicarbonate (99+%) were purchased from Fisher Scientific. 2,2'-Bipyridine (bpy, 99%) from ACROS Organics was used as received. α,ω-Di(Iodo)PVC of different molecular weight was prepared as described previously. Tris[2-(dimethylamino)ethyl]amine (Me$_6$-TREN) was prepared as described elsewere. All other chemicals were purchased from Aldrich and were used as received.

Techniques. $^1$H-NMR spectra (500 MHz) were recorded on a Bruker DRX500 at 32° C. in CD$_2$Cl$_2$ and CDCl$_3$ with tetramethylsilane (TMS) as internal standard. Gel permeation chromatography (GPC) analysis was performed on a Perkin-Elmer Series 10 high-pressure liquid chromatograph equipped with an LC-100 column oven (40° C.), a Nelson Analytical 900 Series integrator data station, a Perkin-Elmer 785A UV-Vis Detector (254 nm), a Varian Star 4090 RI detector and two AmGel (10 μm, 500 Å and 10 μm, 10$^4$ Å) columns. THF (Fisher, HPLC-grade) was used as eluent at a flow rate of 1 mL/min. Number-average (M$_n$) and weight-average (M$_w$) molecular weights were determined against PMMA standards.

Glass transition temperatures were determined on a Thermal Analysis TA-2920 modulated differential scanning calorimeter (DSC). In all cases, the heating and cooling rates were 5° C./min.

Typical Procedure for Block-Copolymerization of α,ω-Di(Iodo)PVC with MMA

α,ω-Di(Iodo)PVC macroinitiator (M$_n$=2,100 M$_w$/M$_n$=1.84, 105 mg, 0.05 mmol), CuCl (9.9 mg, 0.1 mmol), Me$_6$-TREN (69.0 mg, 0.3 mmol), MMA (1.0 ml, 9.4 mmol) and DMSO (0.5 mL) were placed in a 25 mL Schlenk tube. The tube was sealed (rubber septum with a screw cap). The reaction mixture was degassed using standard freeze-pump-thaw cycles and the tube was charged with dry Ar. The reaction mixture was maintained at 90±0.1° C. under stirring and sampled with an airtight syringe at predetermined times. Monomer conversion was determined by 500 MHz $^1$H-NMR spectroscopy while $M_n$ and $M_w/M_n$ values by gel permeation chromatography relative to PMMA standards. The polymerization was stopped after 30 min and the reaction mixture was dissolved in 18 ml of THF and precipitated in 100 ml of water-MeOH mixture (1:2 v/v). The precipitated polymer was filtered and dried.

TABLE 1

Influence of the Nature of the Catalyst on the Rate of Block Polymerization and on the $M_n$ and $M_w/M_n$ of the PMMA-b-PVC-b-PMMA Block Copolymers Synthesized by Initiation from α,ω-Di(Iodo)PVC (Mn = 2,100; Mw/Mn = 1.84) in Ph$_2$O at 90° C. [Metal Catalyst]$_0$/[bpy]$_0$/[α,ω-Di(Iodo)PVC]$_0$/[MMA]$_0$ = 2/6/1/188 (molar ratios). [MMA]$_0$ = 6.4 mol/L

| No. | Catalyst | $k_p^{exp}$ (min$^{-1}$) | conv %/ time (min) | $M_{nGPC}$ | $M_w/M_n$ | $I_{eff}$(%) |
|---|---|---|---|---|---|---|
| 1 | CuCl/bpy | 0.033 | 95/110 | 46,500 | 1.19 | 38.5 |
| 2 | Cu$_2$Te/bpy | 0.022 | 81/80 | 150,000 | 1.22 | 9.3 |
| 3 | Cu(O)bpy | 0 | 0 | 0 | — | |
| 4 | Cu(O)bpy[a] | 0.021 | 63/50 | 93,000 | 1.29 | 11.7 |

[a]Reaction performed in DMSO

TABLE 2

Influence of the Solvent on the Rate of Block Copolymerization and on the $M_n$ and $M_w/M_n$ of the PMMA-b-PVC-b-PMMA Synthesized by Initiation from α,ω-Di(Iodo)PVC ($M_n$ = 2,100; $M_w/M_n$ = 1.84). [CuCl]$_0$/[bpy]$_0$/[α,ω-Di(Iodo)PVC]$_0$/[MMA]$_0$ = 2/6/188 (molar ratios). 90° C., [MMA]$_0$ = 6.4 mol/L

| No. | Solvent | $k_p^{exp}$ (min$^{-1}$) | $M_{nGPC}$/ conv (%) | $M_w/M_n$ | $I_{eff}$(%) |
|---|---|---|---|---|---|
| 1 | Ph$_2$O | 0.033 | 46,500/95 | 1.20 | 38.5 |
| 2 | DMSO | 0.021 | 28,800/89 | 1.21 | 63.0 |
| 3 | Cyclohexanone | 0.015 | 23,200/70 | 1.28 | 61.7 |
| 4 | Ethylenecarbonate | 0.031 | 30,200/90 | 1.16 | 69 |

TABLE 3

Influence of the Nature of Ligand on the Rate of Block Copolymerization and on the $M_n$ and $M_w/M_n$ of PMMA-b-PVC-b-PMMA Obtained by Initiation from α,ω-Di(Iodo)PVC with $M_n$ = 2,100 and $M_w/M_n$ = 1.84 [Cu/Cl]$_0$/[Ligand]$_0$/[PVC]$_0$/[MMA]) = 2/6/1/188 (molar ratios). DMSO at 90° C., [MMA]$_0$ = 6.4 mol/L

| No. | Ligand | $k_p^{exp}$ (min$^{-1}$) | $M_{nGPC}$/conv (%) | $M_w/M_n$ | $I_{eff}$(%) |
|---|---|---|---|---|---|
| 1 | Bpy | 0.021 | 28,800/89 | 1.21 | 63.0 |
| 2 | Me$_6$-TREN | 0.084 | 41,400/92 | 1.33 | 52.9 |
| 3 | Me$_6$-TREN[a] | 0.087 | 34,900/93 | 1.73 | 58.2 |
| 4 | HMTETA | 0.037 | 45,600/89 | 1.23 | 38.7 |
| 5 | PEI | 0.069 | 89,000/87 | 1.25 | 19.5 |
| 6 | MePEI | 0.059 | 47,500/92 | 1.26 | 40.2 |
| 7 | No Ligand | 0.003 | 45,000/47 | 1.24 | 22.7 |

[a]In this experiment Ph$_2$O was used as a solvent

TABLE 4

Influence of the Mn of the α,ω-Di(Iodo)PVC Macroinitiator on the Rate of Block Copolymerization of MMA and on the Properties of the PMMA-b-PVC-b-PMMA. [Cu/Cl]$_0$/[Me$_6$-TREN]$_0$/[α,ω-Di(Iodo)PVC]$_0$ = 2/6/1 (molar ratios). DMSO at 90° C.

| | α,ω-Di(Iodo)PVC | | | PMMA-b-PVC-b-PMMA | | |
|---|---|---|---|---|---|---|
| No. | $k_p^{exp}$ (min$^{-1}$) | $M_{nGPC}$ | $M_w/M_n$ | $M_{nGPC}$/conv (%)/ time (min) | $M_w/M_n$ | $I_{eff}$(%) |
| 1[a] | 0.084 | 2,100 | 1.84 | 41,000/92/30 | 1.33 | 52.9 |
| 2[a] | 0.082 | 5,500 | 1.74 | 58,900/92/30 | 1.33 | 40.0 |
| 3[b] | 0.036 | 9,200 | 1.80 | 57,400/83/45 | 1.30 | 66.1 |
| 4[b] | 0.040 | 14,100 | 1.72 | 84,500/85/45 | 1.31 | 33.9 |
| 5[c] | 0.021 | 20,000 | 2.16 | 106,700/78/45 | 1.51 | 81.8 |

[a][MMA]$_0$ = 6.4 M, [MMA]$_0$/[α,ω-Di(Iodo)PVC]$_0$ = 188;
[b][MMA]$_0$ = 3.76 M, [MMA]$_0$/[α,ω-Di(Iodo)PVC]$_0$ = 376;
[c][MMA]$_0$ = 2.68 M, [MMA]$_0$/[α,ω-Di(Iodo)PVC]$_0$ = 940

The various block copolymers discussed herein have conversion values, conversion times, molecular weights, and molecular weight distributions set forth in FIGS. II-1 through II-6.

Discussion of Results

As apparent from the above Examples and Figures, CuCl/bpy was very effective in yielding high conversion rates, that different solvents generally yield high conversion rates, as did different ligands as compared to no ligand, and that high conversion rates were obtained with lower average molecular weight of the PVC macroinitiator.

EXAMPLE III

The formation PMMA-b-PVC-b-PMMA block copolymers is set forth utilizing a Cu(O) catalyst in the presence of DMSO at different temperatures utilizing different ligands, different amounts of DMSO and different number average molecular weights of PVC. The preparation of α,ω-Di(Iodo) PVC having a number average molecular weight ($M_n$) ranging from 2,100 to 29,800 and molecular weight distribution ($M_w/M_n$) between 1.74 and 2.16 was made by SET-DTLRP of vinyl chloride (VC) initiated with CHI$_3$ and catalyzed by Na$_2$S$_2$O$_4$ at 25° C.-35° C. in H$_2$O in a manner as set forth herein above.

Influence of ligand on the rate of block copolymerization of MMA initiated from α,ω-Di(Iodo)PVC with $M_n$=2,100 in DMSO and catalyzed by Cu(O) at 90° C. in DMSO.

FIGS. III-1 and III-2 show representative kinetic experiments performed with α,ω-Di(Iodo)PVC of $M_n$=2,100 and $M_w/M_n$=1.84 at 90° C. In all experiments classic kinetic plots demonstrated a living polymerization.

The change of ligand of Cu(O) catalyst from bpy to Me$_6$-TREN shows an increase in $k_p^{exp}$ of about eleven times when the reaction was carried out in DMSO at 90° C. This is a remarkable result (FIG. III-1a, c). When Cu(O)/Me$_6$-TREN catalyzed experiment was carried out at 90° C. in diphenyl ether (Ph$_2$O, instead of DMSO) the $k_p^{exp}$ decreased by a factor of 2.9 (FIG. III-1b). When bpy was replaced with the commercially available tris(2-aminoethyl)amine (TREN) an increase in $k_p^{exp}$ by a factor of 6.0 was observed in DMSO at 90° C. (FIG. III-2a). The commercial polyethyleneimine (PEI) provides a higher rate than that of bpy by a factor 1.7 and the polymerization stops quickly at about 60% MMA conversion (FIG. III-2a). It is interesting to observe that the living radical block copolymerization of MMA catalyzed by Cu(O)/Me$_6$-TREN was completed in less than 15 min. This reaction is so fast that is at the limit of our capability to measure its kinetic (FIG. III-1c). A summary of the kinetic data from FIG. III-1 is reported in Table 1. These experiments suggest that the block copolymerization experiments catalyzed by Cu(O)/Me$_6$-TREN in DMSO can be carried out at room temperature.

Role of DMSO in the Cu(O)/Me$_6$-TREN Catalyzed Living Radical Block Copolymerization Initiated from α,ω-Di(Iodo)PVC FIG. III-3 shows three kinetic experiments in which the volume ratio between MMA and DMSO was increased from 1.0/0.2 to 1.0/1.0 (mL/mL). Table 2 summarizes the kinetic data obtained as a function of the amount of added DMSO. We can observe from both FIG. III-3 and Table 2 a continuous increase in the value of the $k_p^{exp}$ as the concentration of DMSO increases. An increase by a factor 1.2 is observed at the transition from MMA/DMSO ratio of 1.0/0.2 to 1.0/0.5 (mL/mL). Above this ratio the role of DMSO added on the rate of block copolymerization is less important (Table 2). A very interesting result is that the initiation efficiency of α,ω-Di(Iodo)PVC macroinitiator increases with increase of amount of DMSO added to the reaction mixture (FIG. III-3).

Influence of the $M_n$ of α,ω-Di(Iodo)PVC on the Living Radical Block Copolymerization of MMA Catalyzed by Cu(O)/Me$_6$-TREN in the Presence of DMSO at 25° C.

Living radical block copolymerization of MMA initiated by five different α,ω-Di(Iodo)PVC with $M_n$ ranging from 2,100 to 29,800 was catalyzed by Cu(O)/Me$_6$-TREN at 25° C. in the presence of DMSO. Kinetic experiments were used to estimate the block copolymerization process. FIGS. III-4 and III-5 show the kinetic data of these experiments. The results from FIGS. III-4 and III-5 are summarized in Table 3. Table 3 also reports an experiment, in which an α,ω-Di(Iodo)PVC was used to demonstrate that the initiation of the block copolymerization of MMA takes place only from the chain ends of α,ω-Di(Iodo)PVC. Under identical reaction conditions all-α,ω-Di(Iodo)PVCs initiate the living radical block copolymerization of MMA (FIGS. III-4, 5 and Table 3). The kinetic experiments reported in FIGS. III-4 and 5 demonstrate, in all cases, a living radical block copolymerization of MMA. PMMA-b-PVC-b-PMMA block copolymers with $M_n$ ranging from 49,100 to 134,800 can be obtained in between 60 and 100 min reaction time. Even if the molecular weight distribution ($M_w/M_n$) of the α,ω-Di(Iodo)PVC macroinitiator ranges from 1.66 to 2.16, the molecular weight distribution of the block copolymers ranges, depending on the conversion of MMA, between 1.30 and 1.55. The initiation efficiency of α,ω-Di(Iodo)PVC macroinitiator shown in all Figures demonstrates an increase with the increase of $M_n$ of the macroinitiator. This is due to the decreased radical dimerization that is diffusion controlled.

As apparent from the above Examples and data, living radical block copolymerization of methyl methacrylate initiated from a di(iodo)PVC block at different number average molecular weights can be carried out. The utilization of Cu(O)/Me$_6$-TREN catalysts can provide an ultra fast synthetic methd for preparation of an PMMA-b-PVC-b-PMMA block copolymers at times down to 15 minutes!

Materials. Copper powder (99%), tris(2-aminoethyl) amine (TREN, 96%), polyethylenimine (PEI, mixture of linear and branched chains, $M_n$ ca 423, b.p. 250° C.), hexamethyltriethylenetetramine (HMTA, 97+%), cyclohexanone (99+%), ethylene carbonate (98%), diphenyl ether (Ph$_2$O, 99+%) were purchased from Aldrich and were used as received. Methyl methacrylate (MMA, 99+% from Aldrich) was passed through a basic Al$_2$O$_3$ chromatographic column (flash) before use. Iodoform (CHI$_3$, 99%), and sodium dithionite (Na$_2$S$_2$O$_4$, 85%) were purchased from Lancaster. Tetrahydrofuran (THF, 99%), methylene chloride (99.5%), methanol (99.8%), dimethyl sulfoxide (DMSO, 99%) and sodium bicarbonate (99+%) were purchased from Fisher Scientific. 2,2'-Bipyridine (bpy, 99%) from ACROS Organics was used as received. α,ω-Di(Iodo)PVC of different molecular weight was prepared as described previously. α,ω-Di(hydrogen)PVC was synthesized. Tris(2-dimethylaminoethyl)amine (Me$_6$-TREN) was prepared. All other chemicals were purchased from Aldrich and were used as received.

Techniques. $^1$H-NMR spectra (500 MHz) were recorded on a Bruker DRX500 at 32° C. in CD$_2$Cl$_2$ and CDCl$_3$ with tetramethylsilane (TMS) as internal standard. Gel permeation chromatography (GPC) analysis was performed on a Perkin-Elmer Series 10 high pressure liquid chromatograph equipped with an LC-100 column oven (40° C.), a Nelson Analytical 900 Series integrator data station, a Perkin-Elmer 785A UV-Vis Detector (254 nm), a Varian Star 4090 RI detector and two AmGel (10 μm, 500 Å and 10 μm, 10$^4$ Å) columns. THF (Fisher, HPLC-grade) was used as eluent at a flow rate of 1 mL/min. Number-average ($M_n$) and weight-average ($M_w$) molecular weights were determined against PMMA standards.

Glass transition temperatures were determined on a Thermal Analysis TA-2920 modulated differential scanning calorimeter (DSC). In all cases, the heating and cooling rates were 5° C./min. The tacticity (triad content in PMMA segments) was determined by 500 MHz $^1$H-NMR spectroscopy.

Typical Procedure for Block-Copolymerization of α,ω-Di(Iodo)PVC with MMA

α,ω-Di(Iodo)PVC macroinitiator ($M_n$=2,100 $M_w/M_n$=1.84, 105 mg, 0.05 mmol), Cu(O) (6.4 mg, 0.1 mmol), Me$_6$-TREN (69.0 mg, 0.3 mmol), MMA (1.0 ml, 9.4 mmol) and DMSO (0.5 mL) were placed in a 25 mL Schlenk tube. The tube was sealed (rubber septum with a screw cap). The reaction mixture was degassed using standard freeze-pump-thaw cycles and the tube was charged with dry Ar. The reaction mixture was maintained at 25±0.1° C. under stirring and sampled with an airtight syringe at predetermined times. Monomer conversion was determined by 500 MHz $^1$H-NMR spectroscopy while $M_n$ and $M_w/M_n$ values by gel permeation chromatography relative to PMMA standards. The polymerization was stopped after 60 min and the reaction mixture was dissolved in 18 ml of THF and precipitated in 100 ml of water-MeOH mixture (1:2 v/v). The precipitated polymer was filtered and dried.

TABLE 1

Influence of Ligand on the Rate of Block Copolymerization and on the $M_n$ and $M_w/M_n$ of PMMA-b-PVC-b-PMMA Obtained by Initiation from α,ω-Di(Iodo)PVC (I) with Mn = 2,100 and Mw/Mn = 1.84 [Cu(O)]$_0$/[Ligand]$_0$/[I]$_0$/[MMA]$_0$ = 2/6/1/188 (molar ratios). DMSO at 90° C., [MMA]$_0$ = 6.4 mol/L

| No. | Ligand | $k_p^{exp}$ (min$^{-1}$) | $M_{nGPC}$/conv (%)/ time (min) | $M_w/M_n$ | $I_{eff}$(%) |
|---|---|---|---|---|---|
| 1 | bpy | 0.021 | 28,800/63/50 | 1.29 | 11.7 |
| 2 | Me6-TREN[a] | 0.080 | 54,700/87/30 | 1.36 | 31.2 |
| 3 | Me6-TREN | 0.230 | 52,400,97/15 | 1.41 | 40.3 |
| 4 | TREN | 0.125 | 48,300/92/20 | 1.47 | 43.6 |
| 5 | PEI | 0.036 | 28,100/61/30 | 1.37 | 54.3 |

[a]In this experiment Ph$_2$O was used as solvent

TABLE 2

Influence of Added DMSO on the Rate of Block Copolymerization and on the $M_n$ and $M_w/M_n$ of PMMA-b-PVC-b-PMMA Obtained by Initiation from α,ω-Di(Iodo)PVC (I) with Mn = 2,100 and $M_w/M_n$ = 1.84 and Catalyzed by Cu(O)/Me$_6$-TREN at 25° C. [Cu(O)]$_0$/[Me$_6$-TREN]$_0$/[I]$_0$/[MMA]$_0$ = 2/6/1/188 (molar ratios).

| No. | [MMA]/[DMSO] (mL/mL) | $k_p^{exp}$ (min$^{-1}$) | $M_{nGPC}$/conv (%)/ time (min) | $M_w/M_n$ | $I_{eff}$(%) |
|---|---|---|---|---|---|
| 1 | 1.0/0.2 | 0.030 | 37,700/74/50 | 1.59 | 44.1 |
| 2 | 1.0/0.5 | 0.037 | 18,500/87/60 | 1.31 | 40.8 |
| 3 | 1.0/1.0 | 0.040 | 18,100/85/50 | 1.69 | 98.9 |

TABLE 3

Influence of $M_n$ of the α,ω-Di(Iodo)PVC Macroinitiator (I) on the Living Radical Block Copolymerization of MMA Catalyzed by Cu(O)/Me$_6$-TREN in the Presence of DMSO at 25° C. [Cu(O)]$_0$/[Me$_6$-TREN]$_0$/[I]$_0$ = 2/6/1 (molar ratios). DMSO at 90° C.

| | α,ω-Di(Iodo)PVC | | | PMMA-b-PVC-b-PMMA | | |
|---|---|---|---|---|---|---|
| No. | $M_{nGPC}$ | $M_w/M_n$ | $k_p^{exp}$ (min$^{-1}$) | $M_{nGPC}$/conv (%)/ time (min) | $M_w/M_n$ | $I_{eff}$(%) |
| 1[a,b] | 1,200 | 1.50 | 0 | — | — | — |
| 2[b] | 2,100 | 1.84 | 0.037 | 49,100/87/60 | 1.31 | 40.8 |
| 3[b] | 5,500 | 1.74 | 0.044 | 48,100/95/70 | 1.50 | 54.6 |
| 4[c] | 9,200 | 1.80 | 0.025 | 45,100/88/70 | 1.55 | 91.2 |
| 5[d] | 20,000 | 1.66 | 0.014 | 117,000/75/100 | 1.44 | 79.5 |
| 6[d] | 29,800 | 2.16 | 0.014 | 134,800/76/100 | 1.40 | 72.9 |

[a]α,ω-Di(Hydrogen)PVC;
[b][MMA]$_0$ = 6.4 M, [MMA]$_0$/[α,ω-Di(Iodo)PVC]$_0$ = 188;
[c][MMA]$_0$ = 3.76 M, [MMA]$_0$/[α,ω-Di(Iodo)PVC]$_0$ = 376;
[d][MMA]$_0$ = 2.68 M, [MMA]$_0$/[α,ω-Di(Iodo)PVC]$_0$ = 940

TABLE 4

Triad Tacticity of PMMA Segments from the PMMA-b-PVC-b-PMMA Block Copolymers and Its Influence on the Glass Transition Temperature of Block Copolymers Synthesized at 25° C.

| No. | $M_{nGPC\ (PVC)}$ | $M_{nGPC\ (PVC-PMMA)}$ | rr (%)[a] | rm (%)[a] | mm (%)[a] | $T_g$ (° C.) |
|---|---|---|---|---|---|---|
| 1 | 2,100 | 49,100 | 66.7 | 27.5 | 5.8 | 117.4 |
| 2 | 9,100 | 45,100 | 63.8 | 31.8 | 4.4 | 112.8 |
| 3 | 20,000 | 117,000 | 63.9 | 32.0 | 4.1 | 113.8 |
| 4 | 29,500 | 134,100 | 65.5 | 20.7 | 4.7 | 111.6 |
| 5 | — | 155,000[b] | 57.4 | 38.9 | 3.7 | 122.6 |

[a]Determined by $^1$H-NMR spectroscopy;
[b]PMMA prepared by conventional free radical polymerization in bulk at 70° C.

Acrylic-Containing Polymers and Copolymers

Metal Catalyzed Polymerization of Acrylic Monomers

It has been found that in lieu of polymerizing one or more vinyl halide monomers, one or more acrylic monomers can be polymerized or copolymerized, utilizing essentially the same components such as metal containing catalysts or metal-free containing catalysts, ligands, initiators, buffers, diluents and the like and generally the same reaction conditions such as temperature and inert atmosphere. Rather than to repeat the above description with regard to the various components and reaction conditions, the above description is hereby fully incorporated by reference with regard to all aspects thereof. Accordingly, the following description relates to a brief summary of the formation of acrylic polymers.

Metal Catalyzed Polymerization of Acrylic Monomers

The various acrylic monomers which can be utilized include acrylonitrile, and desirably include acrylates such as various alkyl acrylates wherein the alkyl portion contains from 1 to 10 carbon atoms or an alkyl alkacrylate wherein the alkyl group contains from 1 to about 10 carbon atoms such as methyl, ethyl, propyl, or butyl, or 2-ethyl hexyl with methyl being preferred, and the alk group contains from 1 to 3 carbon atoms with methacrylate being preferred. Suitable alkyl acrylates include methyl acrylate, ethyl acrylate, butyl acrylate, tert-butyl acrylate, and 2-ethylhexyl acrylate are desired with methyl acrylate being preferred. Methyl amethacrylate is highly preferred. Other acrylate monomers include the various C3 to C8 cycloalkyl acrylates and the C7 to C15 bicycloalkyl acrylates such as norbornyl and isonorbornyl, as well as the various tricycloalkyl (adamantly) acrylates, or combinations thereof. Similarly, the methacrylates derivatives of the various mono, bi, and tri cycloalkyl acrylates can also be utilized. One or more monomers can be polymerized so that homopolymers or copolymers can be utilized. Metal catalyst systems are preferably utilized with alkyl alkyacrylate monomers whereas metal-free catalysts are desirably utilized with alkyl acrylate monomers.

The metal catalyst are the same as set forth with respect to polymerization of halogen-containing monomers and include metals in the zero oxidation state, metal based catalysts, and metal salts. Various metals include copper, iron, titanium, etc. and preferred catalysts generally include Cu(O), CuCl, Fe, or combinations thereof. The amount of the catalyst is generally from about 0.01 or 0.1 to about 10, desirably from about 0.5 or 0.75 to about 4 or about 5, and preferably from about 1 to about 2 or about 3 moles per mole of halide in the initiator.

The ligands utilized with the metal catalyst are the same as set forth hereinabove with regard to halogen-containing monomers and generally contain 2, 3, or 4 nitrogen atoms and thus include bidentates, tridentates, and tetradentates. Examples of such ligands are set forth hereinabove. Examples of preferred ligands include 2,2'-bipyridine, 1,1,4,7,10,10-hexamethyltriethylenetetramine (HMTETA), and tris[2-(dimethylamino)ethyl]amine (Me$_6$-TREN).

While the use of ligands may be eliminated, the use thereof is highly preferred and the amount of ligands is generally from about 0.1 to about 10 moles, desirably from about 0.75 to about 3 moles, and preferably from 1 to about 2 moles of ligand per mole of catalysts.

Highly preferred catalyst systems include CuCl/2,2'-bipyridine (bpy), CuCl/tris[2-(dimethylamino)ethyl]amine (Me$_6$-TREN) and Cu(O)/Me$_6$-TREN.

As with respect to polymerization of halogen-containing monomers, the initiators are generally organo halide and include dihaloalkanes, trihaloalkanes, perhaloalkanes, and the like. Preferred initiators are the various iodo containing compounds which generally have an electron withdrawing group adjacent to the halide atom. Examples of preferred initiators include I—CH$_2$—PH—CH$_2$—I, CH$_3$—CH(Cl)—I, CH$_2$I$_2$, CHI$_3$, CI$_4$, CH$_2$=CH—CH$_2$—I, CF$_3$—(CF$_2$)$_n$—I, I—CH$_2$—CONH$_2$ and I—CH$_2$—COO—(CH$_2$)$_n$—H (n=1-20).

Inasmuch as the present invention relates to living radical polymerization of monomers such as acrylic monomers, the amount of halide initiators therefore depends upon a desired molecular weight of the acrylic polymer and is generally from about 10 to about 5,000, desirably from about 25 to about 1,000, and preferably from about 50 to about 500 moles of acrylic monomer per mole of halide group in the initiator. The number average molecular weight of the alkyl acrylate blocks can range from about 500 to about 1,000,000, desirably from about 1,000 to about 500,000, and preferably from about 1,500 to about 150,000. The number average molecular weight of alkyl alkacrylate blocks such as poly(methyl methacrylate) generally range from about 1,000 to about 1,200,000, desirably from about 2,000 to about 600,000, and preferably from about 2,500 to about 200,000.

As with the formation of the halogen-containing polymers, various additives can be utilized such as set forth above.

The living radical polymerization of the one or more acrylate monomers utilizing metal catalysts are generally carried out in the presence of a diluent or solvent and the same compounds can be utilized as set forth hereinabove with respect to the polymerization of halogen-containing monomers. Examples of such diluents include various sulfoxides, ethers, amides, ketones, and phosphorus containing compounds with DMSO and diphenyl ether being highly preferred. The amount of such diluent generally range from about 10 to about 1,000, desirably from about 50 to about 500, and preferably from about 75 to about 400 parts by weight per 100 parts by weight of acrylic monomer. In lieu of organic diluents, the polymerization of acrylates can be carried out in bulk or in water, or in water-organic solvent mixtures as set forth hereinabove.

The various reaction conditions for the metal catalyzed polymerization of the one or more acrylic monomers is generally similar as set forth with respect to the halogen-containing monomers and accordingly the polymerization temperatures range from about 0° C. to about 150° C., desirably from about 10° C. or about 25° C. to about 90° C. or to about 130° C. With respect to the acrylate monomers, generally temperatures are preferred such as from about 25° C. to about 80° C. The polymerization reactions are also carried out in the presence of an inert atmosphere such as nitrogen, argon, etc.

Metal Free Catalyzed Polymerization of Acrylic Monomers

With respect to the metal-free catalyzed polymerization of one or more acrylic monomers, the components and conditions are essentially the same as set forth hereinabove with respect to the metal free catalyzed polymerization of vinyl halide monomers such as vinyl chloride and the same is hereby fully incorporated by reference.

As noted, the metal free catalysts are generally low valent sulfur salts containing a $SO_2$ group and polydialkylamino-substituted unsaturated organic compounds. Examples of such catalysts are set forth above and include $Na_2S_2O_4$ and $H_2NC(=NH)SO_2H$. Metal-free catalyst systems are preferably utilized with alkyl acrylate monomers.

The amount of such metal-free catalysts is generally from about 0.01 or 0.1 to about 4 or to about 16, desirably from about 0.05 to about 4, and preferably from about 0.1 to about 1 or 2 mole of catalyst per mole of halide in the initiator.

When utilizing a metal-free catalyst, it is very desirable to utilize buffers in order to avoid acidic decomposition of sulfur containing catalysts. Such buffers are set forth above and include $NaHCO_3$, $Na_2HPO_4$, $NaH_2PO_4$, $CH_3COONa$ or the potassium or ammonium salts thereof, including $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$, and the like.

While not absolutely necessary, the use of one or more buffers is highly preferred and the amount thereof is generally from about 0.05 to about 5 moles, desirably from about 0.2 to about 3 moles, and preferably from about 1 to about 1.2 moles of buffer per mole of catalyst.

The use of an electron shuttle is optional to accelerate the living radical initiation and the like. Suitable compounds include various dihalides such as 1,1'-dimethyl-4-4'-bipyridinium dichloride, methyl viologen ($MV^{2+}$), 1,1'-di-n-octyl-4-4'-bepyridinium dibromide, octyl viologen ($OV^{2+}$), and the like.

When utilized, the amount of shuttle is generally from about 0.00001 to about 1.0 mole, desirably from about 0.0001 to about 0.01 mole, and preferably from about 0.001 to about 0.005 moles of shuttle per mole of catalyst.

The diluent or solvent utilized for the living radical polymerization of acrylic monomers, as noted above, is preferably water, or water in combination with water soluble organic solvents such as THF, DMF, DMSO, and the like. The amount of such solvents generally ranges from about 1 to about 10 parts by volume and preferably from about 2 to about 4 parts by volume per volume of the acrylic monomers.

Naturally, a requirement for the polymerization of the one or more acrylic monomers are initiators and the same are as set forth with regard to the initiation of various halogen-containing monomers. Such initiators, as noted, are generally organic halide compounds with the various iodo containing compounds being preferred such as I—$CH_2$—PH—$CH_2$—I, $CH_3$—CH(Cl)—I, $CH_2I_2$, $CHI_3$, $CI_4$, $CH_2$=CH—$CH_2$—I, $CF_3$—$(CF_2)_n$—I, I—$CH_2$—$CONH_2$ and I—$CH_2$—COO—$(CH_2)_n$—H (n=1-20).

Since the present invention relates to the living radical polymerization of acrylic monomers, the amount of halide initiator utilized depends upon the desired amount of the acrylic polymer to be formed. Generally the amount of acrylic monomer is from about 1 or 10 to about 5,000, desirably from about 25 to 1,000, and preferably from about 50 to about 500 moles of acrylic monomer per mole of halide group in the initiator.

While surfactants are optional, they are usually desired and such compounds include sodium dodecylsulfate (NaDDS), hydroxypropyl methylcellulose (Methocel® F50), 87%-89% hydrolyzed poly(vinyl acetate) [poly(vinyl alcohol), containing 11%-13% acetate groups PVA88], 72.5% hydrolyzed polyvinyl acetate (Alcotex® 72.5), polyoxyethylene(10) oleyl ether (Brij® 97), and polyoxyethylene(20) oleyl ether (Brij® 98), or combination thereof.

The amount of such surfactant generally ranges from about 0.1 to about 50,000 parts per million (ppm) w/w, desirably from about 1 to about 10,000 ppm w/w, and preferably from about 10 to abut 5,000 parts per million w/w relative to acrylic monomer.

The reaction conditions with regard to the metal free catalyzed reaction of acrylic monomers includes polymerization in an inert atmosphere such as argon or nitrogen, and reaction at temperatures of from about −40° C. if the diluent is liquid at such temperature to as high as about 100° C., desirably from about 0° C. to about 90° C., and preferably from about 20° C. to about 90° C.

Examples of Preparation of Acrylic Polymers Utilizing a Metalic Catalysts and a Metal-Free Catalyst Metal Catalyzation of Methyl Methacrylate Methyl methacrylate was polymerized in the presence of a metal catalyst utilizing different initiators, different ligands, different solvents, and different temperatures. A typical procedure for polymerization of methyl methacrylate is as follows:

Techniques. $^1$H-NMR spectra (500 MHz) were recorded on a Bruker DRX500 at 32° C. in $CD_2Cl_2$ and $CDCl_3$ with tetramethylsilane (TMS) as internal standard. Gel permeation chromatography (GPC) analysis was performed on a Perkin-Elmer Series 10 high pressure liquid chromatograph equipped with an LC-100 column oven (40° C.), a Nelson Analytical 900 Series integrator data station, a Perkin-Elmer 785A UV-Vis Detector (254 nm), a Varian Star 4090 RI detector and two AmGel (10 µm, 500 Å and 10 µm, $10^4$ Å) columns. THF (Fisher, HPLC-grade) was used as eluent at a flow rate of 1 mL/min. Number-average ($M_n$) and weight-average ($M_w$) molecular weights were determined against PMMA standards. Glass transition temperatures were determined on a Thermal Analysis TA-2920 modulated differential scanning calorimeter (DSC). In all cases, the heating and cooling rates were 5° C./min. The tacticity (triad content in PMMA segments) was determined by 500 MHz $^1$H-NMR spectroscopy at 50° C. in $CDCl_3$.

The results of the kinetic experiments obtained in four solvents under the reaction conditions $[CuCl]_0/[bpy]_0/[CH_3CHClI]_0/[MMA]_0=1/3/1/188$ (molar ratios) at 90° C. are reported in FIG. IV-1. It is interesting to observe from FIG. IV-1a that $CH_3CHClI$ as well as α,ω-di(iodo)PVC provides a living radical polymerization of MMA, and at about 80% conversion, PMMA has a molecular weight distribution $M_w/M_n=1.24$. This is remarkable considering the limited range of initiators available for the living radical polymerization of MMA. Both DMSO, cyclohexanone and ethylene carbonate eliminate the induction period observed in $Ph_2O$ (FIG. IV-1b, c, d). At the same time all these three solvents increase the initiation efficiency from 24.4% to 46.1, 44.4 and 47.4%, respectively (FIG. IV-1 and Table 1). It is also interesting to observe that cyclohexanone and ethylene carbonate are increasing the rate of polymerization while DMSO is decreasing it (Table 1, FIG. IV-1). $M_w/M_n$ values obtained for PMMA produced in the presence of cyclohexanone and ethylene carbonate are about 1.15.

The Effect of the Ligand on the CuCl/bpy Catalyzed Living Radical Polymerization of MMA Initiated with $CH_3CHClI$ in DMSO at 90° C.

The catalytic system CuCl/Me$_6$-TREN in DMSO at 90° C. provided an accelerated method for the synthesis of PMMA-b-PVC-b-PMMA. Therefore, the CuCl catalyzed living radical polymerization of MMA was performed in the presence of bpy, Me$_6$-TREN, hexamehtyl triethylenetetramine (HMTETA) and polyethyleneimine (PEI) ligands in DMSO at 90° C. The kinetic results are summarized in FIG. IV-2. All polymerizations take place without induction time. The transition from bpy to Me$_6$-TREN increases the apparent rate constant of propagation by a factor of 10.4. Nevertheless, the increase of $M_w/M_n$ is only from 1.15 to 1.24 and the initiator efficiency is constant (about 46%, FIG. IV-2a, b). Both HMTETA and PEI are commercially available and therefore, they are of interest for practical applications. HMTETA reduces the rate by a factor of almost four when compared with Me$_6$-TREN and also reduces the initiator efficiency to 22.9%. PEI produces a rate that is comparable with that generated by Me$_6$-TREN ligand. However, it also reduces the initiator efficiency to 24.3%. The kinetic results obtained from FIG. IV-2 are summarized in Table 2. CuCl/Me$_6$-TREN provides an accelerated method for the synthesis of PMMA-b-PVC-b-PMMA block copolymers when the reaction is carried out in DMSO at 90° C. The same is the case for CuCl/Me$_6$-TREN when $CH_3CHClI$ is used as an initiator. It provides a very fast synthesis of PMMA with narrow molecular weight distribution but with 47% initiation efficiency. For many synthetic purposes this is an excellent synthetic method.

The Role of the Initiator in the Cu(O)/Me$_6$-TREN Catalyzed Living Radical Polymerization of MMA in DMSO at 25° C.

An ultrafast living radical block copolymerization method was reported when α,ω-di(iodo)PVC was used as macro-initiator in a Cu(O)/Me$_6$-TREN catalyzed process carried out in DMSO at 25° C. The use of various initiators such as the model compound $CH_3CHClI$ and also $CHI_3$, $CH_2I_2$ and $F(CF_2)_8I$ is used in the Cu(O)/Me$_6$-TREN catalyzed living radical polymerization of MMA in DMSO at 25° C. FIG. IV summarizes all kinetic experiments. It is instructive to compare the CuCl/Me$_6$-TREN catalyzed polymerization of MMA at 90° C. in DMSO (Table 2 and FIG. IV-2b) with the Cu(O)/Me$_6$-TREN catalyzed polymerization of MMA at 25° C. in DMSO (Table 3 and FIG. IV-3c). In both cases $CH_3CHClI$ was used as initiator. In spite of the large difference between these two polymerization temperatures the rate of the polymerization is absolutely identical in both cases although the initiator efficiency increases from 46.2 for the case of CuCl/Me$_6$-TREN at 90° C. to 86% for the Cu(O)/Me$_6$-TREN at 25° C. This is a remarkable result that demonstrates that the ultrafast block copolymerization method provides not only the fastest rate of block copolymer synthesis under the mildest reaction conditions but also generates the most perfect PMMA-b-PVC-b-PMMA block copolymer architecture. Under the same reaction conditions $CHI_3$, $F(CF_2)_8I$ and $CH_2I_2$ decrease the rate of polymerization in the order they are listed here (FIG. IV-3) and also provide a lower initiation efficiency (Table 3, FIG. IV-3). The molecular weight distribution of PMMA prepared by Cu(O)/Me$_6$-TREN at 25° C. is, depending on the nature of the initiator used, ranging between 1.53 and 1.93 (Table 3). These values are larger than the one obtained with CuCl/Me$_6$-TREN in DMSO at 90° C. (Table 2).

The Role of Ligand in the Cu(O) Catalyzed Living Radical Polymerization of MMA Initiated with $CH_3CHClI$ in DMSO at 25° C.

In addition to Me$_6$-TREN ligand, PEI and bpy were tested as ligands in the Cu(O) catalyzed living radical polymerization of MMA initiated from $CH_3CHClI$ in DMSO at 25° C. All kinetic experiments are summarized in Table 4. The rate of polymerization decreases by a factor of 1.4 when Me$_6$-TREN is replaced with PEI. However, at the same time the initiation efficiency increases from 86 to 99%. The rate of polymerization decreases by a factor of 21.5 when Me$_6$-TREN is replaced with bpy. Simultaneously, initiation efficiency decreases from 86 to only 3% and the molecular weight distribution decreases from 1.65 to 1.36 (Table 4).

The Influence of the Polymerization Temperature on the Cu(O)/Me$_6$-TREN Catalyzed Living Radical Polymerization of MMA Initiated with $CH_3CHClI$ in DMSO The Cu(O)/Me$_6$-TREN catalyzed living radical polymerization of MMA initiated from $CH_3CHClI$ in DMSO was investigated at 90° C., 25° C. and 0° C. The kinetic data reported in FIG. IV-4 and summarized in Table 5 show, as expected, a continuous decrease of the rate of polymerization by decreasing the temperature. There is an unexpected trend observed for both the initiation efficiency and for the molecular weight distribution of PMMA. Initiation efficiency first increases from 90° C. to 25° C. and subsequently decreases at 0° C. while the molecular weight distribution first decreases and subsequently increases. This is a remarkable result since it accesses previously unavailable control of the tacticity of PMMA by a living radical polymerization method. Control of PMMA tacticity facilitates control of the glass transition temperature ($T_g$) of PMMA and this is an important parameter for the physical properties of PMMA-b-PVC-b-PMMA block copolymers.

The Influence of the Copper Derivative on the Rate of Polymerization of Cu Derivative/Me$_6$-TREN Catalyzed Living Radical Polymerization of MMA Initiated with CH$_3$CHClI in DMSO at 25° C.

Cu(O), CuI, CuCl and the self-regulated catalyst Cu$_2$O were tested in kinetic experiments. Table 7 summarizes the most important results of these kinetic experiments. The highest rate is provided by Cu(O) followed by CuI, CuCl and Cu$_2$O. The highest initiation efficiency is provided in order by Cu(O) followed by CuCl, CuI and Cu$_2$O. The narrowest molecular weight distribution is generated by Cu$_2$O followed by Cu(O), CuI and CuCl. Therefore, Cu(O)/Me$_6$-TREN in DMSO at 25° C. represents the most efficient catalyst.

TABLE 1

Influence of the Solvent on the Rate of Polymerization of MMA and on the $M_n$ and $M_w/M_n$ of PMMA Synthesized by Initiation from CH$_3$CHClI (I).
[CuCl]$_0$/[bpy]$_0$/[I]$_0$[MMA]$_0$ = 1/3/1/188 (molar ratios). 90° C., [MMA]$_0$ = 6.4 mol/L

| No. | Solvent | $k_p^{exp}$ (min$^{-1}$) | $M_{nGPC}$/conv (%)/ time (min) | $M_w/M_n$ | $I_{eff}$ (%) |
|---|---|---|---|---|---|
| 1 | Ph$_2$O | 0.011 | 59,000/76/200 | 1.24 | 24.4 |
| 2 | DMSO | 0.004 | 35,000/89/500 | 1.15 | 46.1 |
| 3 | Cyclohexanone | 0.009 | 23,200/95/300 | 1.28 | 44.4 |
| 4 | Ethylenecarbonate | 0.015 | 30,200/90/180 | 1.16 | 47.4 |

TABLE 2

Influence of Ligand on the Rate of Polymerization and on the $M_n$ and $M_w/M_n$ of PMMA Obtained by CuCl Catalyzed Living Radical Polymerization of MMA and Initiated from CH$_3$CHClI (I).
[CuCl]$_0$/[I]$_0$/[MMA]$_0$ = 1/1/188 (molar ratios), DMSO, 90° C., [MMA]$_0$ = 6.4 mol/L

| No. | Ligand | $k_p^{exp}$ (min$^{-1}$) | $M_{nGPC}$/conv (%)/ time (min) | $M_w/M_n$ | $I_{eff}$ (%) |
|---|---|---|---|---|---|
| 1[a] | bpy | 0.004 | 35,000/76/500 | 1.15 | 46.1 |
| 2[b] | Me$_6$-TREN | 0.043 | 36,600/50/90 | 1.24 | 46.7 |
| 3[b] | HMTETA | 0.012 | 68,000/79/150 | 1.33 | 22.9 |
| 4 | PEI | 0.035 | 70,000/85/60 | 1.26 | 24.3 |

[a][CuCl]$_0$/[Ligand]$_0$ = 1/3 (molar ratio;
[b][CuCl]$_0$/[Ligand]$_0$ - 1/1 (molar ratio)

TABLE 3

Influence of the Nature of the Initiator (I) on the Rate of Polymerization and on the $M_n$ and $M_w/M_n$ of PMMA Synthesized Cu(O)/Me$_6$-TREN Catalyzed Living Radical Polymerization of MMA in DMSO at 25° C.
[Cu(O)]$_0$/[Me$_6$-TREN]$_0$/[I]$_0$/[MMA]$_0$ = 1/1/1/100 (molar ratios).
[MMA]$_0$ = 6.4 mol/L

| No. | Catalyst | $k_p^{exp}$ (min$^{-1}$) | $M_{nGPC}$/conv (%)/ time (min) | $M_w/M_n$ | $I_{eff}$ (%) |
|---|---|---|---|---|---|
| 1 | CHI$_3$ | 0.036 | 16,500/90/50 | 1.62 | 51.5 |
| 2 | CH$_2$I$_2$ | 0.021 | 48,100/90/150 | 1.53 | 19.0 |
| 3 | CH$_3$CHClI | 0.043 | 11,000/95/60 | 1.65 | 86.0 |
| 4 | F(CF$_2$)$_8$I | 0.024 | 15,500/80/60 | 1.93 | 49.5 |

TABLE 4

Influence of Ligand on the Rate of Polymerization and on the $M_n$ and $M_w/M_n$ of PMMA Obtained by Cu(O) Catalyzed Living Radical Polymerization of MMA and Initiated from CH$_3$CHClI (I).
[Cu(O)]$_0$/[I]$_0$/[MMA]$_0$ = 1/1/100 (molar ratios), DMSO, 25° C., [MMA]$_0$ = 6.4 mol/L

| No. | Ligand | $k_p^{exp}$ (min$^{-1}$) | $M_{nGPC}$/conv (%)/ time (min) | $M_w/M_n$ | $I_{eff}$ (%) |
|---|---|---|---|---|---|
| 1[a] | Me$_6$-TREN | 0.043 | 11,000/95/60 | 1.65 | 86.0 |
| 2[a] | PEI | 0.030 | 5,300/45/25 | 1.93 | 99.0 |
| 3[b] | bpy | 0.002 | 175,000/55/370 | 1.36 | 3.0 |

[a][Cu(O)]$_0$/[Ligand]$_0$ = 1/1 (molar ratio);
[b][Cu(O)]$_0$/[Ligand]$_0$ = 1/3 (molar ratio)

TABLE 5

Influence of Temperature on the Rate of Polymerization and on the $M_n$ and $M_w/M_n$ of PMMA Synthesized Cu(O)/Me$_6$-TREN Catalyzed Living Radical Polymerization of MMA and Initiated with CH$_3$CHClI in DMSO.
[Cu(O)]$_0$/[Me$_6$-TREN]O/[I]$_0$/[MMA]$_0$ = 1/1/1/100 (molar ratios). [MMA]$_0$ = 6.4 mol/L

| No. | T (° C.) | $k_p^{exp}$ (min$^{-1}$) | $M_{nGPC}$/conv (%)/ time (min) | $M_w/M_n$ | $I_{eff}$ (%) |
|---|---|---|---|---|---|
| 1 | 90 | 0.107 | 18,700/100/35 | 1.85 | 48.7 |
| 2 | 25 | 0.043 | 11,000/95/60 | 1.65 | 86.0 |
| 3 | 0 | 0.011 | 16,300/75/120 | 1.75 | 42.0 |

TABLE 6

Influence of Temperature on the Triad Tacticity and Glass Transition Temperature of PMMA Synthesized Cu(O)/Me$_6$-TREN Catalyzed Living Radical Polymerization of MMA and Initiated with CH$_3$CHClI in DMSO.
[Cu(O)]$_0$/[Me$_6$-TREN]$_0$/[I]$_0$/[MMA]$_0$ = 1/1/1/100 (molar ratios). [MMA]$_0$ = 6.4 mol/L

| No. | T (° C.) | rr (%)[a] | rm (%)[a] | mm (%)[a] | $T_g$ (° C.) |
|---|---|---|---|---|---|
| 1 | 90 | 57 | 38 | 5 | 117 |
| 2 | 25 | 66 | 31 | 3 | 120 |
| 3 | 0 | 72 | 27 | 1 | 124 |

[a]Determined by $^1$H-NMR (500 MHz) in CDCl$_3$ at 50° C.

TABLE 7

Influence of the Nature of the Catalyst on the Rate of Polymerization and on the $M_n$ and $M_w/M_n$ of the PMMA Synthesized by Initiation from $CH_3CHClI$ (I) in DMSO at 25° C. [Metal Catalyst]$_0$/[Me$_6$-TREN]$_0$/[I]$_0$/[MMA]$_0$ = 1/1/1/100 (molar ratios). [MMA]$_0$ = 6.4 mol/L

| No. | Catalyst | $k_p^{exp}$ (min$^{-1}$) | $M_{nGPC}$/conv (%)/ time (min) | $M_w/M_n$ | $I_{eff}$(%) |
|---|---|---|---|---|---|
| 1 | Cu(0) | 0.043 | 11,000/95/60 | 1.65 | 86.0 |
| 2 | CuI | 0.018 | 40,000/70/70 | 1.89 | 40.0 |
| 3 | CuCl | 0.006 | 10,000/70/150 | 2.76 | 74.4 |
| 4 | Cu$_2$O | 0.003 | 55,300/40/180 | 1.38 | 8.5 |

Non-Metalic Living Radical Polymerization of Alkyl Acrylates

The materials utilized in this example were as follows:

Materials. 2-Ethylhexyl acrylate (2EHA, 99+% from ACROS Organics) and tert-butyl acrylate (tBA, 98% from Aldrich) were passed through a basic $Al_2O_3$ chromatographic column (flash) before use. Iodoform (CHI$_3$, 99%) and sodium dithionite (Na$_2$S$_2$O$_4$, 85%) were purchased from Lancaster. The sodium salt of p-toluenesulfinic acid, hydrate (pTsNa, 98+%) was purchased from ACROS Organics. Tetrahydrofuran (THF, 99%), methylene chloride (99.5%), methanol (99.8%) and sodium bicarbonate (99+%) were purchased from Fisher Scientific. Methocel F50 (MF50) was purchased from the Dow Chemical Company. Poly(vinyl alcohol), 87-89% hydrolyzed with $M_w$, 124,000-186,000 (PVA 88) was purchased from Aldrich. All other chemicals were purchased from Aldrich and were used as received.

Techniques. $^1$H-NMR spectra (500 MHz) were recorded on a Bruker DRX500 spectrometer at 32° C. in CDCl$_3$ with tetramethylsilane (TMS) as internal standard. Gel permeation chromatography (GPC) analysis was performed on a Perkin-Elmer Series 10 high-pressure liquid chromatograph equipped with an LC-100 column oven (40° C.), a Nelson Analytical 900 Series integrator data station, a Perkin-Elmer 785A UV-Vis Detector (254 nm), a Varian Star 4090 RI detector and two AmGel (10 μm, 500 Å and 10 μm, 10$^4$ Å) columns. THF (Fisher, HPLC-grade) was used as eluent at a flow rate of 1 mL/min. Number-average ($M_n$) and weight-average ($M_w$) molecular weights were determined against PMMA standards. The conversion of the tBA was determined by $^1$H-NMR analysis of the organic phase of the reaction mixture by integrating the ~CH=CH$_2$ signal of tBA at 6.2 ppm and the signal of methine protons of poly(tBA) at 2.2 ppm. The conversion of the 2EHA was determined by $^1$H NMR analysis of the organic phase of the reaction mixture by integrating the ~CH=CH$_2$ signals of 2EHA at 6.2, 6.0 and 5.6 ppm and the signal of ~OCH$_2$~ protons of poly(2EHA) and 2EHA at 3.9 ppm. Alternatively, the polyacrylate was separated, dried and the conversion was determined gravimetrically.

Typical Procedure for the Polymerization of tBA Initiated with CHI$_3$

In a typical experiment a 50 mL Ace Glass 8648 #15 Ace-Thred pressure tube equipped with bushing and plunger valve was charged with a previously degassed 9 ml mixture of deionized water and 33.9 mg of 1.86% water solution of Methocel F50 and 36.8 mg of 4% water solution of PVA 88 ([MF50]/[PVA 88]=210 ppm/490 ppm w/w relative to monomer). The tube was filled with argon, closed and frozen using MeOH/dry ice. Subsequently, the initiator (CHI$_3$, 81.4 mg, 0.207 mmol), catalyst (Na$_2$S$_2$O$_4$, 3.6 mg, 0.021 mmol), buffer (NaHCO$_3$, 25.2 mg, 0.300 mmol), pTsNa (20.3 mg, 0.203 mmol) and tert-butyl acrylate (tBA, 3 mL, 0.021 mol) were added. The tube was closed and degassed through the plunger valve by applying reduced pressure and filling the tube with Ar 15 times at −40° C. The valve was closed and the reaction mixture was stirred in a water bath at 23±0.5° C. After 3 hours, the tube was opened and the water solution was decanted from the polymer. The crude polymer was dissolved in 10 ml of THF then precipitated into 300 ml of water-MeOH mixture (1:2 v/v). The precipitated polymer was filtered and dried in a vacuum oven (10$^{-2}$ Torr) to constant weight to give 2.625 g (95%) polymer with $M_n$=12,000 and $M_w/M_n$=2.40.

Typical Procedure for the Polymerization of 2EHA Initiated with CHI$_3$

The experiment was performed as in the previous case, except that 3 mL of 2EHA monomer (0.014 mol), 14.1 mg of CHI$_3$ (0.036 mmol), 24.9 mg of Na$_2$S$_2$O$_4$ (0.143 mmol), 14.1 mg of pTsNa (0.076 mmol), 4.4 mg of NaHCO$_3$ (0.052 mol), and 56.9 mg of 1.86% water solution of Methocel F50 and 67.4 mg of 4% water solution of P/A 88 ([MF50]/[PVA 88]=420 ppm/980 ppm w/w relative to monomer) were used. The reaction temperature was 30° C. The reaction time was 4 hours. The resulting polymer (2.18 g, 82.5%) had $M_n$=62,200 and $M_w/M_n$=2.15.

Discussion

SET-DTLRP of 2-ethylhexyl acrylate (2EHA) and of tert-butyl acrylate (tBA) was initiated with CHI$_3$ in H$_2$O containing NaHCO$_3$ buffer and was catalyzed by the SET agent Na$_2$S$_2$O$_4$ as reducing agent.

FIG. V-1a shows th kinetic plots for SET-DTLRP of 2EHA prepared at 30° C. in H$_2$O under the following reaction conditions: [2EHA]$_0$/[CHI$_3$]$_0$/[Na$_2$S$_2$O$_4$]$_0$/[pTsNa]$_0$/[NaHCO$_3$]$_0$=400/1/4/2/1.45 (molar ratios). A very fast polymerization was observed. About 80% monomer conversion was obtained after 2 hours. After that, the reaction proceeds with a much lower rate. The plot of ln[M]$_0$/[M] shows two linear dependences on time. The first one corresponds to $k_{p1}$=0.820 h$^{-1}$ and the second one to a $k_{p2}$=0.081 h$^{-1}$. The change in slope corresponds to the isolation of poly(2EHA) from the original homogeneous reaction mixture to a second viscous liquid phase. The experimental $M_n$ values of the poly(2EHA) determined by GPC, follow a linear dependence on conversion or on theoretical $M_n$ ($M_{th}$) (FIG. V-1a). This linear dependence together with the ln[M]$_0$/[M] vs time demonstrates a living polymerization process.

FIG. V-1b shows the kinetic of the polymerization of tBA in H$_2$O at 23° C. under the following conditions: [tBA]$_0$/[CHI$_3$]$_0$/[Na$_2$S$_2$O$_4$]$_0$/[pTsNa]$_0$/[NaHCO$_3$]$_0$=100/1/0.1/0.5/1.45 (molar ratios). In this set of experiments the molar ratio [CHI$_3$]$_0$/[Na$_2$S$_2$O$_4$]$_0$ was reduced from that of FIG. V-1a that was 1/4 to 1/0.1. The kinetic plots from FIG. V-1b resemble those from FIG. V-1a except that the rate of the fast part of the reaction as well as that of the second part are higher in FIG. 1b than in FIG. V-1a. About 95% monomer conversion was obtained within 2.5 hours. The ln[M]$_0$/[M] versus time, the $M_n$ versus $M_{th}$, $M_w/M_n$ versus $M_{th}$ and the $I_{eff}$ follow similar trends as in FIG. V-1a.

Therefore, in the next experiment we have decided to increase the ratio [CHI$_3$]$_0$/[Na$_2$S$_2$O$_4$]$_0$ from 1/0.1 to 1/0.5. The kinetic plots of this experiment are shown in FIG. V-1c. Complete monomer conversion is obtained in 2 to 3 hours. The ln[M]$_0$/[M] vs time shows a single slope with a $k_p$=1.58 h$^{-1}$. The rest of the data are following the same trend as the data from FIGS. V-1a and b. The single slope of this SET-DTLRP is rewarding since it demonstrates that with additional optimization experiments this might provide the synthetic method of choice for living radical polymerization of acrylates. The results obtained from the kinetic plots of FIGS. V-1a, b and c are summarized in Table 1.

TABLE 1

$Na_2S_2O_4$ Catalyzed Living Radical Polymerization of Acrylates in Water. [Acrylate]$_0$/[CHI$_3$]$_0$/[pTsNa]$_0$/ [NaHCO$_3$]$_0$ = 100/1/0.5/1.45 (molar ratios), water, 23° C., [MF5O]/[PVA88] = 210/490 (ppm/ppm, w/w relative to monomer)

| No. | Acrylate | [Na$_2$S$_2$O$_4$]$_0$/ [CHI$_3$]$_0$ (mol/mol) | $k_{p1}^{exp}$/ $k_{p2}^{exp}$ (h$^{-1}$) | M$_{nGPC}$/conv (%)/ time (h) | M$_w$/ M$_n$ |
|---|---|---|---|---|---|
| 1 | tBA | 0.5 | 1.584/— | 15,900/100/3.5 | 2.36 |
| 2 | tBA | 0.1 | 0.978/0.197 | 12,000/96/3.5 | 2.81 |
| 3[a] | 2EHA | 4 | 0.820/0.081 | 61,200/82/5.4 | 2.15 |
| 4[b] | tBA | 0.5 | 0.015/— | 823,150/61/2.71 | 1.15 |

[a]This experiment was carried out under the following conditions: [2EHA]$_0$/[Na$_2$S$_2$O$_4$]$_0$/[CHI$_3$]$_0$/[pTsNa]$_0$/[NaHCO$_3$]$_0$ = 400/1/4/2/1.45 (molar ratios), water, 30° C., [MF50]/[PVA88] = 420/980 (ppm/ppm, w/w relative to 2EHA);
[b]This experiment was carried out under the following conditions: [tBA]$_0$/[Na$_2$S$_2$O$_4$]$_0$[CHI$_3$]$_0$/[pTsNa]$_0$/[NaHCO$_3$]$_0$ = 4,000/1/0.5/0.5/2.9 (molar ratios), water, 23° C., [MF50]/[PVA88] = 210/490 (ppm/ppm, w/w relative to tBA)

Living Radical Polymerization of Halogen-Containing Monomers in the Presence of Initiator Terminated Acrylic Polymers and the Formation of Block Copolymers Therefrom It has now been found that in lieu of polymerizing acrylic monomers, halogen-containing monomers such as vinyl chloride can be polymerized in the presence of initiator containing acrylic polymers utilizing essentially the same components such as catalysts (for example metal catalysts or metal-free catalysts) ligands, buffers, initiators, diluents, etc. under the essentially the same reaction conditions as set forth hereinabove and accordingly the same is hereby fully incorporated by reference.

Thus, block copolymers can be made from initiators containing acrylic polymers such as poly(methyl acrylate), poly(butyl acrylate), poly(tert-butyl acrylate), poly(2-ethylhexyl acrylate or poly(methyl methacrylate) and one or more vinyl halide monomers such as vinyl chloride with etiher a metal catalyst or a metal-free catalyst. The number average molecular weight alkyl acrylate block, as previously noted, can be from about 500 to about 1,000,000, desirably from about 1,000 to about 500,000, and preferably from about 1,500 to about 150,000 whereas the number average molecular weight of an alkyl alkacrylate block can be from about 1,000 to about 1,200,000, desirably from about 2,000 to about 600,000, and preferably from about 2,500 to about 200,000.

The block copolymers of the present invention generally have an BA or an B$_m$A type structure, where A is an acrylate macroinitiator and B is derived from halogen-containing monomers, and m is generally from 1 to about 6, desirably from 1 to about 3, and preferably 1 or 2. Acrylate polymers are those as set forth hereinabove such as poly(methyl acrylate), poly(butyl acrylate), poly(tert-butyl acrylate), poly(2-ethylhexyl acrylate or poly(methyl methacrylate) and the same is hereby fully incorporated by reference. Naturally the acrylate blocks can be made in a manner as set forth hereinabove and generally contain halide end groups such as an iodo or an organic iodo end group which servies as a site for initiation and polymerization of the vinyl halide monomers.

Metal catalysts or metal-free catalysts can be utilized to form the halogen-containing blocks such as polyvinyl chloride. The metal catalysts are set forth herein above and preferably include Cu(O), CuCl, or Fe and the like and are desirably utilized in association with the above noted ligands which generally contain 2, 3, or 4 nitrogen atoms as described hereinabove with 2,2'-bipyridine, Me$_6$-TREN, and HMTETA being preferred. The amounts of such catalysts and ligands are also set forth herein above. Similarly, the diluents which are desirably organic when a metal catalyst is utilized are also set forth hereinabove with DSMO and diphenyl oxide being preferred in amounts which are also set forth herein above.

The halogen-containing monomers in the presence of a metal catalyst are then polymerized off of the initiators of the acrylic block at temperatures noted herein above such as from about minus 40° C. to about 130° C., desirably from about 0° C. to about 90° C., and preferably from about 25° C. to about 90° C. generally in the presence of an inert atmosphere such as nitrogen or argon.

When metal-free catalysts are utilized such as those set forth herein above as for example Na$_2$S$_2$O$_4$. Ligands are not utilized but rather as noted above it is highly desirable to utilize one or more buffer compounds to avoid acidic decomposition of the sulfur containing catalysts. Suitable buffers are set forth hereinabove and include alkaline salts of inorganic and organic acids, which water solutions keep pH 8-10, such as NaHCO$_3$, Na$_2$HPO$_4$, NaH$_2$PO$_4$, CH$_3$COONa or the potassium or ammonium slats thereof, including KHCO$_3$, K$_2$HPO$_4$, KH$_2$PO$_4$, CH$_3$COOK, NH$_4$HCO$_3$, (NH$_4$)HPO$_4$, NH$_4$H$_2$PO$_4$, CH$_3$COONH$_4$, and the like. The metal-free catalysts and buffers are utilized in amounts as noted above.

The use of the above-noted electronic shuttles and phase transfer catalysts as well as additives are optional and can be utilized in the above noted amounts. The diluent or solvent is generally water although a combination of water and various salts or organic soluble compounds can be utilized in the above indicated amounts. If desired, the above noted surfactants can also be utilized in suitable amounts.

The reaction conditions of the metal-free catalyst route are also listed above with regard to the polymerization of halogen-containing compounds such as vinyl chloride and the like. For example, in an inert atmosphere such as argon or nitrogen the formation of the block copolymer can range from about minus 40° C. to about 100° C., desirably from about 0° C. to about 90° C., and preferably from about 25° C. to about 45° C.

As with the formation of block copolymers from an initiator containing halogen-containing polymers such as polyvinyl chloride, block copolymers made from initiator containing acrylic polymers are made without using typical free radical initiators such as various peroxides, various persulfates, various azo-derivatives, and various Redox initiators, or the same are used in very small amounts as noted above.

The block copolymer formed from an acrylic polymer macroinitiator can have halogen-containing polymer blocks having a number average molecular weight of from about 800 to about 150,000, desirably from about 1,000 to about 50,000, and preferably from about 1,200 to about 40,000. As above, the block copolymers of the present invention have a low molecular weight distribution range, i.e. M$_w$/M$_n$, of from about 1.1 to about 2.7, desirably from about 1.1 to about 2.1 or about 2.4, and preferably from about 1.1 to about 1.5. Low molecular weight distributions are very desirable and advantageous inasmuch as they result in improved properties such as mechanical strength and environmental stability. Another important advantage of the block copolymers of the present invention is that they can be made in very rapid reaction times such as less than 20 hours and desirably less than 8 hours and, as noted above, at generally low temperatures, for example from about 25° C. to about 45° C.

As with the block copolymers made from a halogen-containing polymer macroinitiator, the block copolymer is made from an acrylic polymer macroinitiator, e.g. (PMMA), will also have improved and unexpected properties such as a single $T_g$ generally of from about 102° C. to about 120° C. The block coplymers of the present invention are engineering plastics and have high heat distortion temperatures such as from about 95° C. to about 125° C. and desirably from about 110° C. to about 125° C. Thus the block copolymers can be utilized in applications involving hot water up to and including 100° C., such as piping, autoclaving, and the like. Moreover, when the acrylic block is derived from an alkyl acrylate the same, depending on the structure of the acrylate, can serve as an interal plasticizer and the block copolymer have $T_g$ less than about 20° C., preferably less than about 0° C. and preferably less than −25° C. and generally does not bleed or leach out since it is chemically bound to the PVC. Other uses are the same as set forth hereinabove with regard to the block copolymers derived from a halogen containing polymer macroinitiator.

Inasmuch as the $T_g$ of block copolymers derived from an alkyl acrylate macroinitiator are much lower suitable uses include soft, flexible children's toys, blood bags, flexible tubing for various fluids and the like. Other uses include a replacement where plasticized PVC or other elastomers have been utilized.

The formation of the various block copolymers derived from an acrylic polymer macroinitiator will be better understood by reference to the following examples which serve to illustrate but not to limit the present invention.

EXAMPLES

Typical Procedure for the Block Polymerization of VC Initiated from α,ω-Di(Iodo)P2EHA In a typical experiment a 50 mL Ace Glass 8648 #15 Ace-Thred pressure tube equipped with bushing and plunger valve was charged with α,ω-di(iodo)P2EHA macroinitiator (2.61 g, $M_n$=20,400, $M_w/M_n$=2.52, 0.013 mmol) and a previously degassed 6.6 ml mixture of deionized water and 134.8 mg of 1.86% water solution of Methocel F50 and 146.2 mg of 4% water solution of PVA 88 ([MF50]/[PVA 88] 1260 ppm/2940 ppm w/w relative to VC). The tube was filled with argon, closed and frozen using MeOH/dry ice. Subsequently, the catalyst ($Na_2S_2O_4$, 178.6 mg, 0.103 mmol), buffer ($NaHCO_3$, 15.6 mg, 0.019 mmol), pTsNa (100.6 mg, 0.051 mmol) and precondensed VC (2.2 mL, 0.032 mol) were added. The exact amount of VC was determined gravimetrically after the reaction. The tube was closed and degassed through the plunger valve by applying reduced pressure and filling the tube with Ar 15 times at minus 40° C. The valve was closed and the reaction mixture was stirred in a water bath at 43±0.5° C., behind a protective shield. After 24 hours, the tube was opened, the excess of VC was distilled and the water solution was decanted from the block polymer. The block polymer was rinsed two times with 30 ml of $H_2O$ then washed 3 times with 10 ml of MeOH. The block copolymer was filtered and dried in a vacuum oven ($10^{-2}$ Torr) to constant weight to give 3.75 g (57.5%) block copolymer with $M_n$=28,000 and $M_w/M_n$=1.70.

Techniques. $^1$H-NMR spectra (500 MHz) were recorded on a Bruker DRX500 spectrometer at 32° C. in $CDCl_3$ with tetramethylsilane (TMS) as internal standard. Gel permeation chromatography (GPC) analysis was performed on a Perkin-Elmer Series 10 high-pressure liquid chromatograph equipped with an LC-100 column oven (40° C.), a Nelson Analytical 900 Series integrator data station, a Perkin-Elmer 785A UV-Vis Detector (254 nm), a Varian Star 4090 RI detector and two AmGel (10 μm, 500 Å and 10 μm, 104 Å) columns. THF (Fisher, HPLC-grade) was used as eluent at a flow rate of 1 mL/min. Number-average ($M_n$) and weight-average ($M_w$) molecular weights were determined against PMMA standards. Glass transition temperatures were determined on a Thermal Analysis TA-2920 modulated differential scanning calorimeter (DSC). In, ail cases, the heating and cooling rates were 5° C./min.

Materials. Vinyl chloride (VC, 99%) was purchased from Aldrich and distilled before use. 2-Ethylhexyl acrylate (2EHA, 99+% from ACROS Organics) was passed through a basic $Al_2O_3$ chromatographic column (flash) before use. Iodoform ($CHI_3$, 99%) and sodium dithionite ($Na_2S_2O_4$, 85%) were purchased from Lancaster. The sodium salt of ptoluenesulfinic acid, hydrate (pTsNa, 98+%) was purchased from ACROS Organics. Tetrahydrofuran (THF, 99%), methylene chloride (99.5%), methanol (99.8%) and sodium bicarbonate (99+%) were purchased from Fisher Scientific. Methocel F50 (MF50) was purchased from the Dow Chemical Company. Poly(vinyl alcohol), 87-89% hydrolyzed with $M_w$ 124,000-186,000 (PVA 88) was purchased from Aldrich. All other chemicals were purchased from Aldrich and were used as received. α,ω-Di(iodo)P2EHA macroinitiators were synthesized as described elsewhere.

Discussion

The kinetic of the first block copolymerization experiment was performed under the following reaction conditions: $[VC]_0/[P2EHA]_0/[Na_2S_2O_4]_0/[pTsNa]_0/[NaHCO_3]_0$=81 3/1/8/4/1.45 (molar ratios) (FIG. VI-1a). The block copolymerization process has an induction period in spite of the fact that α,ω-di(iodo)P2EHA is soluble in VC. When α,ω-di(iodo)P2EHA was obtained at 23° C., after the induction period, the block copolymerization process follows three kinetic regimes. The first one is slow $k_{p1}$=0.050 $h^{-1}$, the second is faster ($k_{p2}$=0.286 $h^{-1}$) and the third one is also slow ($k_{p3}$=0.024 $h^{-1}$). As previously shown in the case of SET-DTLRP of VC initiated from iodoform a two rate regime was observed. In that case the second rate was slower than the first one and corresponds to the formation of the solid suspension phase. A possible explanation for the three-stage kinetic observed in FIG. 1a is that some unreacted 2EHA is present in α,ω-di(iodo)P2EHA macroinitiator prepared at 23° C. 2EHA inhibits the first stage since it does not copolymerize with VC. When 2EHA is completely consumed by addition to the P2EHA macroinitiator we observe the fast second stage polymerization of VC. The last slow stage is associated with the precipitation of the block copolymer. It is remarkable that the experimental $M_n$ of the block copolymer determined by gel permeation chromatography (GPC) with PMMA standards follows a linear dependence of conversion or of the theoretical molecular weight ($M_{th}$) of the block copolymer. This dependence together with the sharp decrease of the $M_w/M_n$ values as a function of time, conversion or $M_{th}$ demonstrates the living character of the block copolymerization process. Also remarkable is that the initiation efficiency is about 100%.

The second kinetic experiment was carried out with α,ω-di(iodo)P2EHA of $M_n$=20,400 and $M_w/M_n$=2.52 under the following conditions: $[VC]_0/[P2EHA]_0/[Na_2S_2O_4]_0/[pT-sNa]_0/[NaHCO_3]_0$=248/1/8/4/1.45 (molar ratios) also at 43° C. The kinetic data of this experiment are shown in Figure VI-1b. Again an induction period was observed. However, this kinetic follows a two-stage process. This different kinetic behavior is, most probably, due to absence of 2EHA impurities in α,ω-di(iodo)P2EHA obtained at higher polymerization temperature, 30° C. A linear increase of $M_n$ and a sharp decrease of $M_w/M_n$ are observed. The initiation efficiency is, most probably, about 100%. Initiation efficiency of about 100% is also supported by the fact that the PVC-b-P2EHA-b-PVC does not leach unreacted P2EHA macroinitiator during washing with methanol. As mentioned above, methanol is a good solvent for P2EHA.

TABLE 1

Theoretical and Experimental Values of the Glass Transition Temperatures of PVC-b-P2EHA-b-PVC Block Copolymer

| No. | Block Copolymer, $M_n$ | P2EHA (wt %) | PVC (wt %) | Theoretical Tg (° C.) | Experimental Tg (° C.) |
|---|---|---|---|---|---|
| 1 | 33,000 | 37.8 | 62.2 | 7.8 | 4.9 |
| 2 | 34,900 | 43.7 | 56.3 | −1.2 | −3.6 |
| 3 | 31,200 | 49.6 | 50.4 | −9.6 | −6.0 |
| 4 | 29,000 | 59.3 | 40.7 | −22.5 | −16.1 |
| 5 | 22,000 | 66.9 | 33.1 | −31.6 | −27.1 |

While in accordance with the patent statutes the best mode and preferred embodiment have been set forth, the scope of the invention is not limited thereto, but rather by the scope of the attached claims.

What is claimed is:

1. A copolymer, comprising:
a block copolymer comprising at least one A block and at least one B block, wherein said B block is a chlorine containing polymer or copolymer derived from the living radical polymerization of one or more chlorine containing monomers in the presence of a mono- or poly-functional initiator comprising a chlorine, iodine, or bromine atom wherein no chain transfer occurs; and;
wherein said A block is derived from the living radical polymerization of one or more acrylic monomers in the presence of said initiator containing B block wherein no chain transfer occurs, and either
i) a metal catalyst, and optionally a ligand, or
ii) a transition metal-free catalyst, and optionally a buffer, and
wherein said block copolymer has a single $T_g$.

2. A copolymer according to claim 1,
wherein said one or more acrylic monomers is an acrylonitrile, an alkyl acrylate wherein said alkyl contains from 1 to about 10 carbon atoms, an alkyl alkacrylate wherein said alkyl group contains from 1 to about 10 carbon atoms and said alk group contains 1 to about 3 carbon atoms, a $C_3$ to about $C_8$ cycloalkyl acrylate, or a $C_7$ to about $C_{15}$ bicycloalkyl acrylate, or combinations thereof;
wherein said metal catalyst is one or more of a metal in a zero oxidation state, a metal salt, or a metal complex;
wherein said transition metal-free catalyst is a low valent sulfur salt;
wherein said ligand is a phosphorus, oxygen or a nitrogen containing ligand;
wherein said mono- or poly-functional initiator of said chlorine-containing polymer is a mono-, di-, tri-, or polyfunctional activated halide compound wherein said halide is a chloro, bromo, or iodo compound including α,α-dihaloalkane, α,α,α-trihaloalkane, a perhaloalkane, a perfluoroalkyl halide, a benzyl halide, an allyl halide, a sulfonyl halide, an α-haloester, an α-halonitrile, a α-haloketone, an amidyl halide, or combinations thereof.

3. A copolymer according to claim 2, wherein said chlorine containing polymer or copolymer is derived from one or more of vinyl chloride, vinylidene chloride, 2-chloropropene, or 2-chloropropine, or combinations thereof;
wherein said acrylic monomer is said alkyl acrylate, or said alkyl alkacrylate wherein said alk group is methyl, or combinations thereof;
wherein said metal of said metal catalyst is Cu; Fe, Al, Cd, Mo, W, Rh, Re, Ru, Pt, Ti, Mn, Ni, Pd, or Co, or combinations thereof; and wherein said metal catalyst includes said ligand, wherein said ligand comprises one or more of an trialkylphosphine (alkyl $C_1$-$C_6$), triphenylphosphine, triphenylphosphine oxide, acetylacetonate, or carbon monoxide or combinations thereof, at least one bidentate comprising N,N,N',N'-tetramethylethane-1,2-diamine; [2-(2-dimethylamino-ethoxy)-ethyl]-dimethyl-amine; 2-(4,5-dihydro-oxazol-2-yl)pyridine; [1,10]phenanthroline; 4,7-diphenyl-[1,10] phenanthroline; dodecahydro-7,14-methano-dipyrido [1,2-a; 1',2'-e][1,5]diazocine; 2,2'-bipyridine; 5,5'-dialkyl-2,2'-bipyridine (alkyl $C_1$-$C_{13}$); 4,4'-dialkyl-2,2'-bipyridine (alkyl $C_1$-$C_9$); N-alkyl-2-pyridylmethanimine (alkyl $C_2$-$C_{20}$); aryl-pyridin-2-ylmethylene-amine (aryl-phenyl, 2,4,6-trimethyl phenyl); alkyl-(phenyl-pyridin-2-yl-methylene)-amine (alkyl $C_2$-$C_{10}$); alkyl-(1-pyridin-2-yl-ethylidene)-amine (alkyl $C_1$-$C_{10}$); N,N'-dialkylethanediimine (alkyl $C_2$-$C_{10}$); or combinations thereof; or at least one tridentate comprising N,N,N',N'',N''-pentaalkyldiethylenetriamine (alkyl $C_1$-$C_{11}$); N,N-bis(2-pyridylmethyl) alkylamine (alkyl $C_2$-$C_{10}$); N-(2-pyridinylmethylene)-2-pyridinemethanamine; N,N',N''-trimethyl-1,4,7-triazacyclononane; N,N-dimethyl-N'-pyridin-2-ylmethylene-methanediamine; 2,6-[bis(2-alkylimino-2-ethyl)]pyridine (alkyl $C_2$-$C_8$); 4,4',4''-trialkyl-[2,2'; 6',2'']terpyridine (alkyl $C_1$-$C_{10}$); 2,6-bis[4-alkyl-2-oxazolin-2-yl]pyridine (alkyl $C_1$-$C_4$); 4-[7-(4,5-dihydro-2-oxazolyl)heptyl]-4'-methyl-2,2'-bipyridine; or combinations thereof; or at least one tetradentate comprising tris(2-aminoethyl)amine, 1,1,4,7,10,10-hexamethyltriethylenetetramine (HMTETA); 5,5,7,12,12,14-hexamethyl-1,4,8,11-tetraazacyclotetradecane; 1,4,8,11-tetramethyl-1,4,8,11-tetraazacyclotetradecane; N,N'-ethylenebis(pyridine-2-carbaldimine); tris [2-(dimethylamino)ethyl]amine ($Me_6$-TREN); tris[2-pyridylmethyl)amine; tris[di(carbalkoxyethyl) aminoethyl]amine (alk $C_1$-$C_4$); or a combination thereof; or a polydentate ligand comprising 1,3,5-tris (dimethylaminopropyl)-1,3,5-triazacyclohexane and permethyl(polyethyleneimine) (MePEI); and
wherein said initiator is derived from a monofunctional iodo initiator $C_nF_{2n+1}I$ wherein n is from 1 to about 20, $CH_3CH(Cl)I$, $ICH_2COOAlk$ (Alk $C_1$-$C_2$), $ICH_2CN$, $CH_2I_2$, $I(CH_3)_2COOAlk$ (Alk $C_1$-$C_2$), $ArSO_2I$ (Ar-phenyl, 4-methylphenyl, 4-methoxyphenyl), $CH(Cl)I$-COOEt, or combinations thereof, or is derived from a difunctional initiator comprising $I(CF_2)_nI$ where n is from 1 to about 16, or $CHI_3$, or an initiator containing two ~CH(Cl)I groups, or is derived from a multifunctional iodo initiator containing three or more ~CH(Cl)I groups.

4. A copolymer according to claim 3, wherein said alkyl acrylate is methyl acrylate, ethyl acrylate, butyl acrylate, tert-butyl acrylate or 2-ethylhexyl acrylate, and wherein said alkyl alkacrylate is methyl methacrylate;
wherein said metal catalyst is Cu(O); CuCl, CuBr, CuI, CuSPh, CuPF$_6$, CuSCN, CuN$_3$, CuCF$_3$SO$_3$, CuSBu, CuC≡CPh, CuO, Cu$_2$S, Cu$_2$Se, Cu$_2$Te, Fe(O), or Ti Cp$_2$Cl$_2$, or combinations thereof;
wherein said metal-free catalyst comprises Na$_2$S$_2$O$_4$, H$_2$NC(=NH)SO$_2$H, HOCH$_2$SO$_2$Na, HOCH$_2$SO$_3$Na, Na$_2$SO$_3$, Na$_2$S$_2$O$_5$, Na$_2$S$_2$O$_3$, CH$_3$SO$_2$Na, C$_6$H$_5$SO$_2$Na, p-CH$_3$C$_6$H$_4$SO$_2$Na, (Me$_2$N)$_2$C=C(NMe$_2$)$_2$, or combinations thereof, and including said buffer, said buffer comprising NaHCO$_3$, Na$_2$HPO$_4$, NaH$_2$PO$_4$, CH$_3$COONa, KHCO$_3$, K$_2$HPO$_4$, KH$_2$PO$_4$, CH$_3$COOK, NH$_4$HCO$_3$, (NH$_4$)$_2$HPO$_4$, NH$_4$H$_2$PO$_4$, CH$_3$COONH$_4$, or combinations thereof;
including a diluent, and
wherein said block copolymer has a M$_w$/M$_n$ distribution of from about 1.1 to less than 2.1

5. A copolymer according to claim 4, wherein said alkyl acrylate is said methyl acrylate;
wherein said catalyst is said transition metal free catalyst;
wherein said initiator is derived from CH$_3$—CH—(Cl)I; CH$_2$—I$_2$; or CH—I$_3$, or combinations thereof;
wherein said poly(vinyl chloride) has a number average molecular weight of from about 800 to about 150,000, wherein said poly(alkyl acrylate) block has a number average molecular weight of from about 500 to about 1,000,000, wherein said poly(alkyl alkacrylate) block has a number average molecular weight of from about 1,000 to about 1,200,000, and wherein said block copolymer has a M$_w$/M$_n$ distribution of from about 1.1 to about 1.5;
wherein said chlorine containing B block is formed at a temperature of about 45° C. or less,
wherein said diluent comprises water, or water and an organic solvent, and
wherein said single T$_g$ of said block copolymer is from about 102° C. to about 120° C.

6. A copolymer according to claim 5, wherein said number average molecular weight of said poly(vinyl chloride) block is from about 11000 to about 50,000, wherein said number average molecular weight of said poly(methyl acrylate) block is from about 1,000 to about 500,000, wherein said number average molecular weight of said poly(methyl methacrylate) block is from about 200,000 to about 600,000, wherein said transition metal-free catalyst comprises Na$_2$S$_2$O$_4$, or H$_2$NC(=NH)SO$_2$H, and wherein said buffer is said NaHCO$_3$; and
wherein said chlorine containing B block is formed at a temperature of from about 5 to about 45° C.

7. A copolymer according to claim 4, wherein said catalyst is said metal catalyst, and wherein said metal catalyst is Cu(O), CuCl, or Fe, or combinations thereof, wherein said ligand is 2,2'-bipyridine, tris[2-(dimethylamino)ethyl]amine, or 1,1,4,7,10,10-hexamethyltriethylenetetramine, or combinations thereof;
wherein said diluent is dimethylsulfoxide (DMSO), diphenyl ether, cyclohexanone, ethylene carbonate, N,N-dimethylformamide (DMF), N-methylformamide, formamide, N,N-dimethyl acetamide, N,N,N',N'-tetramethyl urea, 1,3-dimethyl-tetrahydro-pyrimidin-2-one, acetone, methylethylketone, acetonitrile, N-methyl-2-pyrrolidone, hexamethylphosphotriamide, 1-butyl-3-methylimidazolium hexafluorophosphate;
and said M$_w$/M$_n$ distribution is from about 1.1 to about 1.5.

8. A copolymer according to claim 7, wherein said acrylic polymer is poly(methyl methacrylate), and wherein said single T$_g$ of said block copolymer is from about 102° C. to about 120° C.

9. A copolymer according to claim 2, wherein said block copolymer is AB or an A$_n$B type block copolymer where n is 1 to about 6.

10. A copolymer according to claim 4, wherein said block copolymer is AB or an A$_n$B type block copolymer where n is 1 to about 3.

11. A copolymer according to claim 6, wherein said block copolymer is AB or an A$_n$B type block copolymer where n is 1 or 2.

12. A copolymer, comprising:
a block copolymer comprising at least one A block and at least one B block, wherein said A block is an acrylic polymer derived from the living radical polymerization of one or more acrylic monomers in the presence of a mono- or poly-functional initiator comprising a chlorine, iodine, or bromine atom wherein no chain transfer occurs; and
wherein said B block is derived from a living radical polymerization of one or more chlorine containing monomers in the presence of said initiator containing A block wherein no chain transfer occurs, either
i) a metal catalyst, and optionally a ligand, or
ii) a transition metal-free catalyst, and optionally a buffer, and
wherein said block copolymer has a single T$_g$.

13. A copolymer according to claim 12, wherein said acrylic containing polymer or copolymer comprises a polyacrylonitrile, a poly(alkyl acrylate) wherein said alkyl contains from 1 to about 10 carbon atoms, a poly (alkyl alkacrylate) wherein said alkyl group contains from 1 to about 10 carbon atoms and said alk group contains 1 to about 3 carbon atoms, a C$_3$ to about C$_8$ poly(cycloalkyl acrylate), or a C$_7$ to about C$_{15}$ poly(bicycloalkyl acrylate), or combinations thereof,
wherein said metal catalyst is one or more of a metal in a zero oxidation state, a metal salt, or a metal complex;
wherein said transition metal-free catalyst is a low valent sulfur salt;
wherein said ligand is a phosphorus, oxygen, or a nitrogen containing ligand;
wherein said mono- or poly-functional initiator of said acrylic-containing polymer is derived from a mono-, di-, tri- or polyfunctional activated halide compound wherein said halide is a chloro, iodo, or bromo compound including α,α-dihaloalkane, α,α,α-trihaloalkane, a perhaloalkane, a perfluoroalkyl halide, a benzyl halide, an allyl halide, a sulfonyl halide, an α-haloester, an α-halonitrile, a α-haloketone, an amidyl halide, or combinations thereof.

14. A copolymer according to claim 13, wherein said acrylic polymer is said poly(alkyl acrylate), or said poly (alkyl alkacrylate) wherein said alk group is methyl, or combinations thereof;
wherein said chlorine containing monomer is vinyl chloride, vinylidene chloride, 2-chloropropene, or 2-chloropropine, or combinations thereof;
wherein said metal of said metal catalyst is Cu; Fe, Al, Cd, Mo, W, Rh, Re, Ru, Pt, Ti, Mn, Ni, Pd, or Co, or combinations thereof; and wherein said metal catalyst includes said ligand, wherein said ligand comprises one or more of an trialkylphosphine (alkyl $C_1$-$C_6$), triphenylphosphine, triphenylphosphine oxide, acetylacetonate, or carbon monoxide or combinations thereof, at least one bidentate comprising N,N,N',N'-tetramethyl-ethane-1,2-diamine; [2-(2-dimethylamino-ethoxy)-ethyl]-dimethyl-amine; 2-(4,5-dihydro-oxazol-2-yl)pyridine; [1,10]phenanthroline; 4,7-diphenyl-[1,10] phenanthroline; dodecahydro-7,14-methano-dipyrido [1,2-a; 1',2'-e][1,5]diazocine; 2,2'-bipyridine; 5,5'-dialkyl-2,2'-bipyridine (alkyl $C_1$-$C_{13}$); 4,4'-dialkyl-2,2'-bipyridine (alkyl $C_1$-$C_9$); N-alkyl-2-pyridylmethanimine (alkyl $C_2$-$C_{20}$); aryl-pyridin-2-ylmethylene-amine (aryl-phenyl, 2,4,6-trimethyl phenyl); alkyl-(phenyl-pyridin-2-yl-methylene)-amine (alkyl $C_2$-$C_{10}$); alkyl-(1-pyridin-2-yl-ethylidene)-amine (alkyl $C_1$-$C_{10}$); N,N'-dialkylylethanediimine (alkyl $C_2$-$C_{10}$); or combinations thereof; or at least one tridentate comprising N,N,N',N'',N''-pentaalkyldiethylenetriamine (alkyl $C_1$-$C_{11}$); N,N-bis(2-pyridylmethyl) alkylamine (alkyl $C_2$-$C_{10}$); N-(2-pyridinylmethylene)-2-pyridinemethanamine; N,N',N''-trimethyl-1,4,7-triazacyclononane; N,N-dimethyl-N'-pyridin-2-ylmethylene-methanediamine; 2,6-[bis(2-alkylimino-2-ethyl)]pyridine (alkyl $C_2$-$C_8$); 4,4',4''-trialkyl-[2,2'; 6',2'']terpyridine (alkyl $C_1$-$C_{10}$); 2,6-bis[4-alkyl-2-oxazolin-2-yl]pyridine (alkyl $C_1$-$C_4$); 4-[7-(4,5-dihydro-2-oxazolyl)heptyl]4'-methyl-2,2'-bipyridine; or combinations thereof; or at least one tetradentate comprising tris(2-aminoethyl)amine, 1,1,4,7,10,10-hexamethyltriethylenetetramine (HMTETA); 5,5,7,12,12,14-hexamethyl-1,4,8,11-tetraazacyclotetradecane; 1,4,8,11-tetramethyl-1,4,8,11-tetraazacyclotetradecane; N,N'-ethylenebis(pyridine-2-carbaldimine); tris[2-(dimethylamino)ethyl]amine ($Me_6$-TREN); tris[2-pyridylmethyl)amine; tris[di(carbalkoxyethyl) aminoethyl]amine (alk $C_1$-$C_4$); or a combination thereof; or a polydentate ligand comprising 1,3,5-tris (dimethylaminopropyl)-1,3,5-triazacyclohexane and permethyl(polyethyleneimine) (MePEI); and wherein said initiator is derived from a monofunctional iodo initiator $C_nF_{2n+1}I$ wherein n is from 1 to about 20, $CH_3CH(Cl)I$, $ICH_2COOAlk$ (Alk $C_1$-$C_2$), $ICH_2CN$, $CH_2I_2$, $I(CH_3)_2COOAlk$ (Alk $C_1$-$C_2$), $ArSO_2I$ (Ar-phenyl, 4-methylphenyl, 4-methoxyphenyl, CH(Cl)I-COOEt, or combinations thereof, or is derived from a difunctional initiator comprising $I(CF_2)_nI$ where n is from 1 to about 16, or $CHI_3$, or an initiator containing two ~CH(Cl)I groups, or is derived from a multifunctional iodo initiator containing three or more ~CH(Cl)I groups.

15. A copolymer according to claim 14, wherein said poly(alkyl acrylate) is poly(methyl acrylate), poly(ethyl acrylate), poly(butyl acrylate), poly(tert-butyl acrylate) or poly(2-ethylhexyl acrylate), or combinations thereof, and wherein said poly(alkyl alkacrylate) is poly(methyl methacrylate);

wherein said chlorine containing monomer is said vinyl chloride, or said vinylidene chloride;

wherein said metal catalyst is Cu(O); CuCl, CuBr, CuI, CuSPh, $CuPF_6$, CuSCN, $CuN_3$, $CuCF_3SO_3$, CuSBu, CuC≡CPh, CuO, $Cu_2S$, $Cu_2Se$, $Cu_2Te$, Fe(O), or Ti $Cp_2Cl_2$, or combinations thereof;

wherein said transition metal-free catalyst comprises $Na_2S_2O_4$, $H_2NC(=NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, $(Me_2N)_2C=C(NMe_2)_2$, or combinations thereof, and including said buffer, said buffer comprising $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$, or combinations thereof; and including a diluent, and wherein said block copolymer has a $M_w/M_n$ distribution of from 1.1 to less than 2.1.

16. A copolymer according to claim 15, wherein said chlorine containing monomer is said vinyl chloride;

wherein said catalyst is said transition metal free catalyst;

wherein said initiator is derived from $CH_3$—CH—(Cl)I; $CH_2$—$I_2$; or CH—$I_3$, or combinations thereof;

wherein said poly(alkyl acrylate) block has a number average molecular weight of from about 500 to about 1,000,000, wherein said poly(alkyl alkacrylate) block has a number average molecular weight of from about 1,000 to about 1,200,000, wherein said polyvinyl chloride has a number average molecular weight of from about 800 to about 150,000, and wherein said block copolymer has a $M_w/M_n$ distribution of from about 1.1 to about 1.5;

wherein said chlorine containing B block is formed at a temperature of about 45° C. or less;

wherein said diluent comprises water, or water and an organic solvent; and wherein said single $T_g$ of said block copolymer is from about 102° C. to about 120° C.

17. A copolymer according to claim 16, wherein said number average molecular weight of said poly(methyl acrylate) block is from about 1,000 to about 500,000, wherein said number average molecular weight of said poly(methyl methacrylate) block is from about 200,000 to about 600,000, wherein said number average molecular weight of said poly(vinyl chloride) block is from about 1,000 to about 50,000, wherein said transition metal catalyst comprises $Na_2S_2O_4$, or $H_2NC(=NH)SO_2H$, and wherein said buffer is said $NaHCO_3$; and wherein said chlorine containing B block is formed at a temperature of from about 0° C. to about 45° C.

18. A copolymer according to claim 15, wherein said catalyst is said metal catalyst, wherein said metal catalyst is is Cu(O), CuCl, or Fe, or combinations thereof, wherein said ligand is 2,2'-bipyridine, tris[2-(dimethylamino)ethyl] amine, or 1,1 4,7,10,10-hexamethyltriethylenetetramine, or combinations thereof;

wherein said diluent is dimethylsulfoxide (DSMO), diphenyl ether, cyclohexanone, ethylene carbonate, N,N-dimethylformamide (DMF), N-methylformamide, formamide, N,N-dimethyl acetamide, N,N,N',N'-tetramethyl urea, 1,3-dimethyl-tetrahydro-pyrimidin-2-one, acetone, methylethylketone, acetonitrile, N-methyl-2-pyrrolidone, hexamethylphosphotriamide, 1-butyl-3-methylimidazolium hexafluorophosphate; and said $M_w/M_n$ distribution of said block copolymer is from about 1.1 to about 1.5.

19. A copolymer according to claim 18, wherein said acrylic polymer is poly(methylmethacrylate), and wherein said single $T_g$ of said block copolymer is from about 102° C. to about 120° C.

20. A copolymer according to claim 13, wherein said block copolymer is AB or an $AB_n$ type block copolymer where n is from 1 to about 6.

21. A copolymer according to claim 15, wherein said block copolymer is AB or an $AB_n$ type block copolymer where n is 1 to about 3.

22. A copolymer according to claim 17, wherein said block copolymer is AB or an $AB_n$ type block copolymer where n is 1 or 2.

23. A block copolymer, comprising:
at least one A block and one B block, wherein said A block is derived from the living radical polymerization of one or more acrylic monomers, one or more styrenic monomers, acrylamide, methacryamide, one or more vinyl ketones having a total of from 4 to about 10 carbon atoms, or one or more esters of maleic acid having a total of from 5 to about 15 carbon atoms wherein no chain transfer occurs; and
where said B block is derived from the living radical polymerization of one or more chlorine-containing monomers wherein no chain transfer occurs,
wherein at least said A block or said B block, or both, are derived in the presence of a mono- or poly-functional initiator comprising a chlorine, iodine, or bromo atom, and
wherein said A block and said B block is polymerized in the presence of either i) a metal catalyst, and optionally a ligand, or ii) a transition metal-free catalyst, and optionally a buffer, and
wherein said block copolymer has a single $T_g$.

24. A block copolymer according to claim 23, wherein said acrylic monomer is acrylonitrile, an alkyl acrylate wherein said alkyl contains from 1 to about 10 carbon atoms, an alkyl alkacrylate wherein said alkyl is from 1 to about 10 carbon atoms and said alk group contains 1 to about 3 carbon atoms, a $C_3$ to about $C_8$ cycloalkyl acrylate, or $C_7$ to about $C_{15}$ bicycloalkyl acrylate, or combinations thereof;
wherein said mono- or poly-functional initiator is derived from a mono-, di, tri, or polyfunctional activated halide compound wherein said halide is a chloro, iodo, or bromo compound including αα-dihaloalkane, α,α,α-trihaloalkane, a perhaloalkane, a perfluoroalkyl halide, a benzyl halide, an allyl halide, a sulfonyl halide, an α-halonitrile, a α-haloketone, an amidyl halide, or combinations thereof, and
wherein said block copolymer has a $M_w/M_n$ distribution of from about 1.1 to less than 2.1.

25. A block copolymer according to claim 24, wherein said A block is derived from one or more of said acrylic monomers, wherein said acrylic monomer is said alkyl acrylate, or said alkyl alkacrylate wherein said alk group is methyl;
wherein said chlorine containing monomer is vinyl chloride, vinylidene chloride, 2-chloropropene, or vinyl 2-chloropropine, or combinations thereof,
wherein said initiator is derived from a monofunctional iodo initiator $C_nF_{2n+1}I$ wherein n is from 1 to about 20, $CH_3CH(Cl)I$, $ICH_2COOAlk$ (Alk $C_1$-$C_2$), $ICH_2CN$, $CH_2I_2$, $I(CH_3)_2COOAlk$ (Alk $C_1$-$C_2$), $ArSO_2I$ (Ar-phenyl, 4-methylphenyl, 4-methoxyphenyl), $CH(Cl)I$-$COOEt$, or combinations thereof, or is derived from a difunctional initiator comprising $I(CF_2)_nI$ where n is from 1 to about 16, or $CHI_3$, or an initiator containing two ~CH(Cl)I groups, or is derived from a multifunctional iodo initiator containing three or more ~CH(Cl)I groups;
wherein said metal of said metal catalyst is Cu; Fe, Al, Cd, Mo, W, Rh, Re, Ru, Pt, Ti, Mn, Ni, Pd, or Co, or combinations thereof; and wherein said metal catalyst includes said ligand, wherein said ligand comprises one or more of an trialkylphosphine (alkyl $C_1$-$C_6$), triphenylphosphine, triphenylphosphine oxide, acetylacetonate, or carbon monoxide or combinations thereof, at least one bidentate comprising N,N,N',N'-tetramethyl-ethane-1,2-diamine; [2-(2-dimethylamino-ethoxy)-ethyl]-dimethyl-amine; 2-(4,5-dihydro-oxazol-2-yl)pyridine; [1,10]phenanthroline; 4,7-diphenyl-[1,10] phenanthroline; dodecahydro-7,14-methano-dipyrido [1,2-a; 1',2'-e][1,5]diazocine; 2,2'-bipyridine; 5,5'-dialkyl-2,2'-bipyridine (alkyl $C_1$-$C_{13}$); 4,4'-dialkyl-2,2'-bipyridine (alkyl $C_1$-$C_9$); N-alkyl-2-pyridylmethanimine (alkyl $C_2$-$C_{20}$); aryl-pyridin-2-ylmethylene-amine (aryl-phenyl, 2,4,6-trimethyl phenyl); alkyl-(phenyl-pyridin-2-yl-methylene)-amine (alkyl $C_2$-$C_{10}$); alkyl-(1-pyridin-2-yl-ethylidene)-amine (alkyl $C_1$-$C_{10}$); N,N'-dialkylyethanediimine (alkyl $C_2$-$C_{10}$); or combinations thereof; or at least one tridentate comprising N,N,N',N'',N''-pentaalkyldiethyl-enetriamine (alkyl $C_1$-$C_{11}$); N,N-bis(2-pyridylmethyl) alkylamine (alkyl $C_2$-$C_{10}$); N-(2-pyridinyl methylene)-2-pyridinemethanamine; N,N',N''-trimethyl-1,4,7-triazacyclononane; N,N-dimethyl-N'-pyridin-2-ylmethylene-methanediamine; 2,6-[bis(2-alkylimino-2-ethyl)]pyridine (alkyl $C_2$-$C_8$); 4,4',4''-trialkyl-[2,2'; 6',2'']terpyridine (alkyl $C_1$-$C_{10}$); 2,6-bis[4-alkyl-2-oxazolin-2-yl]pyridine (alkyl $C_1$-$C_4$); 4-[7-(4,5-dihydro-2-oxazolyl)heptyl]-4'-methyl-2,2'-bipyridine; or combinations thereof; or at least one tetradentate comprising tris(2-aminoethyl)amine, 1,1,4,7,10,10-hexamethyltriethylenetetramine (HMTETA); 5,5,7,12,12,14-hexamethyl-1,4,8,11-tetraazacyclotetradecane; 1,4,8,11-tetramethyl-1,4,8,11-tetraazacyclotetradecane; N,N'-ethylenebis(pyridine-2-carbaldimine); tris [2-(dimethylamino)ethyl]amine ($Me_6$-TREN); tris[2-pyridylmethyl)amine; tris[di(carbalkoxyethyl) aminoethyl]amine (alk $C_1$-$C_4$); or a combination thereof; or a polydentate ligand comprising 1,3,5-tris (dimethylaminopropyl)-1,3,5-triazacyclohexane and permethyl(polyethyleneimine) (MePEI); and
wherein said transition metal-free catalyst comprises $Na_2S_2O_4$, $H_2NC(=NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, $p$-$CH_3C_6H_4SO_2Na$, $(Me_2N)_2C=C(NMe_2)_2$, or combinations thereof, and including said buffer, said buffer comprising $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$, or combinations thereof; and
wherein said metal catalyst is Cu(O); CuCl, CuBr, CuI, CuSPh, $CuPF_6$, CuSCN, $CuN_3$, $CuCF_3SO_3$, CuSBu, $CuC=CPh$, CuO, $Cu_2S$, $Cu_2Se$, $Cu_2Te$, Fe(O), or Ti $Cp_2Cl_2$, or combinations thereof.

26. A block copolymer according to claim 25, wherein said alkyl acrylate is methyl acrylate and wherein said alkyl alkacrylate is methyl methacrylate; and wherein said chlorine containing monomer is said vinyl chloride;
wherein said catalyst is said metal free catalyst;
wherein said chlorine containing B block is formed at a temperature of from about 45° C. or less; and
wherein said single $T_g$ of said block copolymer is from about 102° C. to about 120° C.

27. A block copolymer according to claim 24, wherein said block copolymer is an AB or an $A_nB$, or an $B_mA$ block copolymer where n is from 1 to about 6, and m is from 1 to about 6.

28. A block copolymer according to claim 26, wherein said block copolymer is an AB or an $A_nB$, or an $B_mA$ block copolymer where n is from 1 to about 6, and m is from 1 to about 6; and wherein said chlorine containing B block is formed at a temperature of from about 0° C. to about 45° C.

29. A block copolymer according, to claim 25, wherein each said B block, independently, has a number average molecular weight of from about 800 to about 150,000, wherein each said poly(alkyl acrylate) A block, independently, has a number average molecular weight from about 500 to about 1,000,000, wherein each said poly(alkyl alkacrylate) A block, independently, has number average weight from about 1,000 to about 1,200,000, and wherein the $M_w/M_n$ distribution of said block copolymer is from about 1.1 to about 1.5.

30. A block copolymer according to claim 28, wherein each said B block, independently, has a number average molecular weight of from about 1,200 to about 40,000, wherein each said poly(alkyl acrylate) A block, independently, has a number average from molecular weight from about 1,500 to about 150,000, wherein each said poly(alkyl alkacrylate) A block, independently, has number average weight from about 2,500 to about 200,000, and wherein the $M_w/M_n$ distribution of said block copolymer is from about 1.1 to about 1.5.

31. A block copolymer according to claim 30, wherein said A block is poly(methyl methacrylate).

32. A block copolymer according to claim 25, wherein said acrylic monomer is butyl acrylate, tert-butyl acrylate, 2-ethylhexyl acrylate, or combination thereof, and wherein said chlorine containing monomer is said vinyl chloride;

wherein said catalyst is said metal free catalyst;

wherein said chlorine containing B block is formed at a temperature of from about 45° C. or less; and wherein said single $T_g$ of said block copolymer is from about 102° C. to about 120° C.

33. A block copolymer according to claim 32, wherein said block to polymer is an AB or an $A_nB$, or an $B_mA$ block copolymer where n is from 1 to about 6, and m is from 1 to about 6.

34. A block copolymer according to claim 33, wherein each said B block, independently, has a number average molecular weight of from about 800 to about 150,000, wherein each said alkyl acrylate A block, independently, has a number average from molecular weight from about 500 to about 1,500,000 and wherein the $M_w/M_n$ distribution of said block copolymer is from about 1.1 to about 1.5.

* * * * *

UNITED STATES PATENT AND TRADEMARK OFFICE
CERTIFICATE OF CORRECTION

| | | |
|---|---|---|
| PATENT NO. | : 7,345,127 B2 | Page 1 of 1 |
| APPLICATION NO. | : 11/043469 | |
| DATED | : March 18, 2008 | |
| INVENTOR(S) | : Virgil Percec, Tamaz Guliashvili and Anatoliy V. Popov | |

It is certified that error appears in the above-identified patent and that said Letters Patent is hereby corrected as shown below:

Column 58, Claim 2, line 6, please correct "pertluoroalkyl", should be --perfluoroalkyl--.

Column 58, Claim 2, line 6, please correct "benzyf", should be --benzyl--.

Column 59, Claim 4, line 12, the word "transition" is missing after the words "wherein said" and before "metal-free". The word --transition-- was added in Amendment A dated 12/22/2006.

Column 59, Claim 6, line 46, please correct "11000", should be --1,000--.

Column 62, Claim 19, line 62, please add a space between the words "(methyl" and "methacrylate)".

Column 63, Claim 25, line 64, please delete the words "of said metal" after the words "wherein said metal" and before the words "catalyst is Cu; Fe, Al, Cd,"

Column 66, Claim 33, line 14, please correct "to polymer", should be --copolymer--.

Signed and Sealed this

Twenty-fourth Day of June, 2008

JON W. DUDAS
*Director of the United States Patent and Trademark Office*